(12) United States Patent
Fujimoto

(10) Patent No.: US 6,466,524 B1
(45) Date of Patent: Oct. 15, 2002

(54) RECORDING MEDIA PLAYBACK APPARATUS INCLUDING A PLAYBACK MECHANISM THAT TRANSFERS MEDIA

(75) Inventor: Fumihiko Fujimoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/363,091

(22) Filed: Jul. 30, 1999

(30) Foreign Application Priority Data

| Jul. 30, 1998 | (JP) | 10-216156 |
| Jul. 30, 1998 | (JP) | 10-216158 |
| Jul. 30, 1998 | (JP) | 10-216159 |
| Jul. 30, 1998 | (JP) | 10-216160 |

(51) Int. Cl.$^7$ .............................................. G11B 17/22
(52) U.S. Cl. .................................................. 369/30.85
(58) Field of Search ........................ 369/36, 178, 179, 369/191, 192, 193, 30.85

(56) References Cited

U.S. PATENT DOCUMENTS

| 5,481,512 A | 1/1996 | Morioka et al. ............... 369/36 |
| 5,508,994 A | 4/1996 | Nakamichi et al. .......... 369/192 |
| 5,561,657 A | 10/1996 | Ogawa ......................... 369/179 |
| 5,682,364 A | 10/1997 | Ogawa ......................... 369/36 |
| 5,986,981 A | 11/1999 | Takemasa et al. ............. 369/37 |
| 6,052,356 A | * 4/2000 | Fujimoto et al. ............ 369/192 |

FOREIGN PATENT DOCUMENTS

| DE | 19725169 A1 | 12/1997 |
| EP | 0833324 A2 | 4/1998 |
| EP | 0944070 A1 | 9/1999 |
| JP | 3-235249 | 10/1991 |
| JP | 3-235250 | 10/1991 |
| JP | 5-151763 | 6/1993 |
| JP | 6-176472 | 6/1994 |
| JP | 6-231559 | 8/1994 |
| JP | 7-169168 | 7/1995 |
| JP | 7-272383 | 10/1995 |
| JP | 10-3732 | 1/1998 |
| JP | 10-3733 | 1/1998 |
| JP | 10-3734 | 1/1998 |
| JP | 10-3736 | 1/1998 |

OTHER PUBLICATIONS

Patent Abstracts of Japan, vol. 1998, No. 05, Apr. 30, 1998 & JP 10 021628 A (Pioneer Electron Corp), Jan. 23, 1998.
Pending U.S. patent application Ser. No. 08/874,861, filed Jun. 13, 1997, by Fumihiko Fujimoto; entitled "Recording Carrier Reproduction/Recording Apparatus Having a Reproduction Recording Device Supported in a Floating State and a Locking Mechanism for Cancelling the Floating State of the Reproduction/Recording Device", pending in Group Art Unit 2754, Batch No. S47, Issue Fee Paid Jul. 22, 1999.

(List continued on next page.)

*Primary Examiner*—David Davis
(74) *Attorney, Agent, or Firm*—Wenderoth, Lind & Ponack, L.L.P.

(57) ABSTRACT

When a CD is inserted in an insertion/ejection slot of a CD playback apparatus, an insertion/ejection roller in an insertion/ejection mechanism draws the CD into a housing. A shutter mechanism closes a portion of the insertion/ejection slot. A control circuit drives the insertion/ejection roller in the reverse direction to cause the CD to abut against the shutter mechanism, whereby the CD becomes set in a reference position. The CD thus set in the reference position can be mounted on a turn table of a PU unit. A stocker installed inside the apparatus is capable of accommodating a plurality of CDs, and the turn table can be moved to transport the CD to an accommodating position selected by a lifting mechanism and separated by a separating mechanism. Since the space necessary to handle recording media such as CDs can be reduced, the entire construction can be reduced in size.

38 Claims, 64 Drawing Sheets

OTHER PUBLICATIONS

Pending U.S. patent application Ser. No. 08/874,490, filed Jun. 13, 1997, by Fumihiko Fujimoto, entitled "Reproduction/Recording Apparatus Having a Divisible Housing for Disc–Shaped Recording Carriers and a Reproduction/Recording Head Mountingn Rack", pending in Group Art Unit 2754, Batch No. V31.

Pending U.S. patent application Ser. No. 09/362,738, filed Jul. 29, 1999, by Fumihiko Fujimoto, entitled "Storage Device for Recording Media", pending in Group Art Unit 2754.

* cited by examiner

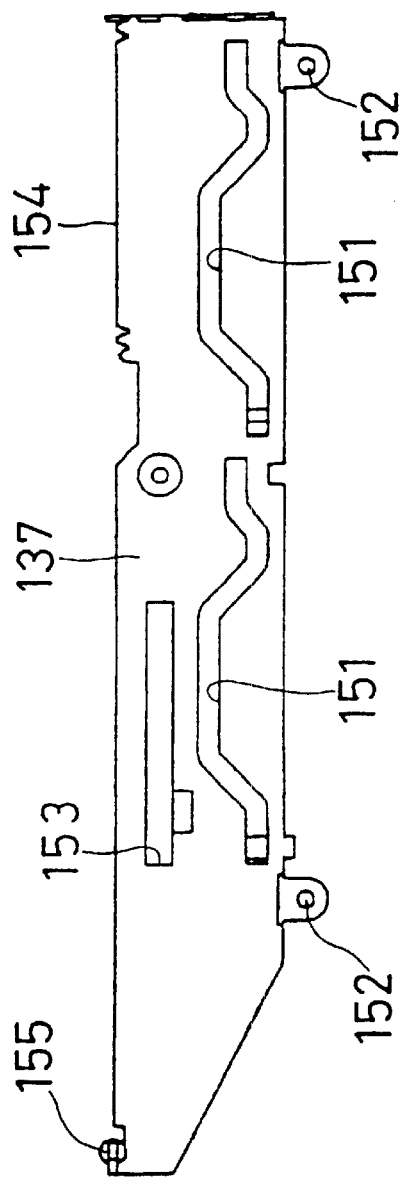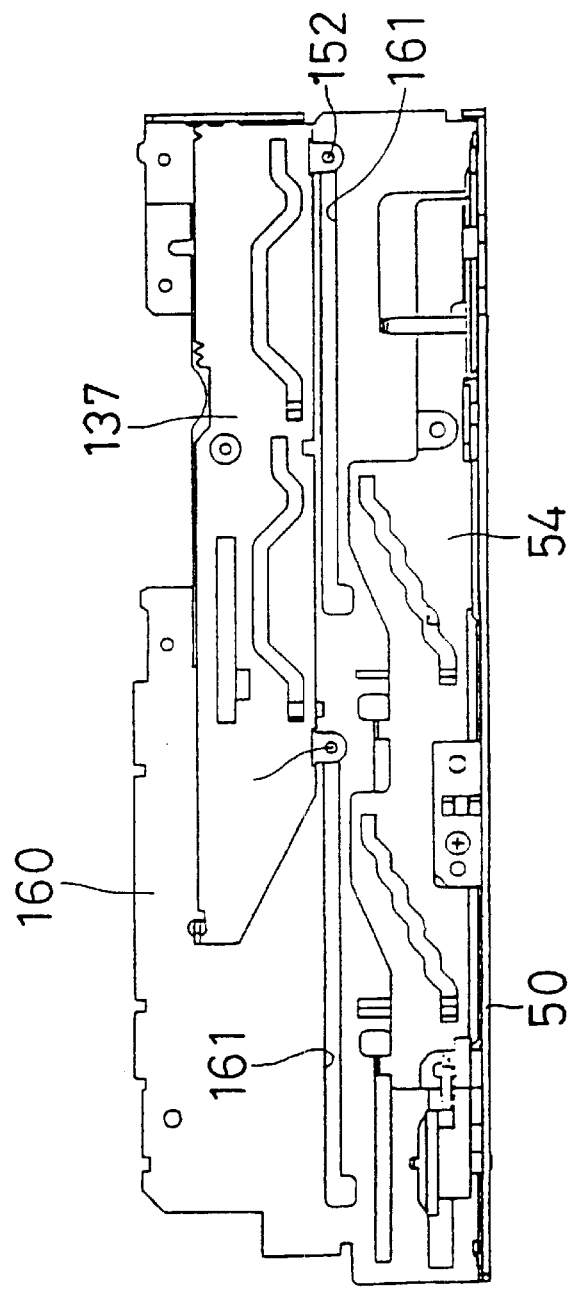
FIG. 35A
FIG. 35B

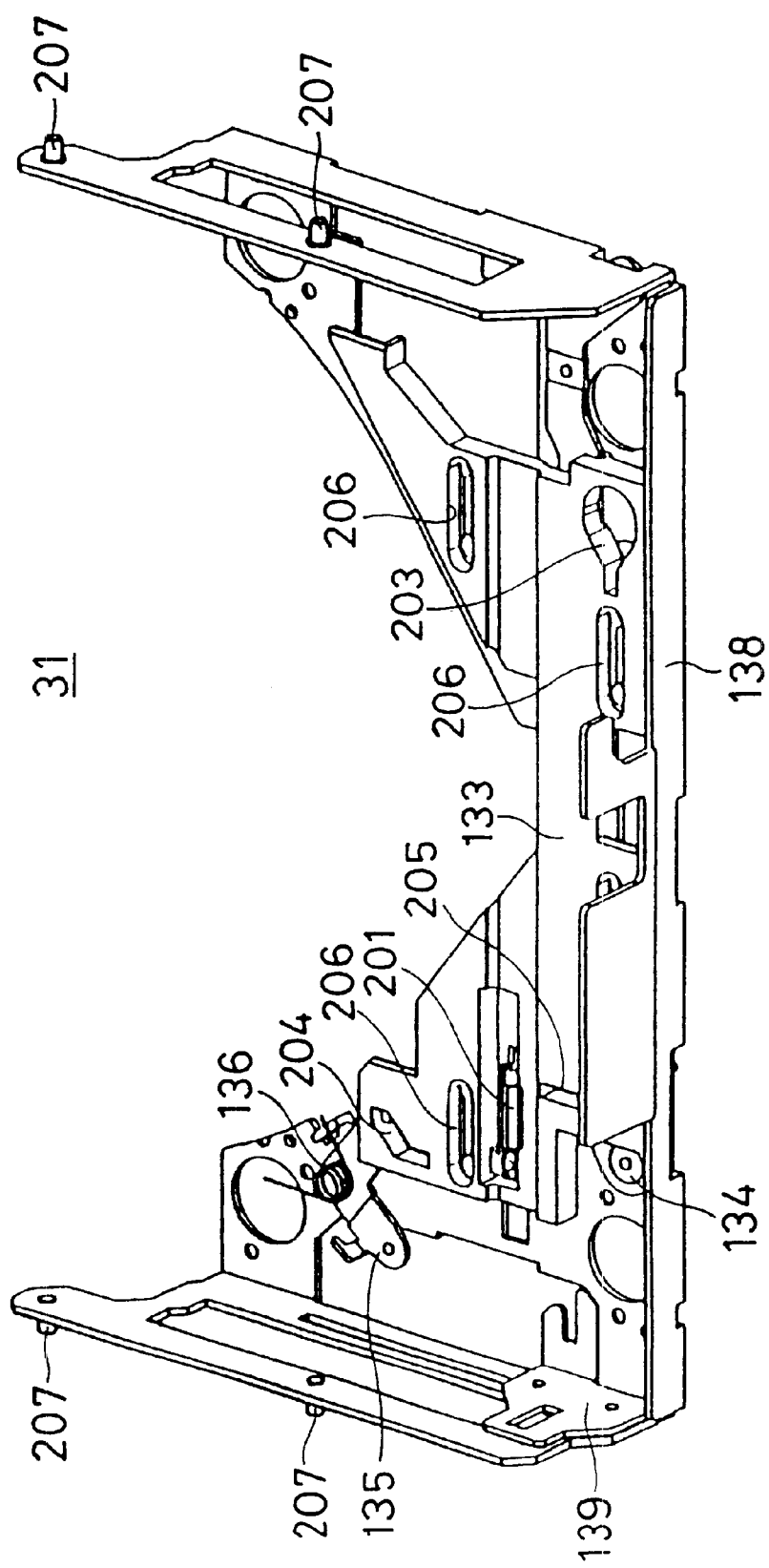

FIG. 47
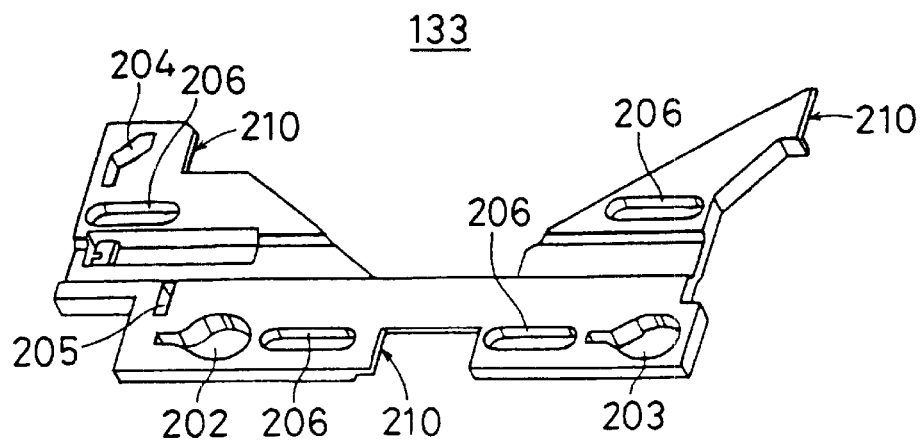
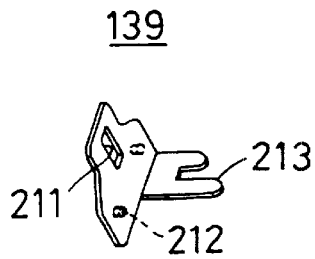
FIG. 48A
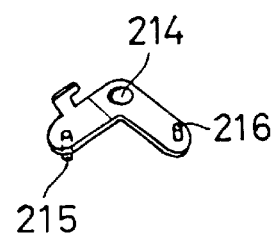
FIG. 48B
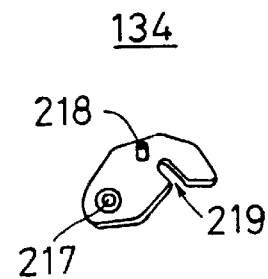
FIG. 48C

FIG. 53

| | S | E |
|---|---|---|
| LIFTING MOTOR | CW <br> CCW | |
| SPLIT MOTOR | CW <br> CCW | max 5sec → 1.00msec |
| SLIDE MOTOR | CW <br> CCW | |
| LIFTING ORIGIN SW. | H <br> L | |
| COUNT SENSOR | H <br> L | |
| SPLIT ORIGIN SW. | H <br> L | |
| SPLIT POSITION SENSOR | 9EH (LOCK REL.) | dec. → 40H (DISC MOUNTED) |
| SLIDE ORIGIN SW. | H <br> L | |
| INS./EJECT. STANDBY SW. | H <br> L | |
| SLIDE COMPL. SW. | H <br> L | |
| INS. DET. SW. | H <br> L | |
| INS. PRESENCE/ABSENCE SW. | H <br> L | |
| EJECT. COMPL. SW. | H <br> L | |
| PU ORIGIN SW. | H <br> L | |
| CLAMP REL. SW. | H <br> L | |

FIG. 54

| | S | | E |
|---|---|---|---|
| LIFTING MOTOR | CW ⊢ CCW | | |
| SPLIT MOTOR | CW ⊢ CCW | max 3sec | 100msec |
| SLIDE MOTOR | CW ⊢ CCW | | |
| LIFTING ORIGIN SW. | H L | | |
| COUNT SENSOR | H L | | |
| SPLIT ORIGIN SW. | H L | | |
| SPLIT POSITION SENSOR | 40h (DISC MOUNTED) | dec. → | 20h (SPLIT COMPL.) |
| SLIDE ORIGIN SW. | H L | | |
| INS./EJECT. STANDBY SW. | H L | | |
| SLIDE COMPL. SW. | H L | | |
| INS. DET. SW. | H L | | |
| INS. PRESENCE/ ABSENCE SW. | H L | | |
| EJECT. COMPL. SW. | H L | | |
| PU ORIGIN SW. | H L | | |
| CLAMP REL. SW. | H L | | |

FIG. 57

| | S | | E |
|---|---|---|---|
| LIFTING MOTOR | CW <br> CCW | UP <br> max-5sec <br> DOWN → | <br> 100msec |
| SPLIT MOTOR | CW <br> CCW | | |
| SLIDE MOTOR | CW <br> CCW | | |
| LIFTING ORIGIN SW. | H <br> L | | |
| COUNT SENSOR | H <br> L | ⎍⎍⎍▓▓▓⎍⎍ | |
| SPLIT ORIGIN SW. | H <br> L | | |
| SPLIT POSITION SENSOR | | 18h (ORIGIN) const. | |
| SLIDE ORIGIN SW. | H <br> L | | |
| INS./EJECT. STANDBY SW. | H <br> L | | |
| SLIDE COMPL. SW. | H <br> L | | |
| INS. DET. SW. | H <br> L | | |
| INS. PRESENCE/ ABSENCE SW. | H <br> L | | |
| EJECT. COMPL. SW. | H <br> L | | |
| PU ORIGIN SW. | H <br> L | | |
| CLAMP REL. SW. | H <br> L | | |

FIG. 58

| | | S | | E |
|---|---|---|---|---|
| LIFTING MOTOR | CW<br>·<br>CCW | | | |
| SPLIT MOTOR | CW<br>·<br>CCW | | max 5sec | 100msec |
| SLIDE MOTOR | CW<br>·<br>CCW | | | |
| LIFTING ORIGIN SW. | H<br>L | | | |
| COUNT SENSOR | H<br>L | | | |
| SPLIT ORIGIN SW. | H<br>L | | | |
| SPLIT POSITION SENSOR | | 18h (ORIGIN) | const. \| inc. → | 20h (SPLIT COMPL.) |
| SLIDE ORIGIN SW. | H<br>L | | | |
| INS./EJECT. STANDBY SW. | H<br>L | | | |
| SLIDE COMPL. SW. | H<br>L | | | |
| INS. DET. SW. | H<br>L | | | |
| INS. PRESENCE/ ABSENCE SW. | H<br>L | | | |
| EJECT. COMPL. SW. | H<br>L | | | |
| PU ORIGIN SW. | H<br>L | | | |
| CLAMP REL. SW. | H<br>L | | | |

FIG. 60

| | S | | | E |
|---|---|---|---|---|
| LIFTING MOTOR | CW | | | |
| | CCW | | | |
| SPLIT MOTOR | CW | | max 3sec | |
| | CCW | | | 100msec |
| SLIDE MOTOR | CW | | | |
| | CCW | | | |
| LIFTING ORIGIN SW. | H | | | |
| | L | | | |
| COUNT SENSOR | H | | | |
| | L | | | |
| SPLIT ORIGIN SW. | H | | | |
| | L | | | |
| SPLIT POSITION SENSOR | | 20h (SPLIT COMPL.) | inc. → | 40h (DISC MOUNTED) |
| SLIDE ORIGIN SW. | H | | | |
| | L | | | |
| INS./EJECT. STANDBY SW. | H | | | |
| | L | | | |
| SLIDE COMPL. SW. | H | | | |
| | L | | | |
| INS. DET. SW. | H | | | |
| | L | | | |
| INS. PRESENCE/ ABSENCE SW. | H | | | |
| | L | | | |
| EJECT. COMPL. SW. | H | | | |
| | L | | | |
| PU ORIGIN SW. | H | | | |
| | L | | | |
| CLAMP REL. SW. | H | | | |
| | L | | | |

FIG. 61

| | S | E |
|---|---|---|
| LIFTING MOTOR | CW / CCW | |
| SPLIT MOTOR | CW ⎯⎯ max 5sec ⎯⎯ / CCW | 1.0 msec |
| SLIDE MOTOR | CW / CCW | |
| LIFTING ORIGIN SW. | H / L | |
| COUNT SENSOR | H / L | |
| SPLIT ORIGIN SW. | H / L | |
| SPLIT POSITION SENSOR | 40h (DISC MOUNTED) ⎯ inc. ⎯→ | 9Eh (LOCK REL.) |
| SLIDE ORIGIN SW. | H / L | |
| INS./EJECT. STANDBY SW. | H / L | |
| SLIDE COMPL. SW. | H / L | |
| INS. DET. SW. | H / L | |
| INS. PRESENCE/ABSENCE SW. | H / L | |
| EJECT. COMPL. SW. | H / L | |
| PU ORIGIN SW. | H / L | |
| CLAMP REL. SW. | H / L | |

FIG. 62

| | S | | E |
|---|---|---|---|
| LIFTING MOTOR | CW  ⊢ CCW | | |
| SPLIT MOTOR | CW  ⊢ CCW | max 3sec | 100msec |
| SLIDE MOTOR | CW  ⊢ CCW | | |
| LIFTING ORIGIN SW. | H L | | |
| COUNT SENSOR | H L | | |
| SPLIT ORIGIN SW. | H L | | |
| SPLIT POSITION SENSOR | 40h (DISC MOUNTED) | inc. | 67h (HOLD REL.) |
| SLIDE ORIGIN SW. | H L | | |
| INS./EJECT. STANDBY SW. | H L | | |
| SLIDE COMPL. SW. | H L | | |
| INS. DET. SW. | H L | | |
| INS. PRESENCE/ABSENCE SW. | H L | | |
| EJECT. COMPL. SW. | H L | | |
| PU ORIGIN SW. | H L | | |
| CLAMP REL. SW. | H L | | |

FIG. 63

| | S | | E |
|---|---|---|---|
| LIFTING MOTOR | CW<br>├<br>CCW | | |
| SPLIT MOTOR | CW<br>├<br>CCW | | |
| SLIDE MOTOR | CW<br>├<br>CCW | max 3sec | |
| LIFTING ORIGIN SW. | H<br>L | | 100msec 100msec |
| COUNT SENSOR | H<br>L | | |
| SPLIT ORIGIN SW. | H<br>L | | |
| SPLIT POSITION SENSOR | | 67h (HOLD REL.) const. | |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 64

| | S | | E |
|---|---|---|---|
| LIFTING MOTOR | CW<br>CCW | | |
| SPLIT MOTOR | CW<br>CCW | max 3sec | 100msec |
| SLIDE MOTOR | CW<br>CCW | | |
| LIFTING ORIGIN SW. | H<br>L | | |
| COUNT SENSOR | H<br>L | | |
| SPLIT ORIGIN SW. | H<br>L | | |
| SPLIT POSITION SENSOR | 67h (HOLD REL.) | inc. | 83h (INS./EJECT.) |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 65

| | S | | E |
|---|---|---|---|
| LIFTING MOTOR | CW / CCW | max 5sec | 1.00msec |
| SPLIT MOTOR | CW / CCW | | |
| SLIDE MOTOR | CW / CCW | | |
| LIFTING ORIGIN SW. | H/L | | |
| COUNT SENSOR | H/L | | |
| SPLIT ORIGIN SW. | H/L | | |
| SPLIT POSITION SENSOR | | 83h (INS./EJECT.) const. | |
| SLIDE ORIGIN SW. | H/L | | |
| INS./EJECT. STANDBY SW. | H/L | | |
| SLIDE COMPL. SW. | H/L | | |
| INS. DET. SW. | H/L | step up | |
| INS. PRESENCE/ABSENCE SW. | H/L | | |
| EJECT. COMPL. SW. | H/L | | step up |
| PU ORIGIN SW. | H/L | | |
| CLAMP REL. SW. | H/L | | |

FIG. 67

| | S | E |
|---|---|---|
| LIFTING MOTOR | CW / CCW 500msec | 100msec |
| SPLIT MOTOR | CW / CCW | |
| SLIDE MOTOR | CW / CCW | |
| LIFTING ORIGIN SW. | H / L | |
| COUNT SENSOR | H / L | |
| SPLIT ORIGIN SW. | H / L | |
| SPLIT POSITION SENSOR | 83h (INS./EJECT.) const. | |
| SLIDE ORIGIN SW. | H / L | |
| INS./EJECT. STANDBY SW. | H / L | |
| SLIDE COMPL. SW. | H / L | |
| INS. DET. SW. | H / L | |
| INS. PRESENCE/ABSENCE SW. | H / L | |
| EJECT. COMPL. SW. | H / L | |
| PU ORIGIN SW. | H / L | |
| CLAMP REL. SW. | H / L | |
| INS. COMPL. SW. | H / L | |

FIG. 68

| | S | | E |
|---|---|---|---|
| LIFTING MOTOR | CW<br>⊢<br>CCW | | |
| SPLIT MOTOR | CW<br>⊢<br>CCW | ⌐_____max 3sec_____ | ⌐1.0 msec |
| SLIDE MOTOR | CW<br>⊢<br>CCW | | |
| LIFTING ORIGIN SW. | H<br>L | | |
| COUNT SENSOR | H<br>L | | |
| SPLIT ORIGIN SW. | H<br>L | | |
| SPLIT POSITION SENSOR | 83h<br>(INS./EJECT.) | _____dec._____→ | 67h<br>(HOLD REL.) |
| SLIDE ORIGIN SW. | H<br>L | | |
| INS./EJECT. STANDBY SW. | H<br>L | | |
| SLIDE COMPL. SW. | H<br>L | | |
| INS. DET. SW. | H<br>L | | |
| INS. PRESENCE/ABSENCE SW. | H<br>L | | |
| EJECT. COMPL. SW. | H<br>L | | |
| PU ORIGIN SW. | H<br>L | | |
| CLAMP REL. SW. | H<br>L | | |

FIG. 69

| | S | | E |
|---|---|---|---|
| LIFTING MOTOR | CW / CCW | | |
| SPLIT MOTOR | CW / CCW | | |
| SLIDE MOTOR | CW / CCW | max 3sec / 100msec | 100msec |
| LIFTING ORIGIN SW. | H / L | | |
| COUNT SENSOR | H / L | | |
| SPLIT ORIGIN SW. | H / L | | |
| SPLIT POSITION SENSOR | | 67h (HOLD REL.) const. | |
| SLIDE ORIGIN SW. | H / L | | |
| INS./EJECT. STANDBY SW. | H / L | | |
| SLIDE COMPL. SW. | H / L | | |
| INS. DET. SW. | H / L | | |
| INS. PRESENCE/ABSENCE SW. | H / L | | |
| EJECT. COMPL. SW. | H / L | | |
| PU ORIGIN SW. | H / L | | |
| CLAMP REL. SW. | H / L | | |

FIG. 70

| | S | | E |
|---|---|---|---|
| LIFTING MOTOR | CW / CCW | | |
| SPLIT MOTOR | CW / CCW | max 5sec | 1.00msec |
| SLIDE MOTOR | CW / CCW | | |
| LIFTING ORIGIN SW. | H / L | | |
| COUNT SENSOR | H / L | | |
| SPLIT ORIGIN SW. | H / L | | |
| SPLIT POSITION SENSOR | 9Eh (LOCK REL.) | dec. → | 40h (DISC MOUNTED) |
| SLIDE ORIGIN SW. | H / L | | |
| INS./EJECT. STANDBY SW. | H / L | | |
| SLIDE COMPL. SW. | H / L | | |
| INS. DET. SW. | H / L | | |
| INS. PRESENCE/ABSENCE SW. | H / L | | |
| EJECT. COMPL. SW. | H / L | | |
| PU ORIGIN SW. | H / L | | |
| CLAMP REL. SW. | H / L | | |

RECORDING MEDIA PLAYBACK APPARATUS INCLUDING A PLAYBACK MECHANISM THAT TRANSFERS MEDIA

BACKGROUND OF THE INVENTION

1. Field of the Invention

The present invention relates to a recording media playback apparatus for playing back information recorded on a recording medium and/or recording information on a recording medium.

2. Description of the Related Art

Recording media playback apparatuses are conventionally used for playing back information such as music and video from recording media such as compact discs (CDs), MiniDiscs (MDs), digital video discs (DVDs), and the like, or for playing back information such as maps used in navigation systems or programs or data used in personal computers, game machines, etc. from recording media such as CD-ROMs. There are two main ways by which recording media to be played back are loaded into and unloaded from a playback apparatus: one is to load and unload each recording medium individually, and the other is to accommodate a plurality of recording media in a magazine and load and unload the magazine with the recording media accommodated therein. Prior art apparatuses of the magazine type are disclosed, for example, in Japanese Unexamined Patent Publications JP-A 3-235250(1991), JP-A 6-231559(1994), and JP-A 7-169168(1995). U.S. Pat. No. 5,481,512, which corresponds to Japanese Unexamined Patent Publication JP-A 6-231559, should also be noted.

Some automotive audio systems are equipped with an autochanger facility for accommodating a plurality of recording media such as compact discs (hereinafter abbreviated CDs) as program sources, and for playing back the discs by sequentially changing the discs. The autochanger facility is very useful, since the driver of a car cannot manually load or unload recording media while driving the car.

FIGS. 73A and 73B are simplified schematic diagrams showing the construction of a CD playback apparatus 1 equipped with an autochanger facility according to the prior art. A housing 2 is constructed conforming to the so-called DIN standard which defines a vehicle dashboard mountable size, for example, about 18 cm in width, about 5 cm in height, and about 17 cm in depth. A magazine 3 holding a plurality of CDs 4 is loaded into the housing 2, and a desired one of the CDs 4 can be selected and played back by a PU unit 5. Each CD 4 is about 12 cm in diameter, and a turn table 6 mounted on the PU unit 5 is about 3 cm in diameter. As shown in FIG. 73A, when selecting one of the CDs 4 accommodated in the magazine 3, the PU unit 5 is retracted away from the magazine 3 into its standby position and selects the CD 4 to be played back. The magazine 3 with the CDs 4 accommodated therein is loaded into and unloaded from the housing 2. Accordingly, the PU unit 5 is installed in a position where the PU unit 5 does not interfere with the loading and unloading of the magazine 3.

As shown in FIG. 73B, when playing back a CD 4, the magazine 3 in which the CD 4 to be played back is accommodated is separated between top and bottom at the accommodating position of the CD 4; then, the turn table 6 is moved into the space created by separating the magazine 3, and the CD 4 is mounted on the turn table 6 for playback. To move the PU unit 5 into the magazine 3, a swiveling arm 7 is provided on whose swivelling end is mounted the turn table 6. The base end of the swiveling arm 7 is supported on a support shaft 8.

Playback apparatuses of the type that loads and unloads recording media one at a time are widely used. Some playback apparatuses are capable of accommodating a plurality of recording media within the housing, just like the magazine type, and yet capable of loading and unloading recording media one by one. Such prior art apparatuses are disclosed, for example, in Japanese Unexamined Patent Publications JP-A 6-176472(1994) and JP-A 7-272383 (1995). In such prior art, a playback pickup unit is provided between the insertion/ejection slot of the housing and the accommodating section inside the housing, and a recording medium, when inserted, can be played back immediately or transported for accommodating in the accommodating section, or a recording medium accommodated in the accommodating section can be drawn out for playback or ejection. Japanese Unexamined Patent Publication JP-A 6-176472 is specifically directed to the MD whose recording medium is handled with being housed in a cartridge. Japanese Unexamined Patent Publication JP-A 7-272383 uses CDs as recording media, each mounted on a tray. U.S. Pat. No. 5,508,994 also handles CDs as mounted on trays.

FIGS. 74A and 74B schematically show the operating positions of various parts in a CD playback apparatus 11 disclosed by applicant in Japanese Unexamined Patent Publications JP-A 10-3732(1998), JP-A 10-3733(1998), JP-A 10-3734(1998), and JP-A 10-3736(1998). In this CD playback apparatus 11, a stocker 13 capable of accommodating a plurality of CDs 4 is mounted inside a housing 12. An insertion/ejection slot 14 is provided in the front panel of the housing 12, and the CDs 4 can be inserted or ejected one at a time. As shown in FIG. 74A, a turn table 6 mounted on a PU unit 5 is on standby in a position outside the accommodating area of the CDs 4 accommodated in the stocker 13, and is movable in the direction of thickness to select one of the CDs accommodated in the stocker 13. FIG. 74B shows the condition in which the stocker 13 is separated to provide space above and below the selected CD 4 and the turn table 6 of the PU unit 5 is moved into the space created by the separating. A moving mechanism 15 moves the PU unit 5 into the space widened by separating the stocker 13.

FIG. 75 shows a schematic cross sectional side view showing the construction of the CD playback apparatus 11. The CD playback apparatus 11 is equipped with an autochanger facility and capable of accommodating a plurality of CDs 4 in the stocker 13 mounted inside the housing 12. The CDs 4 can be inserted into or ejected from the housing 12 one at a time, and can be played back by the PU unit 5. The PU unit 5 is mounted on a frame 16, and is movable up and down and also movable horizontally in the inserting direction of the CD 4 as well as in the direction opposite to it. Since the CD playback apparatus 11 is a vehicle mounted type, it is susceptible to external vibrations and shocks when the vehicle is moving. A floating mechanism 17 is provided to reduce the effects of external vibrations and shocks during playback.

The stocker 13 can be separated between top and bottom at a desired accommodating position by using a lifting/separating mechanism 18. The PU unit 5 moves into the space created by the separating, and receives a CD 4 from the stocker 13 for playback or returns a CD 4 after playback. The operation of the various parts is controlled by a control circuit 19.

The stocker 13 and the frame 16 are supported on a chassis 20. The chassis 20 is supported by the floating mechanism 17 in such a manner as to float with respect to the housing 12.

When inserting or ejecting a CD 4, the floating action of the floating mechanism 17 is restrained by locking a lock pawl 17a.

On the front side of the frame 16 is provided a shutter 12a with which a slot 12b formed in the housing 12 for the insertion/ejection of CDs 4 can be opened and closed; when a CD is inserted, the shutter 12a is closed to prevent the insertion of a new CD 4. The CD 4 inserted through the slot 12b is transported into the stocker 13 by virtue of transport rollers 16a. The transport rollers 16a are mounted on the frame 16, and are positioned so as to align with the inside height of the slot 12b when inserting or ejecting a CD 4.

FIGS. 76A to 76E are diagrams schematically illustrating the operation of the CD playback apparatus 11 of FIG. 74. As shown in FIG. 75, the PU unit 5 and the transport rollers 16a are mounted on the same frame 16 so that they move together up and down. As shown in FIG. 76A, when inserting or ejecting a CD 4, the transport rollers 16a are positioned in prescribed place on the inside of the slot 12b, and operated to transport the inserted CD 4 into an accommodating position in the stocker 13 positioned by the lifting/separating mechanism 18 or to withdraw an accommodated CD 4 for ejection. While this is occurring, the PU unit 5 is held in its standby position below the transport path. FIG. 76B shows six CDs 4 stacked in sequence from the bottom to the top.

Here, consider the case where, of the CDs 4 accommodated in the stocker 13, the third CD 4 from the bottom is selected for playback. First, the stocker 13 is separated by the lifting/separating mechanism 18, as shown in FIG. 76C. Then, the PU unit 5 is moved up to the same height as the separating position and inserted into the created space, as shown in FIG. 76D; at this time, the transport rollers 16a are moved away from the slot 12b so that they do not work to transport the CD 4.

For this purpose, the horizontal movement of the PU unit 5 and the driving of the transport rollers 16a are performed using the same motor. In FIG. 76D, the upper separated section of the stocker 13 is moved downward to mount the CD 4 on the turn table 6 of the PU unit 5 positioned in the space. In FIG. 76E, the upper separated section of the stocker 13 is moved up and, at the same time, the turn table 6 of the PU unit 5 on which the CD 4 has been mounted is moved into a playback area to play back the CD 4.

In a playback apparatus capable of loading only one recording medium at a time, the inserted recording medium must be transported while detecting the position of the medium with high accuracy. Or, when mounting the recording medium on a tray or the like, highly precise positioning must be performed and, after the recording medium is drawn into the apparatus, the positioning accuracy must be maintained so that the recording medium can, for example, be automatically mounted on a playback mechanism. If the apparatus is constructed so that a magazine holding a plurality of recording media can be loaded in its entirety into the apparatus, the positioning accuracy can be maintained with the recording media accommodated in the magazine. However, the recording media cannot be loaded or unloaded individually; therefore, when the user desires to change recording media, for example, the entire magazine must be removed from the apparatus, causing inconvenience to the user.

In the prior art CD playback apparatus 11 shown in FIGS. 75 and 76A to 76E, in order that the entire operation can be performed automatically, precise positioning of the CD 4 must be done by using an optical sensor. However, the operation for transporting the CD 4 in the limited space of the housing 12, especially the operation for transporting the CD 4 into a restricted accommodating space in the stocker 13 by using the transport rollers 16a, will become difficult to adjust if the construction of the transport rollers 16a is simplified. Further, the inserted CD 4 is positioned in place when accommodated in the stocker 13, and this position serves as the reference position when transferring the CD 4 to and from the transport rollers 16a for ejection or insertion or to and from the PU unit 5 for playback. In practice, this requires the provision of such parts as a lever for firmly pushing the CD 4 into the stocker 13 and a lever for pushing the CD 4 accommodated in the stocker 13 out to the position of the transport rollers 16a, and increases the complexity of the mechanism.

SUMMARY OF THE INVENTION

An object of the present invention is to provide a recording media playback apparatus whose entire construction can be made compact in size by simplifying the mechanism necessary to handle recording media within the apparatus, the recording media being individually inserted in the apparatus, and thereby reducing the necessary space inside the apparatus.

The present invention provides a recording media playback apparatus for playing back and/or recording information on a recording medium, comprising:

a housing having an insertion/ejection slot through which substantially plate-like recording media are inserted or ejected individually;

an insertion/ejection mechanism capable of drawing a recording medium into the housing when the recording medium is inserted in the insertion/ejection slot, and capable of ejecting a recording medium from the housing through the insertion/ejection slot; and a playback mechanism movable within the housing between a transfer position where the recording medium is transferred to and from the insertion/ejection mechanism and a playback position where information playback and/or recording is performed on the recording medium.

According to the invention, the housing of the recording media playback apparatus has an insertion/ejection slot through which substantially plate-like recording media are inserted or ejected individually. The insertion/ejection mechanism is capable of drawing a recording medium into the housing when the recording medium is inserted in the insertion/ejection slot, and capable of ejecting a recording medium from the housing through the insertion/ejection slot. The playback mechanism inside the housing is movable between the transfer position where the recording medium is transferred to and from the insertion/ejection mechanism and the playback position where information playback and/ or recording is performed on the recording medium. When each individual recording medium is inserted in the insertion/ejection slot, the recording medium is drawn into the housing by the insertion/ejection mechanism and transferred from the insertion/ejection mechanism to the playback mechanism. The playback mechanism can move the recording medium within the housing; if the recording medium received from the insertion/ejection mechanism is moved into the playback position, information playback and/or recording can instantly be performed on the recording medium.

According to the invention, since recording media can not only be played back but also be moved within the housing by the playback mechanism, the mechanism necessary for handling the recording media within the housing can be simplified, and the entire construction can be made compact by reducing the necessary space.

The recording media playback apparatus of the invention further comprises:

an open/close mechanism capable of closing at least a portion of the insertion/ejection slot when the recording medium is inserted through the insertion/ejection slot into the housing; and a control circuit for performing control so that when the recording medium is inserted, the insertion/ejection mechanism is driven in an ejecting direction, causing the recording medium to abut against the open/close mechanism and thus positioning the recording medium with respect to the playback mechanism located in the transfer position.

According to the invention, the insertion/ejection slot is provided for the insertion and ejection of recording media, and the insertion/ejection mechanism is provided inside the housing to transport the recording medium inserted or selected for ejection. When the recording medium is inserted in the insertion/ejection slot, the control circuit controls the insertion/ejection mechanism to draw the recording medium into the apparatus, whereupon the open/close mechanism closes at least a portion of the insertion/ejection slot. By thus closing the insertion/ejection slot, double insertion of recording media is prevented. After the insertion/ejection slot has been; closed, the control circuit controls the insertion/ejection mechanism to move the recording medium in the direction of ejection opposite to the direction of insertion. Since the insertion/ejection slot is closed by the open/close mechanism, the recording medium stops by abutting against the open/close mechanism. The position at which the recording medium moved in the direction of ejection stops can be set as the reference position when handling the recording medium within the apparatus; accordingly, information playback from the recording medium and/or information recording on the recording medium can be performed by making effective use of the interior space of the apparatus, and the entire construction can be made compact by reducing the size to be secured inside the apparatus.

Furthermore, since the positioning of the recording medium can be done in a reliable manner, the mechanism, sensor, etc. for the insertion and ejection of the recording medium can be simplified and can also be reduced in size by reducing the necessary space.

According to the invention, since the recording medium is set in the position at which the recording medium stops when inserted through the insertion/ejection slot into the apparatus, the entire construction can be made compact by making effective use of the interior space of the apparatus. The positioning of the recording medium is performed by closing at least a portion of the insertion/ejection slot by the open/close mechanism after the recording medium has been inserted through the insertion/ejection slot into the apparatus by the insertion/ejection mechanism, and by causing the recording medium to abut against the open/close mechanism by driving the recording medium in the direction of ejection by virtue of the insertion/ejection mechanism. This ensures reliable positioning of the recording, medium at the insertion/ejection slot.

The invention is characterized in that the recording medium is shaped in the form of a disc, and in that the playback mechanism has a turn table capable of engaging in the center hole of the recording medium and clamping and unclamping the recording medium.

According to the invention, the disc-shaped recording medium such as a CD can be handled by engaging the turn table into the center hole of the recording medium.

Furthermore, according to the invention, since the disc-shaped recording medium is clamped onto the turn table by engaging the center hole of the recording medium with the turn table and the recording medium thus clamped is unclamped from the turn table, the transfer of the recording medium from the insertion/ejection mechanism to the turn table and vice versa at the set position can be performed smoothly.

The invention is also characterized in that an accommodating mechanism capable of accommodating a plurality of recording media is installed inside the housing, and in that a transport mechanism for transporting the recording medium by moving the turn table with the recording medium mounted thereon is provided between the set position and the accommodating mechanism.

According to the invention, the accommodating mechanism capable of accommodating a plurality of recording media is installed inside the apparatus and, using the turn table of the playback mechanism, the recording medium positioned by the insertion/ejection mechanism can be transported for insertion into the accommodating mechanism, or a desired recording medium accommodated in the accommodating mechanism can be transported to the set position for ejection. By also using the turn table for the transportation of recording media to and from the accommodating mechanism, the mechanism for the insertion and ejection of recording media can be simplified, and the entire construction can be made compact by reducing the necessary space inside the apparatus.

Further, according to the invention, the turn table can be moved by the insertion/ejection mechanism in such a manner that the recording medium inserted through the insertion/ejection slot is mounted on the turn table and accommodated into the accommodating mechanism installed inside the apparatus or the recording medium accommodated in the accommodating mechanism is transported on the turn table for ejection onto the insertion/ejection mechanism.

The invention is also characterized in that the control circuit performs control so that the transport mechanism is caused to abut against the insertion/ejection mechanism at the set position to transfer the recording medium from the turntable to the insertion/ejection mechanism.

According to the invention, since control is performed so that the transport mechanism of the turn table is caused to abut against the insertion/ejection mechanism when transferring the recording medium from the turn table to the insertion/ejection mechanism, the transport mechanism can be stopped mechanically in reliable fashion at the set position, ensuring smooth transfer of the recording medium.

Further, according to the invention, since the turn table causes the recording medium which is held to abut against insertion/ejection mechanism at the set position to be transferred to the insertion/ejection mechanism side by the moving mechanism, the ejection of the recording medium can be performed smoothly by using the turn table.

The invention is also characterized in that the insertion/ejection mechanism holds the recording medium when the recording medium is transferred from the turn table to the insertion/ejection mechanism.

According to the invention, when transferring the recording medium from the turn table to the insertion/ejection mechanism and disengaging the recording medium from the turn table, since the recording medium is held on the insertion/ejection mechanism, the recording medium can be reliably disengaged from the turn table.

Further, according to the invention, since the recording medium is held on the insertion/ejection mechanism when transferring the recording medium from the turn table, the recording medium can be reliably transferred from the turn table to the insertion/ejection mechanism.

The invention is also characterized in that the open/close mechanism releases the insertion/ejection slot from the closed condition in interlocking fashion with the movement of the turn table in the direction of recording media thickness.

According to the invention, when the transport mechanism of the turn table abuts against the insertion/ejection mechanism and moves in the direction of recording media thickness, since the open/close mechanism releases the insertion/ejection slot from the closed condition in interlocking fashion with the movement of the transport mechanism, the ejection of the recording medium or the insertion of a new recording medium can be performed smoothly.

Further, according to the invention, with the turn table positioned by abutting against the insertion/ejection mechanism and thus ready to handle a recording medium, the insertion/ejection slot is opened by the open/close mechanism to allow the insertion or ejection of the recording medium.

The invention is also characterized in that the transport mechanism includes a slip mechanism for limiting driving force used for moving the turn table, the slip mechanism being located in a transmission path of the driving force.

According to the invention, since the transport mechanism for moving the turn table is provided with the slip mechanism for limiting the driving force in the driving force transmission path, the turn table can be stopped securely with no excessive driving force being applied via the transmission path when the turn table is in a mechanically stopped condition.

Accordingly, the control circuit need only perform control so that the driving will stop when the turn table has come to a complete stop after being driven for a sufficient time necessary for the moving. In this way, precise positioning can be achieved with simple control.

Further, according to the invention, since the insertion/ejection mechanism for moving the turn table to transport the recording medium is provided with the slip mechanism for limiting the driving force to be transmitted to move the turn table in the driving force transmission path, precise positioning can be accomplished by performing control so that the driving of the driving force is stopped after the turn table has come to a mechanical stop by abutting against other components parts at the end of its moving range.

The invention is also characterized in that the insertion/ejection mechanism is provided with an insertion/ejection roller for inserting and ejecting the recording medium.

According to the invention, the insertion/ejection of the recording medium can be performed reliably by the insertion/ejection roller.

Further, according to the invention, the insertion/ejection of the recording medium can be performed easily by the insertion/ejection roller.

The invention is also characterized in that the insertion/ejection roller is positioned in an insertion/ejection path only when inserting or ejecting the recording medium, and is positioned away from the insertion/ejection path when not inserting or ejecting the recording medium.

According to the invention, the insertion/ejection roller can be placed in the insertion/ejection path when necessary for insertion or ejection.

Further, according to the invention, the insertion/ejection roller can be brought into the insertion/ejection path when necessary for the insertion or ejection of the recording medium, and be retracted away when not necessary.

The recording media playback apparatus of the invention further comprises an accommodating mechanism installed inside the housing and capable of accommodating a plurality of recording media in a stacked array in a thickness direction thereof, the accommodating mechanism being separatable at a desired accommodating position to form a space therein, wherein the playback mechanism is also capable of moving into the space formed by separating the accommodating mechanism.

According to the invention, the accommodating mechanism capable of accommodating a plurality of recording media in a stacked array in the thickness direction thereof, and capable of being separated at a desired accommodating position to form a space therein, is contained in the housing of the recording media playback apparatus.

According to the invention, the accommodating mechanism capable of accommodating a plurality of recording media, and capable of being separated at a desired accommodating position to form a space therein, is installed inside the housing, and the plurality of recording media can thus be accommodated inside the housing of the recording media playback apparatus. The playback mechanism can also move into the space formed by separating the accommodating mechanism, and can accommodate recording media, individually inserted through the insertion/ejection slot, into the accommodating mechanism or eject the recording media accommodated in the accommodating mechanism individually through the insertion/ejection slot.

The recording media playback apparatus of the invention further comprises:

a driving source switchable between driving for selecting the accommodating position at which to separate the accommodating mechanism and driving for the insertion/ejection mechanism to perform the insertion and ejection; and a control circuit for performing control so that after the driving for selecting the accommodating position, when the recording medium is inserted in the insertion/ejection slot the driving source is switched so as to drive the insertion/ejection mechanism in the inserting direction of the recording medium and thereby draw the recording medium into the housing.

According to the invention, the accommodating mechanism capable of accommodating a plurality of recording media, and capable of being separated at a desired accommodating position to form a space therein, is disposed inside the housing of the apparatus. The accommodating into the accommodating mechanism of the recording medium inserted through the insertion/ejection slot, and the ejection through the insertion/ejection slot of the recording medium accommodated in the accommodating mechanism, can be performed by transferring the recording medium between the separated and widened space and the insertion/ejection mechanism, so that the insertion and ejection of the recording medium can be easily performed with simple control without requiring highly precise positioning, etc. Since the driving force for selecting the accommodating position and separating the accommodating mechanism and the driving force for the insertion/ejection action of the insertion/ejection mechanism are supplied from the common driving source, the number of driving sources necessary in the apparatus can be reduced, and the construction can be reduced in size by reducing the necessary space.

Further, according to the invention, since the driving force for the insertion/ejection mechanism to perform the insertion or ejection of the recording medium and the driving force for selecting one of the plurality of accommodating positions in the accommodating mechanism installed inside the apparatus can be supplied from the common driving source, the necessary mechanism inside the apparatus can be simplified, and the entire construction can thus be made compact in size.

The invention is also characterized in that the driving source is provided with a switching mechanism capable of transmitting the driving force to the insertion/ejection mechanism at all times and capable of intermittently transmitting the driving force used for the selection action of the accommodating mechanism.

According to the invention, since the switching mechanism is provided that is capable of transmitting the driving force from the common driving source to the insertion/ejection mechanism at all times and capable of intermittently transmitting the driving force used for selecting the accommodating position in the accommodating mechanism, the driving for the insertion or ejection of the recording medium can be performed without restraint by fixing the separated condition of the accommodating mechanism after selecting the accommodating position and separating the accommodating mechanism.

Further, according to the invention, since the driving force from the common driving source is made transmittable at all times to the insertion/ejection mechanism, while the driving force for the selection action of the accommodating mechanism can be interrupted, the driving for the selection action of the accommodating mechanism can be performed only when necessary and, once the selection is done, the selected condition can be held fixed.

The invention is also characterized in that the switching mechanism includes a planetary gear for interrupting the transmission of the driving force when the accommodating mechanism is separated at the selected accommodating position forming the space.

According to the invention, since the switching mechanism is constructed to interrupt the transmission of the driving force by virtue of the planetary gear, the transmission of the driving force can be disengaged reliably by displacing the planetary gear.

According to the invention, since the switching mechanism for switching the driving force for the selection action of the accommodating mechanism performs the switching so as to interrupt the transmission of the driving force while holding the accommodating mechanism in a separated condition, the insertion/ejection mechanism can be driven to handle the recording medium without restraint and without affecting the selected condition of the accommodating mechanism while the accommodating mechanism is held in the separated condition forming the space.

The invention is also characterized in that the driving source is disposed in one corner of the accommodating mechanism.

According to the invention, since the driving source for generating the driving force for selecting and separating the accommodating mechanism and for transporting the insertion/ejection mechanism is disposed in one corner of the accommodating mechanism, the driving force transmission path for the selection action of the accommodating mechanism can be made short. If the recording medium is of a disc-like shape, the driving source can be disposed by making effective use of the corner space.

Further, according to the invention, the common driving source can be disposed in a position that is advantageous for the driving for the selection action of the accommodating mechanism, and that can make effective use of the interior space of the apparatus.

The recording media playback apparatus of the invention further comprises a selection mechanism for selecting a desired. accommodating position in the accommodating mechanism, and for moving the accommodating mechanism along the direction of recording media thickness so that the selected accommodating position is substantially aligned with the inserting direction of the recording medium inserted through the insertion/ejection slot.

According to the invention, the accommodating mechanism capable of accommodating a plurality of recording media is contained in the housing. The housing is provided with the insertion/ejection slot capable of having a recording medium inserted or ejected therethrough. The accommodating mechanism has a plurality of accommodating positions in a stacked array, each capable of accommodating one recording medium, and the selection mechanism selects a desired accommodating position by moving the accommodating mechanism, which can be moved so that the selected accommodating position is substantially aligned with the inserting direction of the recording medium inserted through the insertion/ejection slot. The recording medium inserted through the insertion/ejection slot is drawn into the housing by the insertion/ejection mechanism and transferred to the playback mechanism. The playback mechanism is capable of transporting the recording medium to the accommodating position or performing information playback and/or recording on the recording medium. Since the playback mechanism also serves to transport the recording medium by moving between the insertion/ejection slot and the accommodating mechanism, there is no need to provide a separate mechanism for accommodating the recording medium into the accommodating mechanism or withdrawing the recording medium from the accommodating mechanism, and the construction can thus be reduced in size by simplifying the mechanism.

As described above, according to the invention, the selection mechanism selects the accommodating position in the accommodating mechanism, and the playback mechanism capable of performing information playback and/or recording also serves to transport the recording medium between the insertion/ejection slot and the accommodating mechanism; accordingly, the depth dimension of the housing can be reduced by simplifying the mechanism for handing the recording medium.

The invention further comprises a separating mechanism for separating the accommodating mechanism at the selected accommodating position, wherein the playback mechanism transports the recording medium into the space resulting from the separating by the separating mechanism.

According to the invention, the accommodating mechanism can be separated by the separating mechanism at the selected accommodating position, and the playback mechanism can transport the recording medium into the space created by the separating.

Further, according to the invention, when the playback mechanism transports the recording medium to or from the accommodating position in the accommodating mechanism, the accommodating mechanism is separated by the separating mechanism to create a space, facilitating the transfer of the recording medium to and from the accommodating mechanism performed by moving the playback mechanism.

The invention is characterized in that the recording medium is shaped in the form of a disc.

According to the invention, since the recording medium is of a disc-like shape, by directly transporting the recording medium for accommodating in the accommodating mechanism the dimension required in the thickness direction for accommodating one recording medium can be reduced, so that many recording media can be accommodated inside the housing with a limited thickness.

Further, according to the invention, since each recording medium of the disc-like shape can be handled directly, the dimension required in the thickness direction is reduced, making it possible to accommodate many recording media within the limited thickness of the housing.

The invention is also characterized in that the playback mechanism has a turn table for mounting the recording medium thereon for information playback, and the recording medium is transported while the recording medium is held mounted on the turn table.

According to the invention, the turn table used for mounting the recording medium thereon for information playback can also be used to transport the recording medium while holding the recording medium mounted thereon.

Further, according to the invention, the turn table used for mounting the recording medium thereon for information playback or recording can also be used to transport the recording medium.

The recording media playback apparatus of the invention further comprises:

a control circuit for controlling the selection mechanism, the insertion/ejection mechanism, and the playback mechanism so that:

the recording medium inserted through the insertion/ejection slot is drawn by the insertion/ejection mechanism, mounted on the playback mechanism, and transported to the accommodating position in the accommodating mechanism selected by movement of the selection mechanism to be accommodated therein;

the recording medium transported by the insertion/ejection mechanism or selected from the position in the accommodating mechanism by the movement of the selection mechanism is mounted on the playback mechanism for playback or recording of information; and the recording medium selected by the selection mechanism from the accommodating position in the accommodating mechanism and mounted on the playback mechanism, or the recording medium after play back or recording, is transported by the playback mechanism to the insertion/ejection mechanism to be ejected through the insertion/ejection slot by the insertion/ejection mechanism.

According to the invention, the control circuit controls the selection mechanism, the insertion/ejection mechanism, and the playback mechanism so that the recording medium, inserted through the insertion/ejection slot, can be drawn by the insertion/ejection mechanism, mounted on the playback mechanism, and accommodated into the accommodating position selected by moving the selection mechanism, so that information playback or recording can be performed on the recording medium selected from the accommodating position in the accommodating mechanism, and so that the recording medium after finishing the information playback or recording or the recording medium withdrawn from the selected accommodating position can be ejected.

Further, according to the invention, by controlling the selection mechanism, insertion/ejection mechanism, and playback mechanism, the recording medium, inserted or to be ejected, can be transported to and from the accommodating mechanism, and the individually inserted recording medium can be played back or transported for ejection after playback. In particular, since the individually inserted recording medium can be played back without first having to accommodate it in the accommodating mechanism, the time required from the insertion to the playback can be reduced.

The recording media playback apparatus of the invention further comprises:

a swiveling mechanism capable of being swivelled about its base end with the playback mechanism mounted on its swiveling end; and a moving mechanism for rectilinearly moving the swiveling mechanism.

According to the invention, the accommodating mechanism installed inside the housing is capable of accommodating a plurality of recording media in a stacked array and capable of being separated at a desired accommodating position. The playback mechanism for mounting the recording medium thereon for information playback or recording is supported on the swiveling mechanism so as to be displaced angularly, and is moved rectilinearly by the moving mechanism. Since the playback mechanism is constructed to move in and out of the accommodating mechanism by combining the angular displacement with the rectilinear movement, the housing can be reduced in size by making effective use of its interior space.

According to the invention, since the movement of the playback mechanism moving in and out of the accommodating mechanism is accomplished by combining the angular displacement with the rectilinear movement, greater freedom can be provided for the arrangement of the playback mechanism inside the housing, making it possible to reduce the size of the housing.

The invention is also characterized in that after the swiveling by the swiveling mechanism, the playback mechanism is moved rectilinearly by the moving mechanism to enter the space formed by separating the accommodating mechanism.

According to the invention, since the playback mechanism can be moved rectilinearly into the space formed by separating the accommodating mechanism, the playback mechanism can be moved into the separating space, for example, by aligning the direction of movement with the inserting direction of the recording medium in the accommodating mechanism.

Further, according to the invention, since the playback mechanism is first displaced angularly and then moved rectilinearly into the space formed by separating the accommodating mechanism, the angular displacement range of the swiveling mechanism can be reduced so that the playback mechanism can be supported stably on the swiveling mechanism.

The invention is also characterized in that the playback mechanism transports the recording media between the insertion/ejection slot and the accommodating mechanism by being moved rectilinearly by the moving mechanism.

According to the invention, since the playback mechanism can transport recording media between the insertion/ejection slot of the housing and the accommodating mechanism by moving rectilinearly therebetween, the recording media can be inserted or ejected one at a time, and the mechanism necessary for the transportation of recording media can thus be simplified.

Further, according to the invention, since the recording media are transported using the playback mechanism, the mechanism necessary for the transportation can be simplified, and the entire construction can thus be made compact.

The invention is also characterized in that the accommodating mechanism is disposed spaced away from the insertion/ejection slot, and in that the swiveling mechanism sets the playback mechanism at a position aligned with the center of the recording medium inserted through the insertion/ejection slot.

According to the invention, the playback mechanism can be moved by the swiveling mechanism to the position aligned with the center of the recording medium inserted through the insertion/ejection slot, and can transport the recording medium in rectilinear fashion to the accommodating mechanism for accommodating therein.

Further, according to the invention, since the playback mechanism is moved by angular displacement to the position aligned with the center of the recording medium inserted through the insertion/ejection slot, the inserted recording medium can be received on the playback mechanism for transportation.

The invention is also characterized in that when separating the accommodating mechanism, the playback mechanism is moved by the swiveling mechanism and the moving mechanism away from the moving range of the recording media accommodated in the accommodating mechanism.

According to the invention, when separating the accommodating mechanism, the playback mechanism is moved by the swiveling mechanism and moving mechanism away from the range over which the recording media accommodated in the accommodating mechanism move with the separating action; accordingly, the relative positioning between the playback mechanism and the accommodating mechanism can be changed freely, so that the interior space of the housing can be utilized effectively.

Further, according to the invention, since the playback mechanism is moved away from the moving range of the recording media accommodated in the accommodating mechanism when separating the accommodating mechanism, the accommodating mechanism can be separated at any desired accommodating position and, by moving the playback mechanism into the space created by the separating, the selected recording medium can be transported or played back.

The invention is also characterized in that:
the moving mechanism has a moving member supported on a base member supported on the housing, and movable in the inserting or ejecting direction of the recording medium;
the swiveling mechanism has a swiveling member whose base end is supported in angularly displaceable fashion on a base shaft protruding from the moving member, and on whose swiveling end the playback mechanism is supported; and
the base member has a movement guiding portion for guiding the base shaft so as to perform the rectilinear movement, and the moving member has a swiveling motion guiding portion for guiding a swiveling motion when the swiveling member swivels about the base shaft on the moving member.

According to the invention, the moving mechanism is constructed with the base member and the moving member. The moving member is supported on the base member, and is movable in the inserting or ejecting direction of the recording medium.

The swiveling mechanism is supported at its base end in angularly displaceable fashion on the base shaft protruding from the moving member. The playback mechanism is supported on the swiveling end of the swiveling member. The base member includes the movement guiding portion for guiding the base shaft of the swiveling member so as to move rectilinearly in the inserting or ejecting direction of the recording medium, and the moving member includes the swiveling motion guiding portion for guiding the swiveling motion when the swiveling member swivels about the base shaft on the moving member. With the angular displacement of the swiveling member about the base shaft, the playback mechanism can be moved in swiveling fashion, and with the rectilinear movement of the moving member relative to the base member, the playback mechanism supported on the swiveling end of the swiveling mechanism can be moved in rectilinear fashion.

Further, according to the invention, the swiveling mechanism and the moving mechanism can be constructed by combining the swiveling member, moving member, and base member.

The invention is also characterized in that the movement guiding portion is substantially L-shaped in form consisting of a first guide portion extending in the inserting or ejecting direction of the recording medium and a second guide portion continuing from one end of the first guide portion and extending in a prescribed angular direction from the first guide portion, and in that the swiveling motion guiding portion is formed in the moving member in an arc shape.

According to the invention, the movement guiding portion is substantially L-shaped in form and, with the first guide portion extending in the inserting or ejecting direction of the recording medium, the playback mechanism can be moved into the space formed by separating the accommodating mechanism, by aligning the direction of movement with the inserting direction of the recording medium. Since the swiveling motion guiding portion is formed in an arc shape, the angular displacement of the playback mechanism can be performed smoothly by combining the action of the swiveling motion guiding portion with the second guide portion of the movement guiding portion.

Further, according to the invention, the angular displacement and rectilinear movement of the playback mechanism can be performed smoothly by using the substantially L-shaped movement guiding portion formed in the base member and the arc-shaped swiveling motion guiding portion formed in the moving member.

The invention is also characterized in that the moving mechanism has a transmission mechanism for transmitting the driving force for the movement, and the transmission mechanism contains a slip portion for limiting the driving force.

According to the invention, the transmission mechanism of the moving mechanism includes the slip portion for limiting the driving force being transmitted for the movement; accordingly, when resistance to the movement of the playback mechanism increases, the separated portion acts to disengage the transmission of the driving force, so that the playback mechanism can stop reliably at the predetermined position.

Further, according to the invention, since the separated portion for limiting the driving force is provided in the transmission mechanism transmitting the driving force for driving the moving mechanism, when resistance to the movement increases with the playback mechanism reaching a mechanical stop, the separated portion acts to disengage the transmission of the driving force, and the playback mechanism can thus be moved reliably to its stop position.

The invention is also characterized in that the driving mechanism drives both sides of the moving member by dividing the driving force from a common driving source between the two sides.

According to the invention, since the moving member is driven from both sides thereof with the driving force from the common driving source divided between the two sides, the rectilinear movement of the moving member relative to the base member, substantially free from unbalancing, can be accomplished.

Further, according to the invention, since the transmission mechanism drives the moving member relative to the base member with the driving force from the same driving source divided between both sides of the moving direction of the moving member, the moving member can be moved rectilinearly by substantially preventing uneven distribution of the driving force between the two sides.

The invention is also characterized in that the transmission mechanism, after dividing the driving force, transmits the driving force to driving positions on both sides of the moving member via mechanisms of identical construction.

According to the invention, since the driving force for moving the moving member relative to the base member is transmitted via the transmission mechanism having mechanisms of identical construction on both sides, the driving force is applied evenly to both sides so that the moving member can be moved smoothly without being unbalanced to one side or the other.

Further, according to the invention, since the driving force from the same driving source is transmitted to both sides of the moving member by the transmission mechanism having mechanisms of identical construction on both sides, the moving member can be driven evenly to accomplish smooth rectilinear movement.

The recording media playback apparatus of the invention further comprises a floating mechanism for holding the playback mechanism in a floating condition within the housing when the playback mechanism performs information playback and/or recording on the recording medium.

According to the invention, the recording media playback apparatus contains in its housing an accommodating mechanism capable of accommodating a plurality of recording media. The accommodating mechanism is separatable at a selected accommodating position, and the playback mechanism which performs information playback and/or recording on the recording medium mounted thereon can be moved into the space formed by the separating. When performing playback and/or recording on the recording medium, the playback mechanism is held by the floating mechanism in such a manner as to float inside the housing. This substantially isolates the playback mechanism from vibrations and shocks transmitted from outside the housing, preventing positional displacements, etc. during operation and thereby allowing the playback and/or recording to be performed without interruption. Since the floating mechanism need only be configured to be able to hold the playback mechanism in a floating condition, the necessary space can be reduced and the entire construction of the apparatus can be made compact, compared with the construction configured to hold the entire internal mechanism of the housing in a floating condition.

According to the invention, the accommodating mechanism is capable of accommodating a plurality of recording media inside the housing, and is separatable at the selected accommodating position. The playback mechanism can be moved into the space formed by separating the accommodating mechanism and can perform recording media playback and/or recording.

Since the floating mechanism elastically supports the playback mechanism to hold it floating, the effects of vibrations and shocks transmitted from outside the housing can be reduced to prevent interference from being caused to the recording media playback and/or recording. Since it is only necessary to hold the playback mechanism in a floating condition, the space necessary for accomplishing the floating by the floating mechanism can be reduced, thus achieving a reduction in the size of the housing.

The invention is also characterized in that the accommodating mechanism is separated by a separating mechanism which enters the desired-accommodating position and widens a gap to form the space.

According to the invention, the accommodating mechanism can be separated at the desired accommodating position to allow the playback mechanism to enter the created space.

Further, according to the invention, the accommodating mechanism is separated at the desired accommodating position, so that it is possible to playback and/or record information on the the recording medium accommodated therein.

The recording media playback apparatus of the invention further comprises:

a support base supporting the playback mechanism thereon and having a moving mechanism for entering the space formed by separating the accommodating mechanism, the support base being supported by the floating mechanism in a floating condition with respect to the housing; and a lock mechanism moving relative to the support base for restraining the floating condition by restraining the support base to the housing except when the playback mechanism performs recording media playback and/or recording.

According to the invention, the lock mechanism is moved relative to the support base having the moving mechanism for moving the playback mechanism into the space formed by separating the accommodating mechanism, the lock mechanism acting to restrain the floating condition of the support base with respect to the housing except when the playback mechanism performs recording media playback and/or recording. With the provision of this lock mechanism, the playback mechanism can be securely held restrained to the housing, except when performing playback and/or recording.

Further, according to the invention, the floating mechanism can easily restrain the displacement of the support base relative to the housing mechanically by moving relatively to the support base supporting the playback mechanism.

The invention is also characterized in that:

the support base includes a lock shaft and an engaging member spaced apart from each other and protruding toward the lock mechanism; and the lock mechanism includes a first restrainer which, with the movement of the lock mechanism, restrains displacements of the lock shaft in the same direction as the direction of the movement, and a second restrainer which engages with the engaging member and restrains displacements perpendicular to the direction of the movement.

According to the invention, the lock shaft and the engaging member are provided spaced apart from each other and protruding from the support base toward the lock mechanism. The lock mechanism includes the first restrainer and second restrainer. With the movement of the lock mechanism, the first restrainer restrains displacements of the lock shaft in the same direction as the direction of the movement. The second restrainer engages with the engaging member and restrains displacements perpendicular to the direction of the movement.

Since, with the movement of the lock mechanism, the support base is restrained to the housing in the moving direction of the lock mechanism as well as in the direction perpendicular to it, the playback mechanism movable relative to the support base by the moving mechanism can also be restrained to the housing by the lock mechanism.

Further, according to the invention, since the lock shaft and engaging member provided spaced apart from each other and protruding from the support base toward the lock mechanism are restrained by the first and second restrainers of the lock mechanism, displacements in the same direction as the moving direction as well as in the direction perpendicular to it can be securely restrained.

The invention is also characterized in that:

the lock mechanism includes a lock member which makes the movement, and which is formed in a substantially plate-like shape extending along the same direction as the direction of the movement; and the lock member has as the first restrainer a slot through which the lock shaft is inserted, and which has a shape elongated in the direction of the movement and decreasing in width from a start point toward an endpoint in the direction of the movement until the width becomes substantially equal to the outer diameter of the lock shaft, and as the second restrainer an engaging portion which engages with the engaging member at the end point in the direction of the movement.

According to the invention, in the lock mechanism, the lock member formed in a plate-like shape extending along the same direction as the direction of the movement, and having the first and second restrainers, is moved to restrain the support base. The lock member has a slot as the first restrainer through which the lock shaft is inserted, and which has a shape elongated in the direction of the movement and decreasing in width from the start point toward the end point in the direction of the movement until the width becomes substantially equal to the outer diameter of the lock shaft. The lock shaft can be easily inserted in the slot at the start point before the lock member moves. By moving the lock member, the lock shaft inserted through the start point portion of the slot is guided into the end point where the slot width is substantially equal to the outer diameter of the lock shaft, and the movement of the lock member can thus be restrained. The second restrainer engages with the engaging member at the end point in the direction of the movement, and thus restrains displacements in the direction perpendicular to the direction of the movement. In this way, the support base is immobilized relative to the housing by being restrained in the same direction as the direction of the movement as well as in the direction perpendicular to it so that the floating condition is cancelled.

Further, according to the invention, when the plate-like lock member is moved, the first restrainer, through which the lock shaft is inserted, and which has a shape elongated in the direction of the movement and decreasing in width from the start point toward the endpoint in the direction of the movement, restrains the base support in the same direction as the direction of the movement, while the engaging portion engages with the engaging member at the endpoint in the direction of the movement to restrain displacements in the direction perpendicular to the direction of the movement; accordingly, with the movement of the engaging member, restraints can be imposed in the same direction as the direction of the movement as well as in the direction perpendicular to it.

The invention is also characterized in that:

the engaging member includes an engaging portion formed in spaced apart relation from the support base;

the second restrainer of the lock member is so formed as to engage with the engaging member at the end point in the direction of the movement; and the first restrainer of the lock member includes a lock lever which restrains the lock shaft by being displaced in a direction different from the direction of the movement in interlocking fashion with the movement of the lock member.

According to the invention, the engaging member includes an engaging portion formed in spaced apart relation from the support base, and the lock member engages with the engaging portion at the end point in the direction of the movement to restrain displacements in the direction perpendicular to the direction of the movement. As for displacements in the same direction as the direction of the movement, the lock shaft is restrained by the first restrainer of the lock member, and furthermore, the movement of the lock shaft is restrained by the lock lever of the lock member; in this way, displacements can be reliably restrained in a plane parallel to the moving direction of the lock member.

Further, according to the invention, since the movement of the lock shaft protruding from the support base toward the lock mechanism is restrained not only by the first restrainer of the lock member but also by the lock lever, displacements in a plane parallel to the direction of the movement can be restrained reliably. On the other hand, the second restrainer of the lock member engages with the engaging portion formed in spaced apart relation from the support base, so that the support base can be restrained to the housing at a position where high accuracy is obtained.

The invention is also characterized in that the lock mechanism restrains the floating condition in interlocking fashion with the separating of the accommodating mechanism when a state to perform playback and/or recording on the recording medium is entered.

According to the invention, when the accommodating mechanism is separated, and the playback mechanism is moved to enter the state to perform playback and/or recording on the recording medium, the lock mechanism restrains the floating condition in interlocking fashion with the separating of the accommodating mechanism; accordingly, during the movement, etc. of the playback mechanism, the restrained condition can be maintained to prevent the positional relationship of the playback mechanism relative to other parts from changing.

Further, according to the invention, since the lock mechanism restrains the floating condition in interlocking fashion with the separating of the accommodating mechanism when the playback mechanism is set to the state to perform playback and/or recording on the recording medium, the restrained condition can be maintained during the movement, etc. of the playback mechanism to enhance the accuracy of the relative positioning inside the housing and ensure reliable transportation and handling of the recording medium.

The invention is also characterized in that the floating mechanism supports the playback mechanism at a plurality of places located in such a manner as to encircle portions where the lock mechanism restrains the support base.

According to the invention, since the floating mechanism supports the support base in a floating condition with respect to the housing at places encircling the portions where the lock mechanism is provided, an elastic support can be provided to the support base effectively and evenly.

Further, according to the invention, the support base can be elastically supported in a floating condition while maintaining a stable attitude relative to the housing.

BRIEF DESCRIPTION OF THE DRAWINGS

Other and further objects, features, and advantages of the invention will be more explicit from the following detailed description taken with reference to the drawings wherein:

FIG. 35A is a left-side view of a PU lifting slide plate 130 for moving the PU unit 25 of FIG. 1 up and down;

FIG. 35B is a left-side view showing the construction of a side plate 160 of the chassis 50 shown in FIG. 1;

FIG. 44 is a perspective view of the lock mechanism 31 of FIG. 31;

FIG. 47 is a perspective view of a lock member 133 shown in FIG. 31;

FIG. 48A is a perspective view of a lock release lever 139 shown in FIG. 31;

FIG. 48B is a perspective view of an interlocking lever 135 shown in FIG. 31;

FIG. 48C is a perspective view of a lock lever 134 shown in FIG. 31;

FIG. 53 is a timing chart illustrating the operation of a control circuit 29 of FIG. 52;

FIG. 54 is a timing chart illustrating the operation of the control circuit 29 of FIG. 52;

FIG. 57 is a timing chart illustrating the operation of the control circuit 29 of FIG. 52;

FIG. 58 is a timing chart illustrating the operation of the control circuit 29 of FIG. 52;

FIG. 60 is a timing chart illustrating the operation of the control circuit 29 of FIG. 52;

FIG. 61 is a timing chart illustrating the operation of the control circuit 29 of FIG. 52;

FIG. 62 is a timing chart illustrating the operation of the control circuit 29 of FIG. 52;

FIG. 63 is a timing chart illustrating the operation of the control circuit 29 of FIG. 52;

FIG. 64 is a timing chart illustrating the operation of the control circuit 29 of FIG. 52;

FIG. 65 is a timing chart illustrating the operation of the control circuit 29 of FIG. 52;

FIG. 67 is a timing chart illustrating the operation of the control circuit 29 of FIG. 52;

FIG. 68 is a timing chart illustrating the operation of the control circuit 29 of FIG. 52;

FIG. 69 is a timing chart illustrating the operation of the control circuit 29 of FIG. 52;

FIGS. 70 to 72 are timing charts illustrating the operation of the control circuit 29 of FIG. 52;

DETAILED DESCRIPTION OF THE PREFERRED EMBODIMENTS

Figure 1:
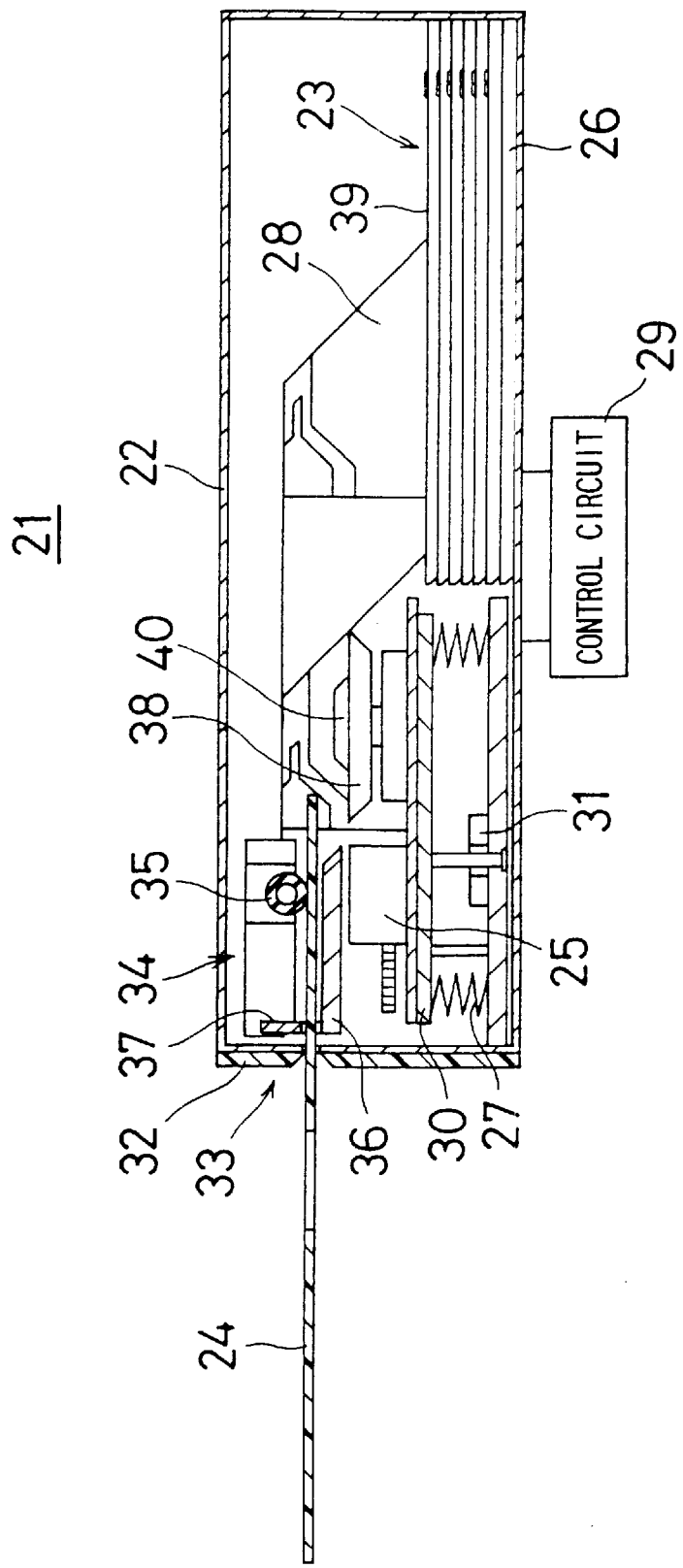
FIG. 1 is a sectional side elevational view showing schematically the construction of a CD playback apparatus 21 according to one embodiment of the present invention.

Now referring to the drawings, preferred embodiments of the invention are described below.

FIG. 1 is a diagram showing diagrammatically the overcall construction of an automotive CD playback apparatus 21 which can be equipped with an autochanger facility according to one embodiment of the present invention. A housing 22 is constructed conforming to the standard size as vehicle-mounted equipment, known as 1DIN, that is, about 18 cm in width, about 5 cm in thickness, and about 17 cm in depth. The housing 22 is installed on a dashboard of an automobile, or the like, so that the thickness direction becomes substantially equal to the vertical direction.

Inside the housing 22 is installed a stocker 23 as an accommodating mechanism which is capable of accommodating up to six disk-shaped recording media or CDs 24. Each CD 24 has a diameter of about 12 cm and a thickness of about 1.2 mm, and can be played back by a PU unit 25 which serves as a playback mechanism. The entire construction of the stocker 23 can be moved up and down by means of a lifting mechanism 26 which serves as a selection mechanism. A floating mechanism 27 supports the PU unit 25 in a mechanically floating condition with respect to other parts so that the PU unit 25 can be substantially isolated from external vibrations and shocks when the CD 24 mounted thereon is being played back. When one accommodating position is selected by the lifting mechanism 26, the stocker 23 is separated between top and bottom by a separating mechanism 28 to provide a space between the acccommodating positions above and below the separating position. On one side of the housing 22 are disposed an electronic circuit board, etc. containing a control circuit 29 for controlling the movements of the various parts.

The PU unit 25 is mounted displaceably on a slide base 30 which is supported on the bottom of the housing 22. The slide base 30 can be held by the floating mechanism 27 in such a manner as to float mechanically from the bottom of the housing 22. The control circuit 29 performs control so that the floating by the floating mechanism 27 is restrained by a lock mechanism 31, except when playing back CD 24, to prevent the PU unit 25 from swaying independently of other parts in the housing 22.

An insertion/ejection slot 33 as an opening through which the CD 24 is inserted or ejected is formed in a front panel 32 which serves as the operation panel of the housing 22. Within the housing 22, an insertion/ejection mechanism 34 is provided adjacent to the insertion/ejection slot 33. The insertion/ejection mechanism 34 includes an insertion/ejection roller 35 and a supporting plate 36. The CD 24 being inserted or ejected through the insertion/ejection slot 33 is mounted on the supporting plate 36 and transported in the direction of insertion or ejection by the rotation of the transport roller 35. When the CD 24 is being transported or played back inside the housing 22, the insertion/ejection slot 33 is closed by a shutter mechanism 37 constituting an open/close mechanism.

Further, the CD 24 inserted into the housing 22 is positioned in place by being moved in the reverse direction, i.e., in the direction of ejection, until it hits the shutter mechanism 37.

In the condition shown in figure, the turn table 38 of the PU unit 25 is on standby in its reference position and is ready to receive the CD 24 inserted through the insertion/ejection slot 33 when the CD is positioned in place. The stocker 23 is constructed by stacking holders 39 one on top of another, each capable of holding one CD 24. The turn table 38 is provided with a chucking mechanism 40 for holding the CD 24.

Figure 2:
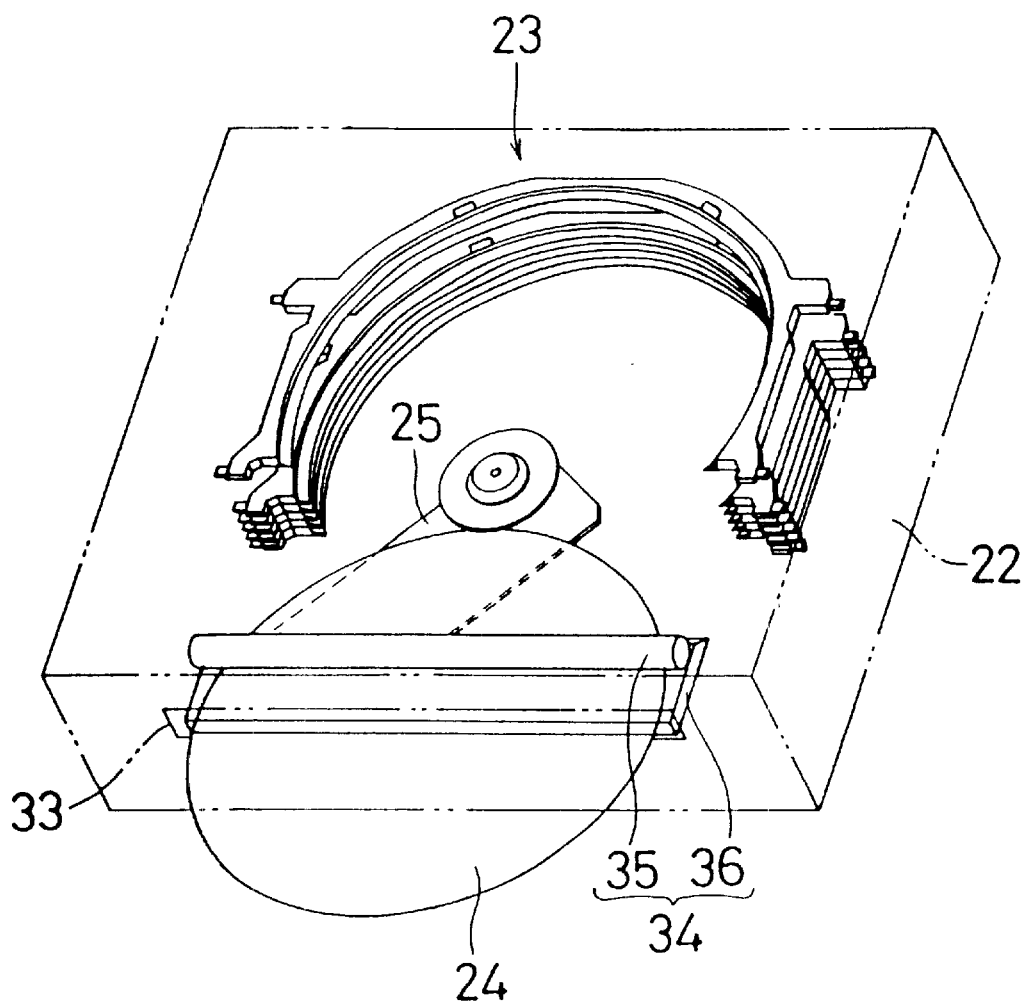
FIG. 2 is a schematic perspective view showing a CD 24 being inserted in the CD playback apparatus 21 of FIG. 1.
Figure 3:
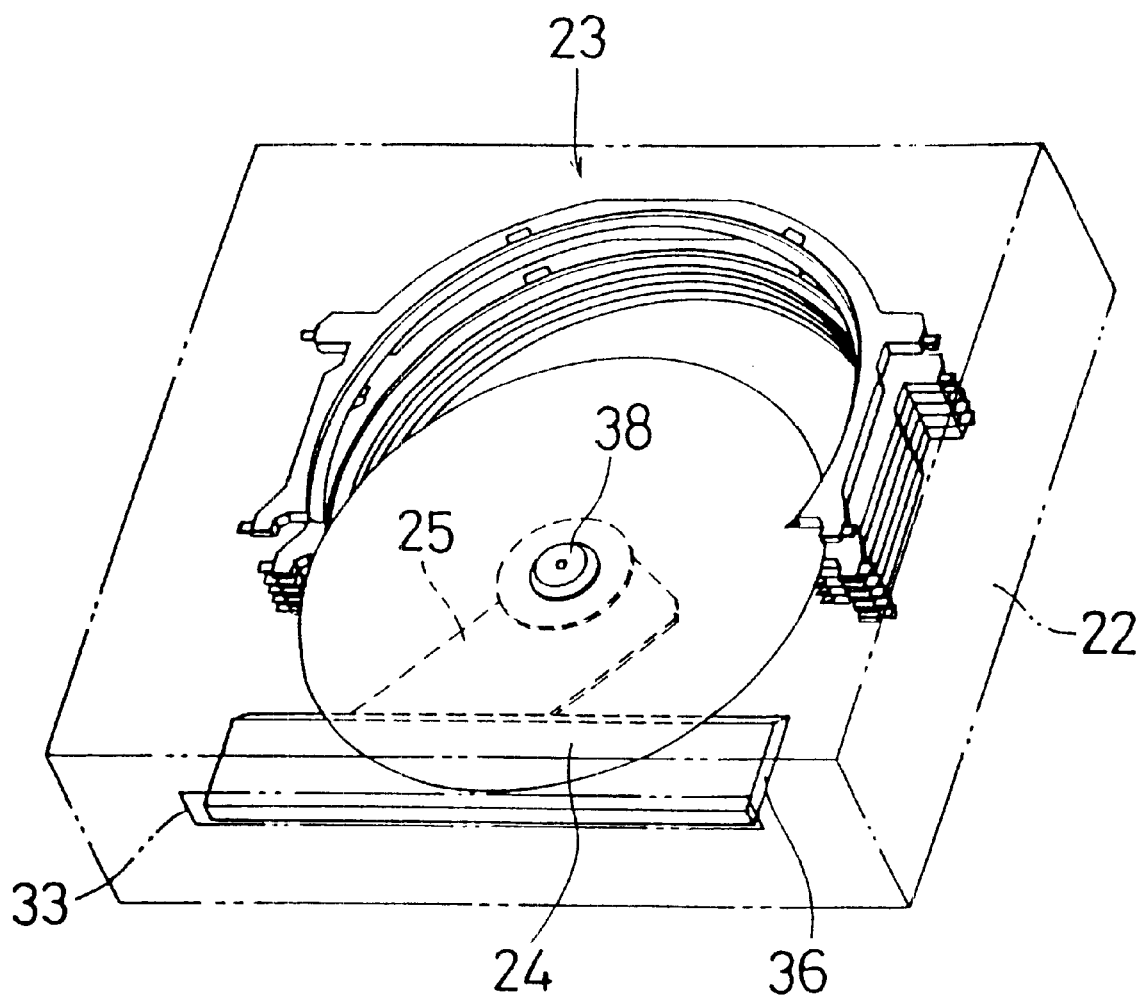
FIG. 3 is a simplified perspective view showing the CD 24 being played back in the CD playback apparatus 21 of FIG. 1.
Figure 4:
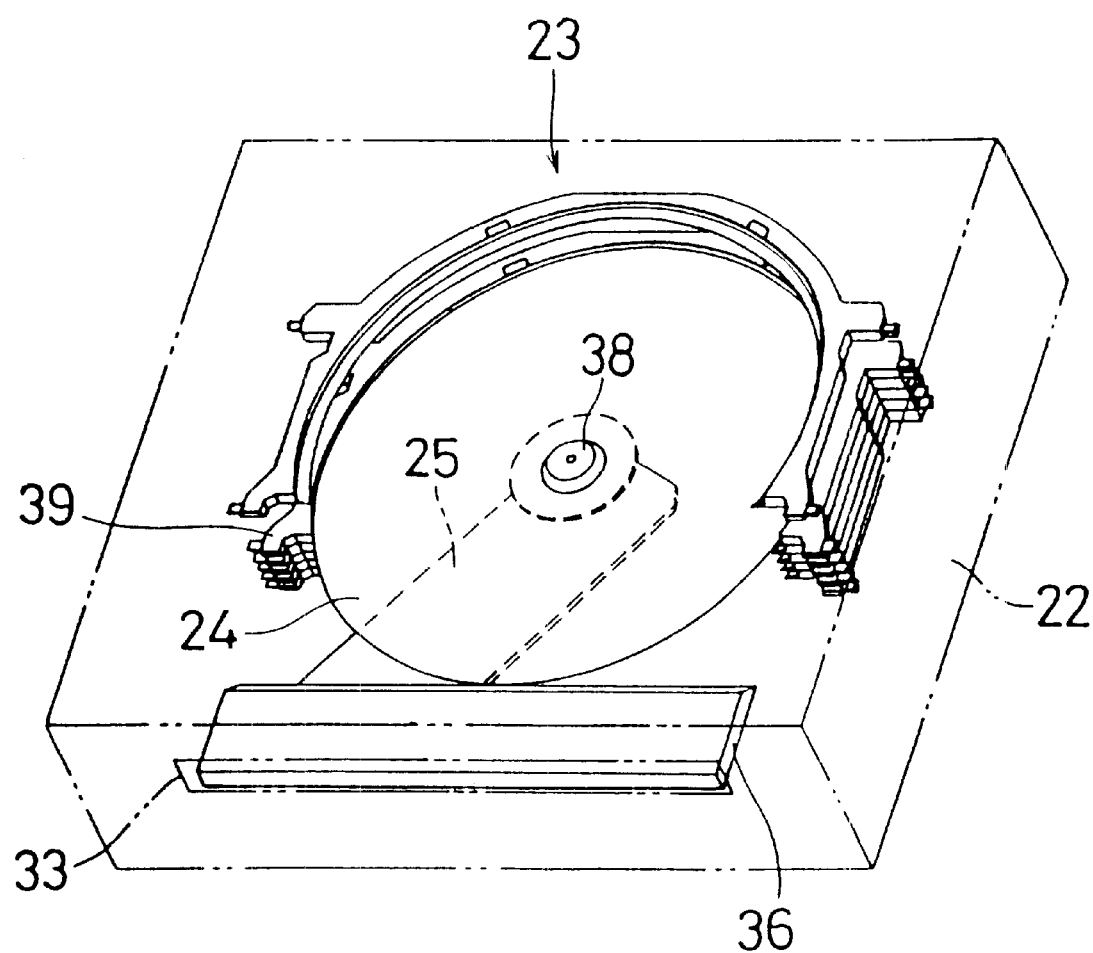
FIG. 4 is a simplified perspective view showing a plurality of CDs 24 being accommodated in the CD playback apparatus 21 of FIG. 1.

FIGS. 2, 3, and 4 are simplified schematic diagrams showing how the CD 24 is inserted and played back in the CD playback apparatus 21 shown in FIG. 1 and how it is accommodated in the stocker 23. FIG. 2 shows the CD 24 being inserted through the insertion/ejection slot 33 of the housing 22 and drawn into the housing 22 by being sandwiched between the insertion/ejection roller 35 and supporting plate 36 of the insertion/ejection mechanism 34. When the CD 24 has been drawn the housing 22, the shutter mechanism 37 in FIG. 1 closes the insertion/ejection slot 33 to prevent a new CD 24 from being inserted. Once the CD 24 has been drawn into the housing 22, the insertion/ejection roller 35 rotates in the reverse direction to push back the CD 24 until it is stopped by the shutter mechanism 37. Thus, it can be ensured to position the CD 24 at a correct position, that is, immediately inside the insertion/ejection slot 33.

FIG. 3 shows the condition in which the PU unit 25 moves upward from its standby position, mounts the thus positioned CD 24 on the turn table 38 by chucking, and moves into the separating space within the stocker 23. It is also possible to play back the inserted CD 24 by the PU unit 25 in this condition.

FIG. 4 shows the condition in which the CD 24 mounted on the turn table 38 is being transferred from the PU unit 25, which has moved into the space within the stocker 23, to a holder 39 in the stocker 23. The holder 39, which is placed in a standby position below the CD 24 mounted and transported on the turn table 38, moves upward and removes the CD 24 from the turn table 38 by lifting the circumferential edge of the CD 24. On the other hand, when a CD 24 accommodated in the stocker 23 is to be transferred onto the turn table 38 of the PU unit 25 for ejection, the holder 39 holding the CD 24 moves downward and transfers the CD 24 held thereon onto the turn table 38. When accommodating the CD 24 into the stocker 23, the PU unit 25 from which the CD 24 has been transferred onto the holder 39 is moved out of the space in the stocker 23. When ejecting the CD 24, the PU unit 25 on which the CD 24 received from the holder 39 in the stocker 23 is mounted is withdrawn and the CD 24 is transferred onto the insertion/ejection mechanism 34.

Figure 5A:
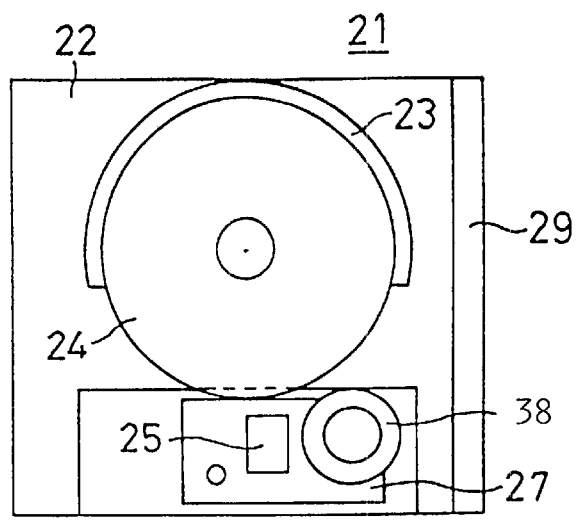
FIGS. 5A to 5C are cross sectional plan views showing, in simplified form, basic operating conditions of the CD playback apparatus 21 according to one aspect of the present invention.
Figure 5B:
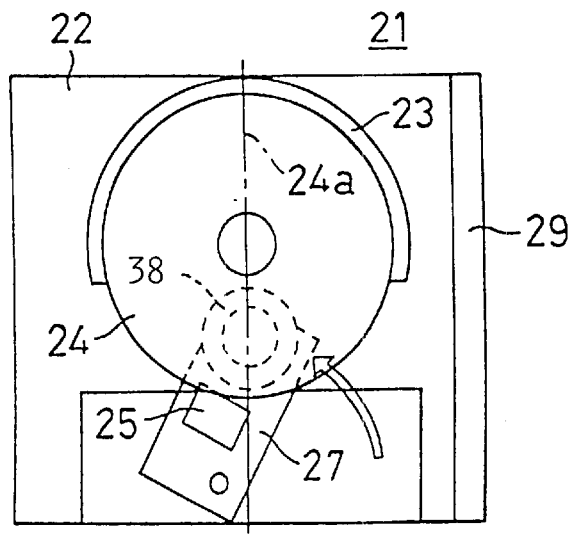
Figure 5C:
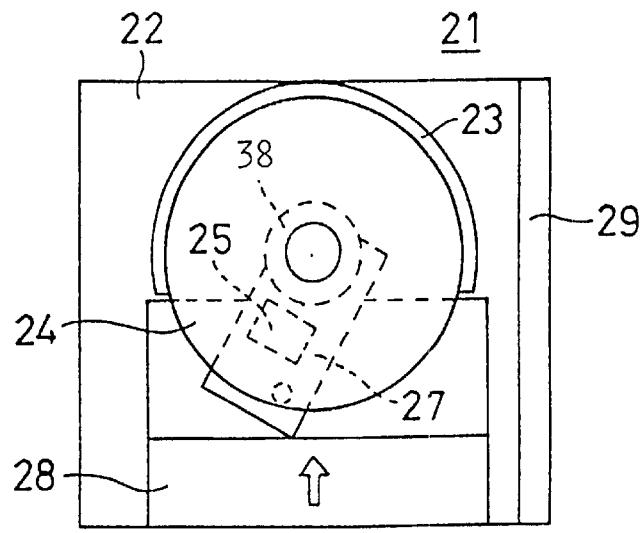

FIGS. 5A, 5B, and 5C are schematic plan views showing operating conditions of the CD playback apparatus 21. Inside the housing 22 of the CD playback apparatus 21, a plurality of CDs 24 can be accommodated in the stocker 23. In the stocker 23, the CDs 24 are accommodated in a stacked array in the thickness direction and are separable in the thickness direction at a desired acccommodating position. The separation results in the formation of a space into which the turn table 38 of the PU unit 25 can be moved by combining an arc-like motion of a swiveling arm 27 with a rectilinear movement of a moving mechanism.

FIG. 5A shows the condition in which the turn table 38 is retracted outside the moving range of the CDs 24 accommodated in the stocker 23. FIG. 5B shows the condition in which by the swiveling motion of the swiveling arm 27 the turn table 38 is moved to its standby position on a center line 24a passing through the center of the CD 24 inserted from outside the housing 22. FIG. 5C shows the condition in which the CD 24 is held on the turn table 38 and moved into the space created by separating stocker 23. Transitions between the conditions shown in FIGS. 5A, 5B, and 5C are controlled by the control circuit 29 disposed on one side of the housing 22.

Figure 6A:
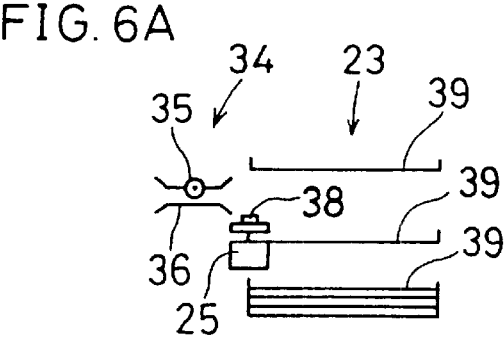
FIGS. 6A to 6H are simplified cross sectional side views showing a sequence of operations for inserting a CD 24 in the CD playback apparatus 21 of the embodiment of FIG. 1.

FIGS. 6A to 6H, FIGS. 7A to 7F, FIGS. 8A to 8F, FIGS. 9A to 9I, and FIGS. 10A to 10L are simplified schematic diagrams showing how the CD 24 is inserted, ejected, accommodated, played, back, and changed in the CD playback apparatus 21 of the present embodiment. FIG. 6A shows an insertion standby condition. In the insertion/ejection mechanism 34, the insertion/ejection roller 35 is lowered, ready to draw in the CD 24 when inserted.

In the stocker 23, all the holders located below the holder 39 corresponding to the selected acccommodating position are moved down to create a space therebetween, while all the holders located above the selected holder 39 are moved up. The CD 24 will be moved into the space created between the selected holder 39 and the holders located above it. The PU unit 25 is on standby in the standby position near the exit of the insertion/ejection mechanism 34.

Figure 6E:
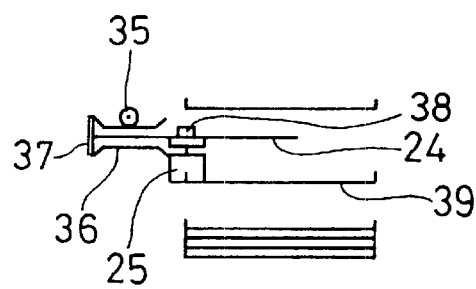
Figure 6B:
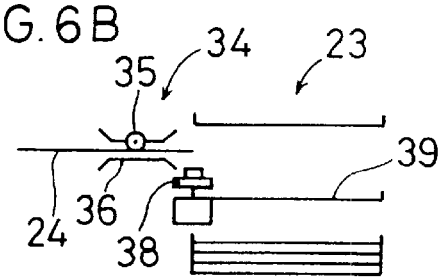
Figure 6F:
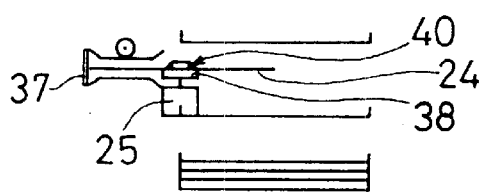
Figure 6C:
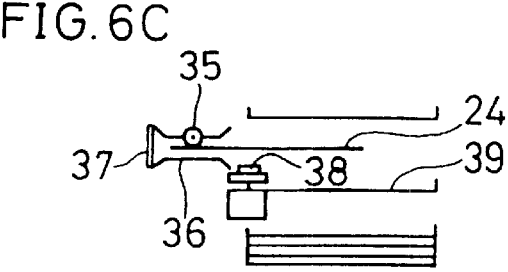
Figure 6G:
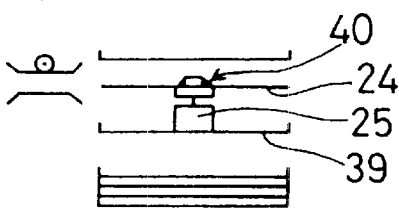
Figure 6D:
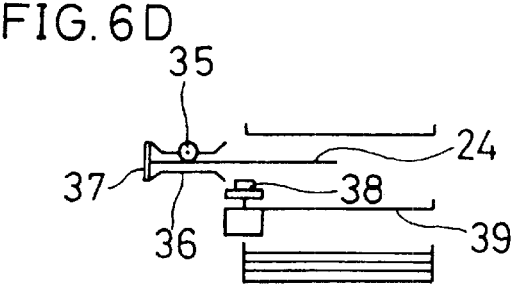

FIG. 6B shows the condition in which the user of the CD playback apparatus 21 has inserted one CD 24 in the insertion/ejection slot 33 in FIG. 1. The insertion/ejection roller 35 of the insertion/ejection mechanism 34 first draws the inserted CD 24 into the housing 22, as shown in FIG. 6C, and then rotates in the reverse direction to position the CD 24, as shown in FIG. 6D. After the CD 24 has been drawn, as shown in FIG. 6C, the shutter mechanism 37 in FIG. 1 is closed.

When the CD 24 is moved in the reverse direction, as shown in FIG. 6D, the rear edge of the CD 24 stops abutting the shutter mechanism 37 in FIG. 1, and the CD is thus positioned in place.

When the CD 24 has been positioned as shown in FIG. 6D, the PU unit 25 moves upward and receives the CD 24 by holding it on the turn table 38, as shown in FIG. 6E. The chucking mechanism 40 provided on the turn table 38 is activated to clamp the CD 24 onto the turn table 38, as shown in FIG. 6F. Next, the PU unit 25 is moved in the direction of insertion, drawing the CD 24 out of the insertion/ejection mechanism 34 and transporting it into the stocker 23, as shown in FIG. 6G; then, in the PLAY condition as shown in FIG. 6H, the lock mechanism 31 in FIG. 1 is released, allowing the PU unit 25 to be supported on the floating mechanism 27 in a mechanically floating fashion, and in this condition, information is played back from the CD 24.

Figure 6H:
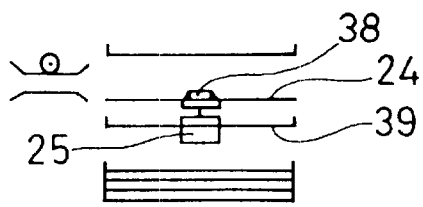
Figure 7A:
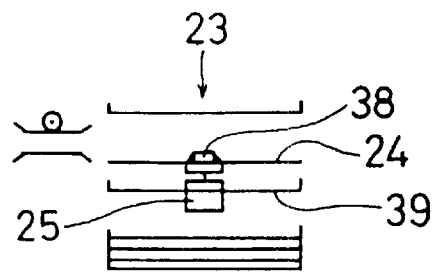
FIGS. 7A to 7F are simplified side views showing a sequence of operations for ejecting an accommodated CD 24 in the CD playback apparatus 21 of FIG. 1.
Figure 7B:
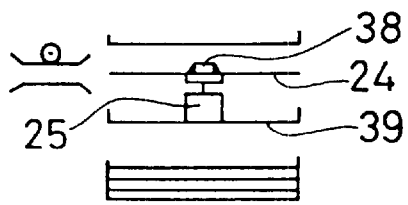
Figure 7C:
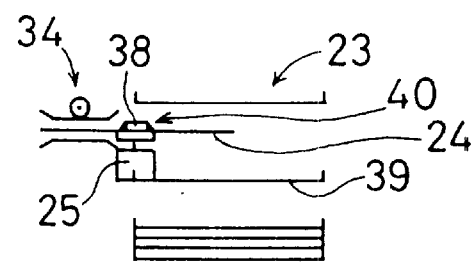
Figure 7D:
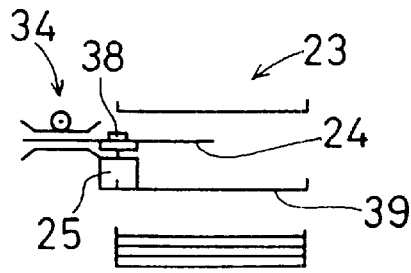
Figure 7E:
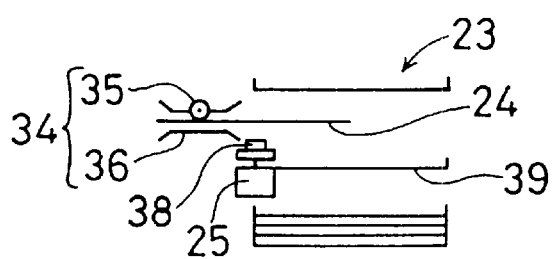
Figure 7F:
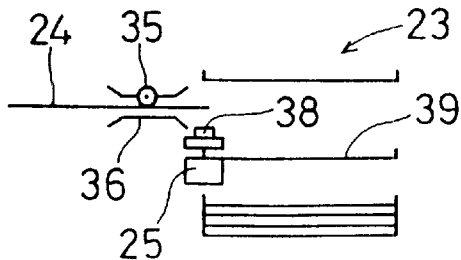

FIGS. 7A to 7F illustrate a sequence of operations for ejecting the CD 24 from the playback condition shown in FIG. 6H. In the playback condition in FIG. 7A, the lock mechanism 31 in FIG. 1 is in an unlocked condition, but in FIG. 7B, the lock mechanism 31 in FIG. 1 is activated to restrain the floating condition provided by the floating mechanism 27 in FIG. 1. In FIG. 7C, the PU unit 25 is moved away from the inside of the stocker 23 to the standby position near the exit of the insertion/ejection mechanism 34. In FIG. 7D, the chucking mechanism 40 is activated to unclamp the CD 24 from the turn table 38. In FIG. 7E, the PU unit moves down into the standby position, while at the same time, the insertion/ejection roller 35 of the insertion/ejection mechanism 34 lowers, thus holding the CD 24 between the insertion/ejection roller 35 and the supporting plate 36. In this way, the CD 24 is transferred from the PU unit 25 to the insertion/ejection mechanism 34. In FIG. 7F, the insertion/ejection roller 35 rotates to eject the CD 24. The ejection operation is stopped when the CD 24 is ejected partway through the insertion/ejection slot 33 in FIG. 1, thus allowing the user of the CD playback apparatus 21 to draw out the CD 24.

Figure 8A:
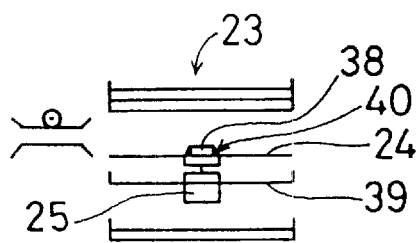
FIGS. 8A to 8F are simplified side views showing a sequence of operations for transporting a CD 24 into an accommodating position after playback in the CD playback apparatus 21 of FIG. 1.
Figure 8B:
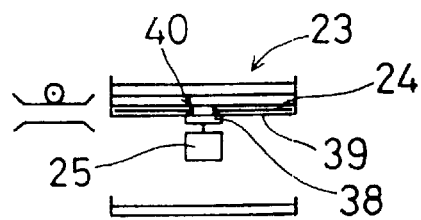
Figure 8C:
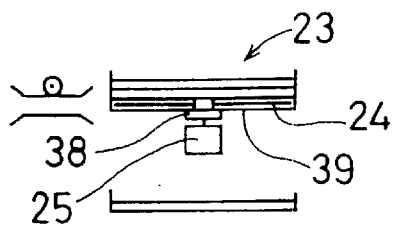
Figure 8D:
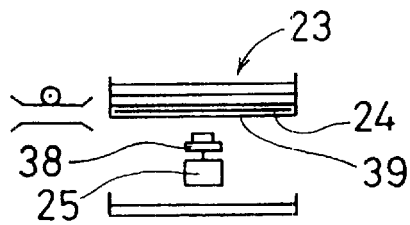
Figure 8E:
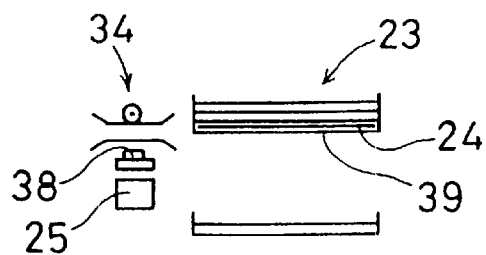
Figure 8F:
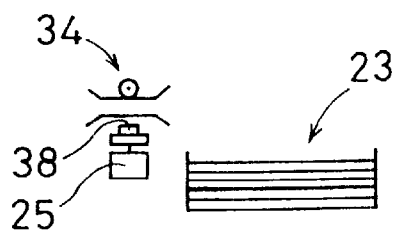

FIGS. 8A to 8F are simplified schematic diagrams illustrating how the CD 24 is accommodated in an acccommodating position inside the stocker 23. The following explanation is given by assuming that the PLAY condition shown in FIG. 8A is the same as the PLAY condition shown in FIG. 6H. When the CD 24 inserted through the insertion/ejection slot 33 is to be accommodated in the stocker 23, the sequence of operations in FIGS. 6A to 6H is immediately followed by the sequence of operations for acccommodating the CD 24 without playing back the CD 24. In FIG. 8B, after the lock mechanism 31 in FIG. 1 is activated to restrain the floating condition, the PU unit 25 and the holder 39 for holding the CD 24 are moved upward. In FIG. 8C, the CD 24 clamped on the turn table 38 by the chucking mechanism 40 of the PU unit 25 is unclamped. In FIG. 8D, the PU unit 25 moves downward, disengaging the CD 24 from the turn table 38 and allowing it to rest on the holder 39. In FIG. 8E, the PU unit 25 moves to a position below the insertion/ejection mechanism 34, and in FIG. 8F, the separated section of the stocker 23 is moved down, the stocker 23 thus being reassembled into one unit.

Figure 9A:
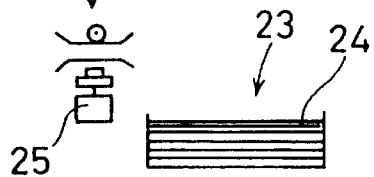
FIGS. 9A to 9I are simplified side views showing a sequence of operations for playing back a CD 24 in the CD playback apparatus 21 of FIG. 1.
Figure 9B:
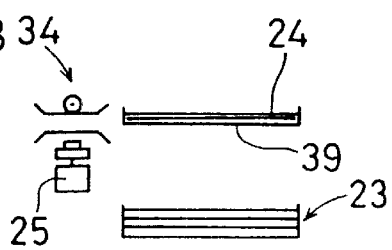
Figure 9C:
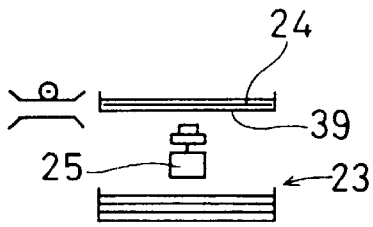

FIGS. 9A to 9I illustrate a sequence of operations for ejecting a desired one of the CDs 24 accommodated in the stocker 23. When the holder 39 holding the CD 24 to be ejected is selected in the condition shown in FIG. 9A where the PU unit 25 is positioned below the insertion/ejection mechanism 34 and the entire stocker 23 is in the downward position, the stocker 23 is separated between the upper section, including the selected holder 39, and the lower section located below the selected holder 39, as shown in FIG. 9B. In FIG. 9C, the PU unit 25 moves into the thus created space in the stocker 23.

Figure 9D:
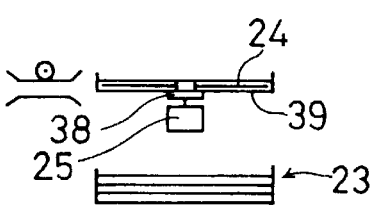
Figure 9E:
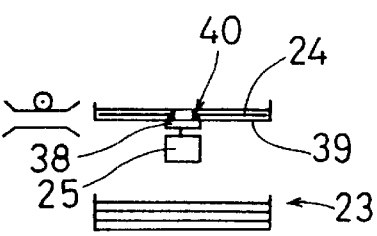
Figure 9F:
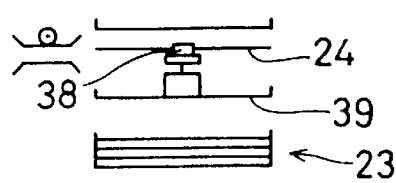
Figure 9G:
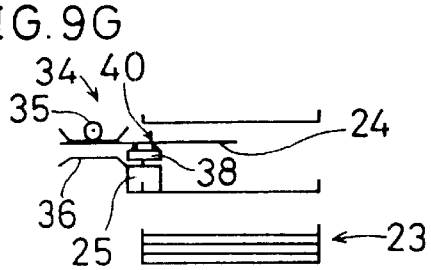
Figure 9H:
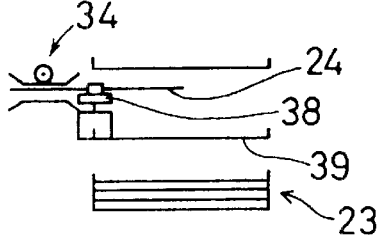
Figure 9I:
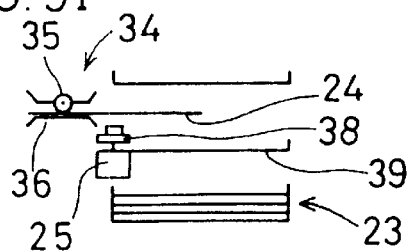

In FIG. 9D, the PU unit 25 moves upward to hold on the turn table 38 the CD 24 to be ejected. In FIG. 9D, the chucking mechanism 40 of the turn table 38 is activated to clamp the CD 24. In FIG. 9E, the holder 39 on which the CD 24 was held moves downward and the CD 24 is now mounted on the turn table 38. In FIG. 9F, the PU unit 25 including the turn table 38 with the CD 24 mounted thereon moves away from the space created in the stocker 23 to the standby position near the exit of the insertion/ejection mechanism 34. The CD 24 is inserted in the space between the lifted insertion/ejection roller 35 and the supporting plate 36. In FIG. 9G, the CD 24 clamped on the turn table 38 by the chucking mechanism 40 is unclamped, and in FIG. 9H, the PU unit 25 is moved downward and, at the same time, the insertion/ejection roller 35 is lowered, thereby removing the CD 24 from the turn table 38 by holding the CD 24 between the insertion/ejection roller 35 and the supporting plate 36; the insertion/ejection roller 35 is then rotated to eject the CD 24. In FIG. 9H, when the CD 24 is removed from the insertion/ejection slot 33 by the user, the insertion standby condition is entered, allowing the insertion of a new CD 24.

Figure 10A:
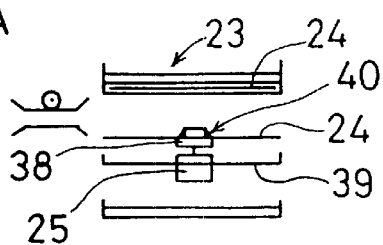
FIGS. 10A to 10L are simplified side views showing a sequence of operations for changing CDs 24 accommodated in a stocker 23 for playback in the CD playback apparatus 21 of FIG. 1.
Figure 10G:
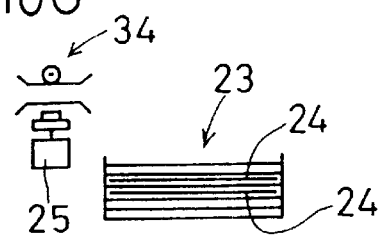
Figure 10B:
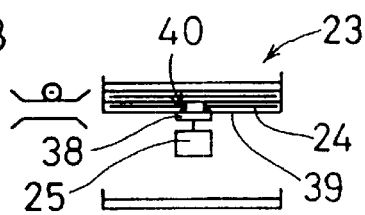
Figure 10H:
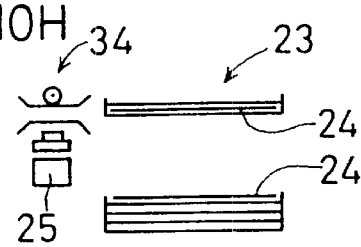
Figure 10C:
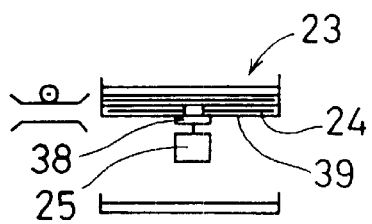
Figure 10I:
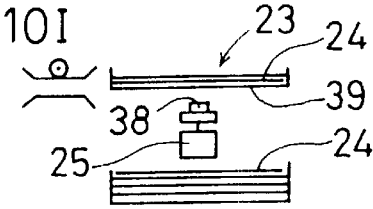
Figure 10D:
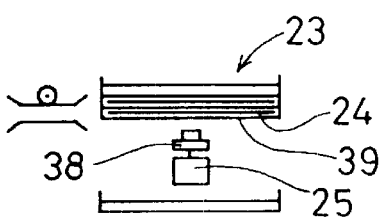
Figure 10J:
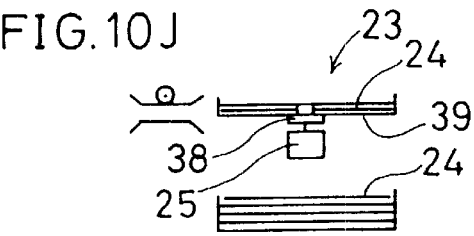
Figure 10E:
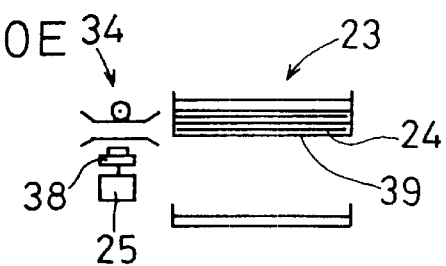
Figure 10K:
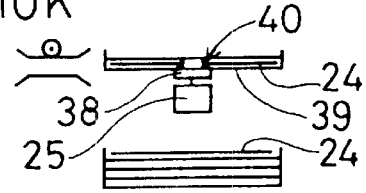
Figure 10F:
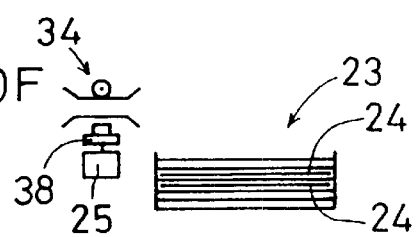
Figure 10L:
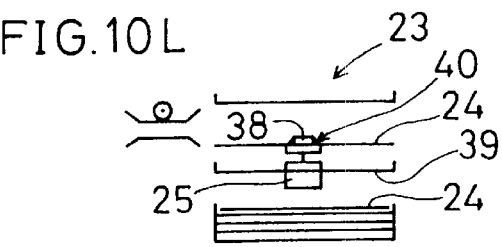

FIGS. 10A to 10L illustrate a sequence of disc change operations for changing one CD 24 in the PLAY condition for another CD 24 accommodated in the stocker 23. The sequence of operations from FIGS. 10A to 10F is the same as the sequence of operations shown in FIGS. 8A to 8F. The sequence of operations from FIGS. 10G to 10J is the same as the sequence of operations in FIGS. 9A to 9D. In FIG. 10K, after the lock mechanism 31 in FIG. 1 is released and the PU unit 25 placed in a mechanically floating condition by the floating mechanism 27 in FIG. 1, the holder 39 holding the selected CD 24 is moved down so that the CD 24 can be played back. Since the locking by the locking mechanism 21 in FIG. 1 is released, the CD 24 can be played back with the floating mechanism 27 acting to substantially isolate the PU unit 25 from external shocks and vibrations. However, since there is a possibility that the PU unit 25 may be displaced relative to other parts because of the absorption of vibrations, it is preferable that the PU unit 25 with the CD 24 mounted thereon be moved to a position where the CD 24 does not hit surrounding parts.

Figure 11:
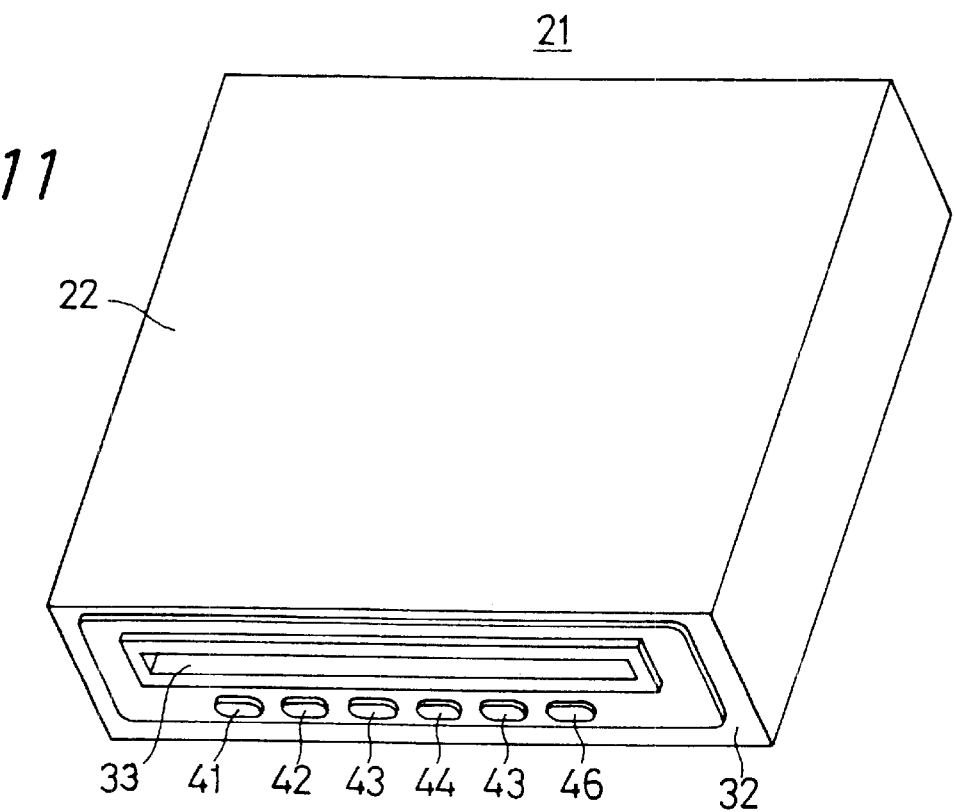
FIG. 11 is a perspective view of a housing 22 of the CD playback apparatus 21 shown FIG. 1.

FIG. 11 shows an external view of the CD playback apparatus 21 of FIG. 1. In the vicinity of the insertion/ejection slot 33 of the front panel 32, there are provided selector buttons 41 to 46 so that the acccommodating position of a CD 24 accommodated in the stocker 23 can be specified. The acccommodating positions are assigned numbers 1 to 6, for example, in sequence from bottom to top, and the corresponding number is specified using the appropriate one of the selector buttons 41 to 46.

Figure 12:
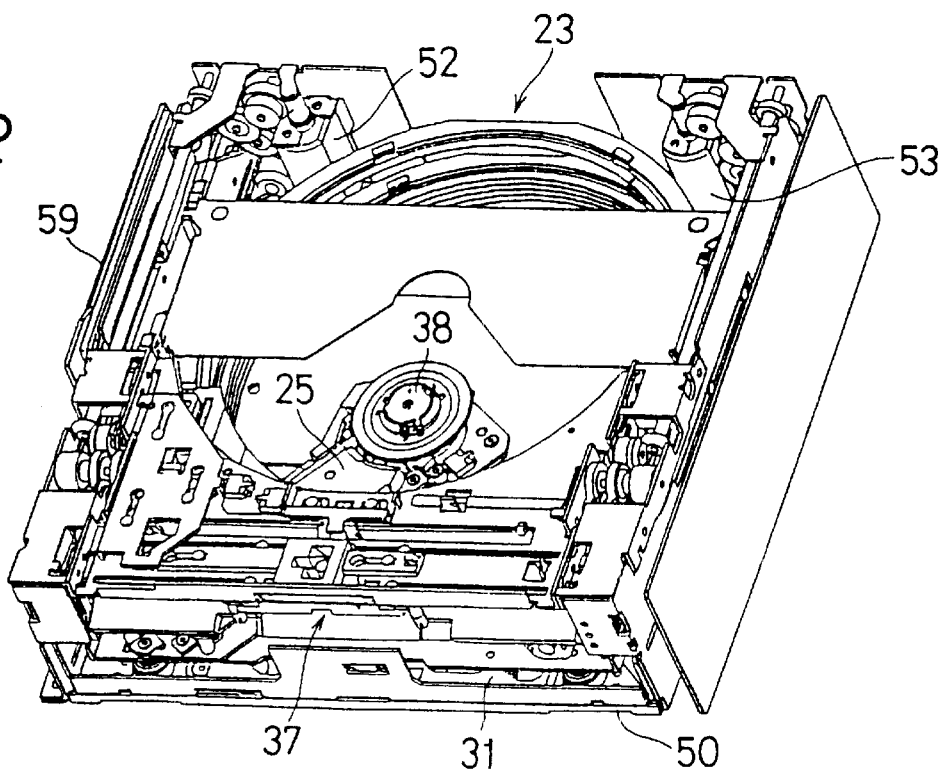
FIG. 12 is a perspective view showing a mechanism section in the CD playback apparatus of FIG. 1 with the housing 22 removed.
Figure 13:
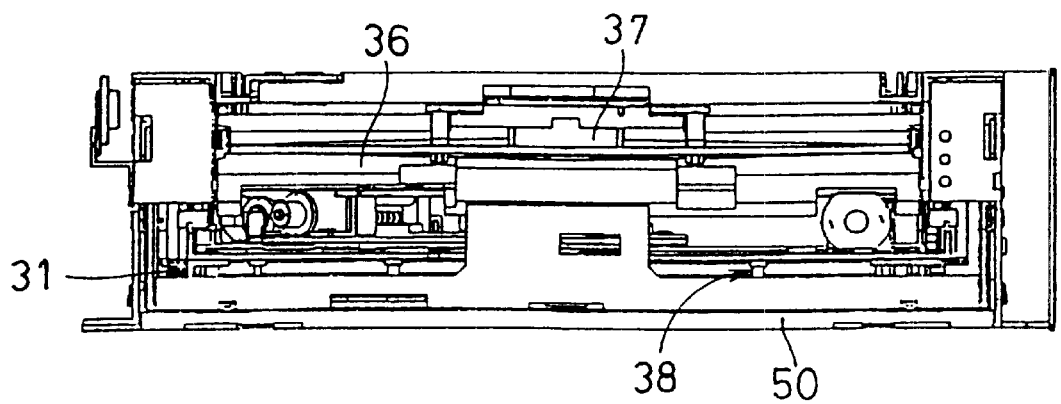
FIG. 13 is a front view of the mechanism section of FIG. 12.
Figure 14:
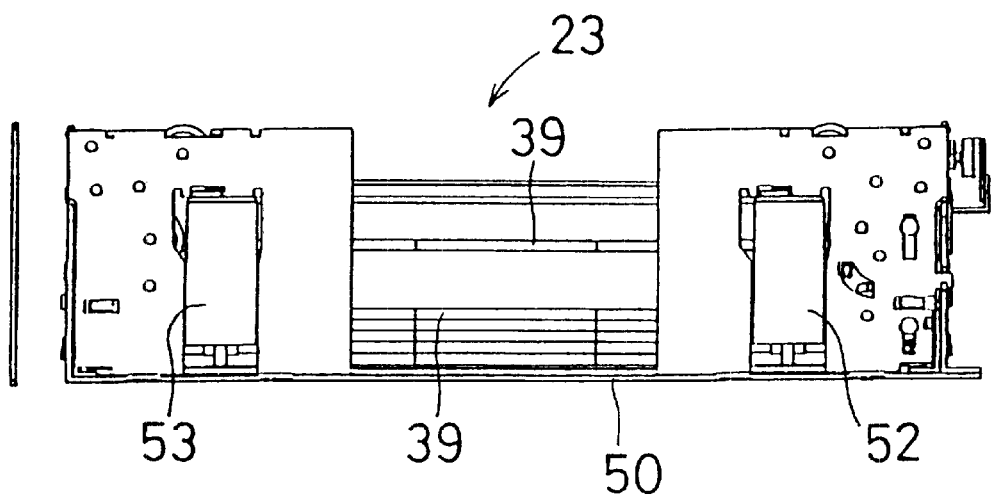
FIG. 14 is a rear view of the mechanism section of FIG. 12.
Figure 15:
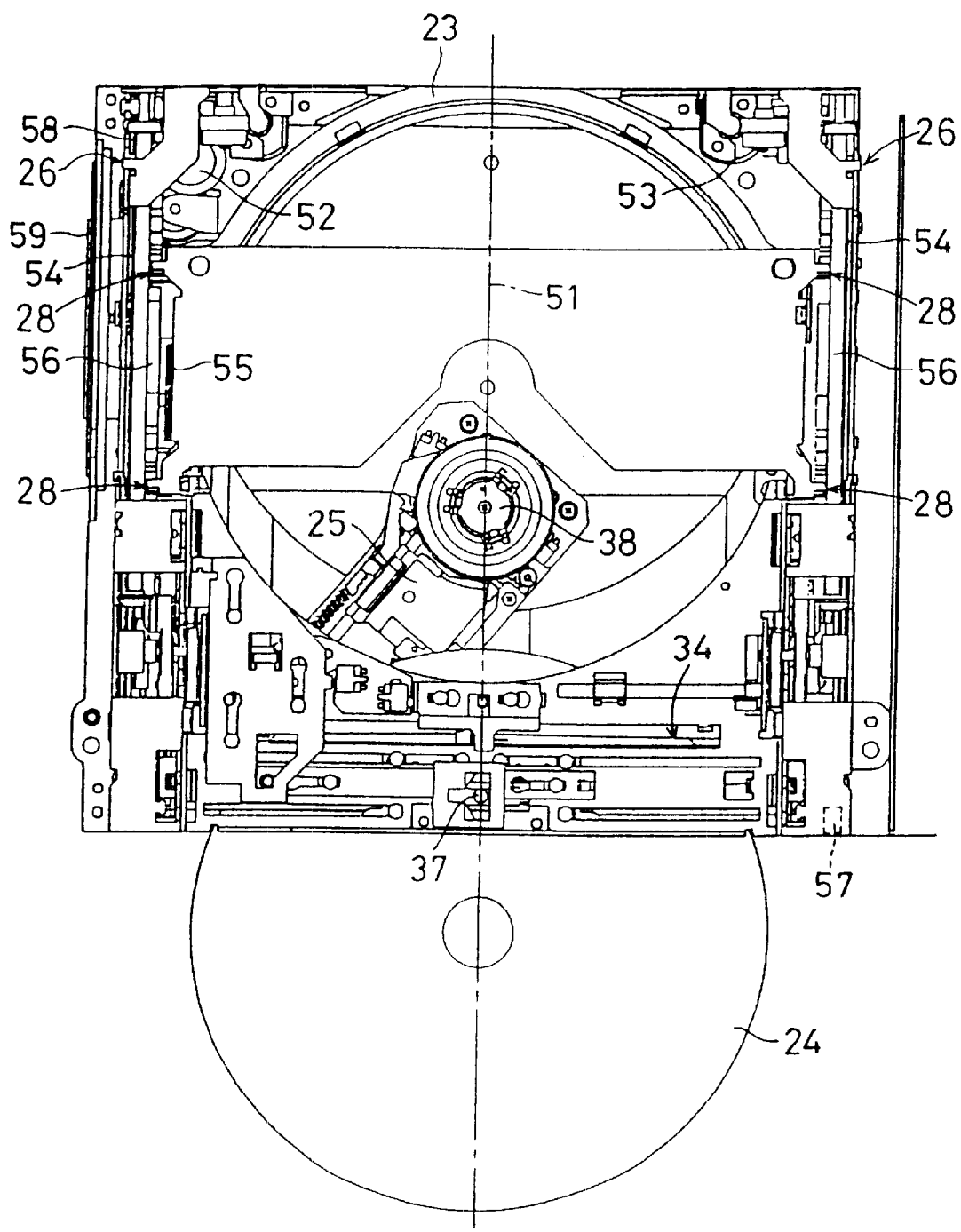
FIG. 15 is a plan view of the mechanism section of FIG. 12.
Figure 16:
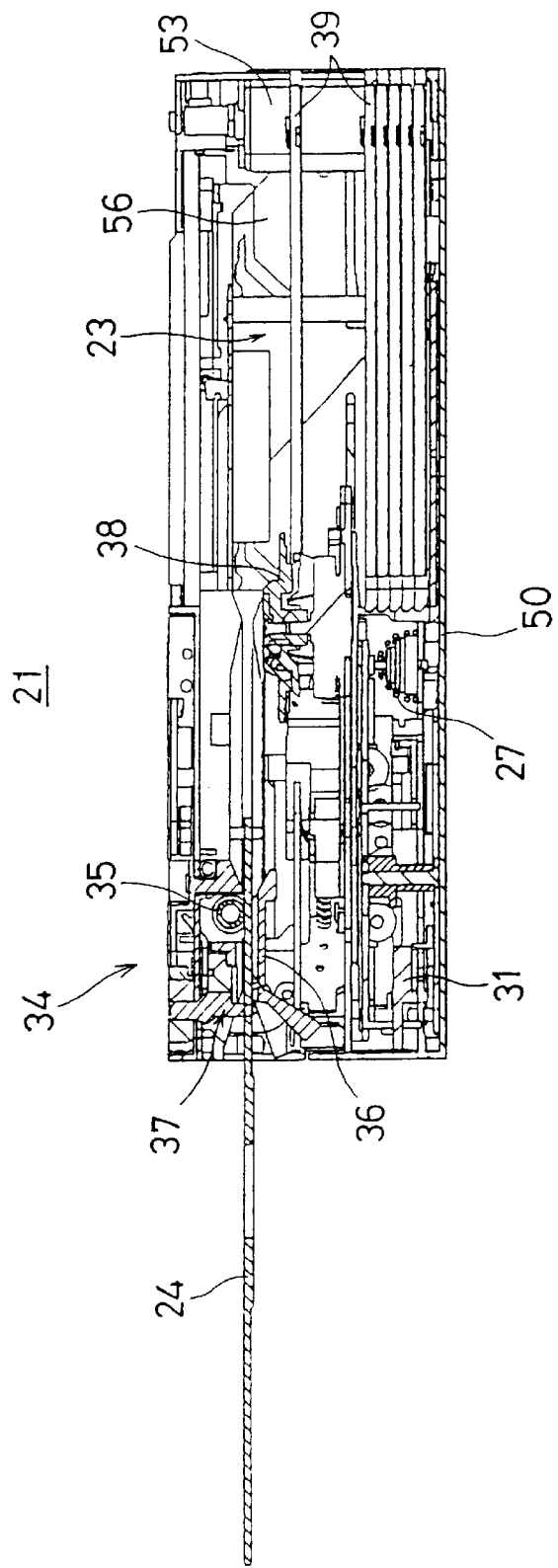
FIG. 16 is a cross sectional right-side elevational veiw of the mechanism of FIG. 12 with the CD 24 being inserted within.
Figure 17:
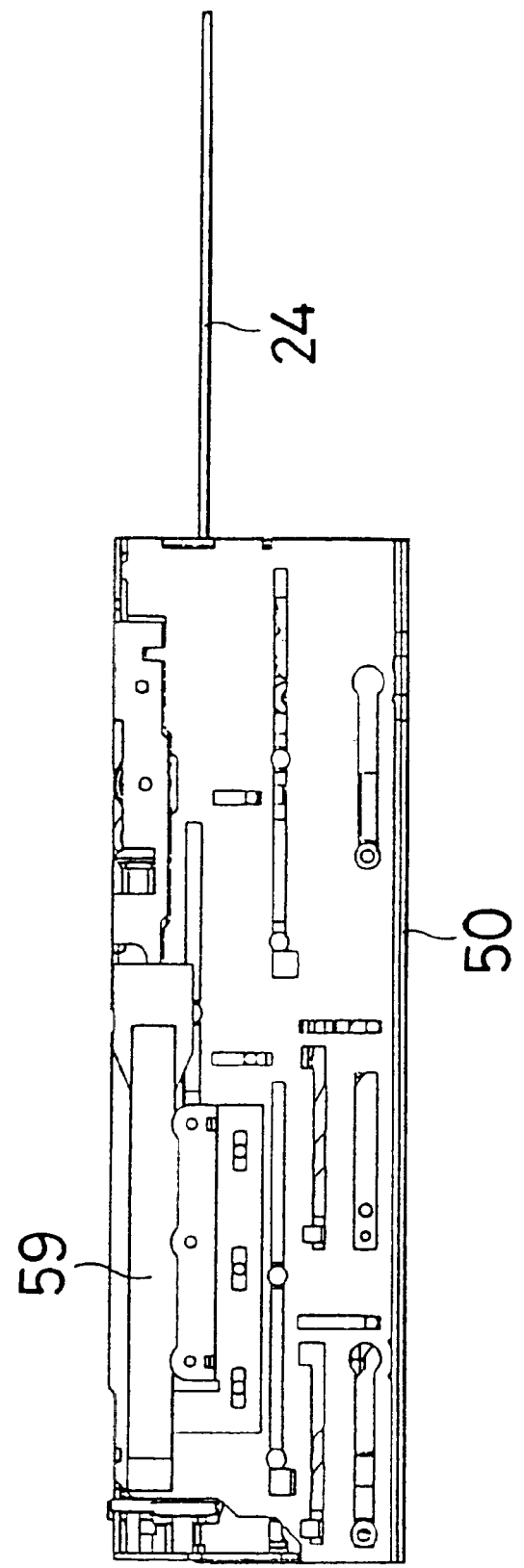
FIG. 17 is a left-side view of the mechanism section of FIG. 12.

FIG. 12 shows the construction of the internal mechanism of the CD playback apparatus 21 of FIG. 1 with the housing 22 removed. FIGS. 13 and 14 show the internal mechanism of FIG. 12 as viewed from the front and the rear, respectively. FIGS. 15, 16 and 17 show the internal mechanism of FIG. 12 with the CD 24 inserted as viewed from the top, the right-hand side and the left-hand side, respectively. The entire construction of the internal mechanism is supported on a chassis 50, the front side being the side where the front panel 32 of the housing 22 is disposed and the rear side being the side opposite from the front panel 32. The shutter mechanism 37, the insertion/ejection mechanism 34 and so on are arranged in the forward section of the chassis 50, while the stocker 23 and so on are mounted in the rearward section.

The PU unit 25 is mounted movably in the backward and forward directions between the reference position for standby shown in FIG. 15 and the insertion position in the stocker 23, with the center position of the turn table 38 always lying on the center line 51 of the chassis 50. Further, the PU unit 25 can be moved from the reference position shown in FIG. 15 in cornering fashion with the turn table 38 at the cornering end, to move the turn table 38 to a position below the insertion/ejection mechanism 34.

Disposed at both widthwise ends of the chassis 50 are the moving mechanism 26 for moving the stocker 23 up and down, the separating mechanism 28 for separating the stocker 23, and the mechanism for operating the PU unit 25 and the lock mechanism 31, the mechanisms comprising slide plates or the like movable back and forth in reciprocating fashion. A lifting motor 52 and a splitting motor 53 for driving the slide plates are mounted in the rear corners of the chassis 50. The lifting motor 52 moves the lifting slide plates 54 back and forth along the chassis 50 and selects the acccommodating position of the stocker 23 based on the number of stack levels counted by a count sensor 55. Based on the acccommodating position selected by the lifting motor 52, the splitting motor 53 drives the separating slide plates 56 to separated the stocker 23.

A separating origin point switch 57 and a lifting origin point switch 58 for indicating the origin points of the separating slide plates 56 and the lifting slide plates 54, respectively, are mounted at the front and rear sides of the chassis 50. The intermediate position of the slitting slide plates 56 is detected by a separating position sensor 59. The separating position sensor 59 is a linearly variable resistor, and is used so as to indicate the position by an analog voltage.

The sensor output is A/D converted and treated as a digital value.

In the present embodiment, the lifting motor 52 is also used to drive the insertion/ejection roller 35. The insertion/ ejection roller 35 moves down to operate only when inserting or ejecting the CD 24, otherwise it is held in the lifted position; therefore, to simplify the mechanism, the insertion/ejection roller 35 is driven by the lifting motor 52 at all times. When it becomes necessary to move the stocker 23 up or down, a clutch mechanism is operated to couple the driving force to the lifting slide plates 54. The clutch mechanism in the present embodiment allows the driving force of the lifting motor 52 to be coupled to the lifting slide plates 54 when the separating slide plates 56 are at the most recessed point. When the separating slide plates 56 have moved away from the most recessed point, the clutch mechanism 58 disengages the driving force of the lifting motor 52 from the lifting slide plates 54.

Figure 18:
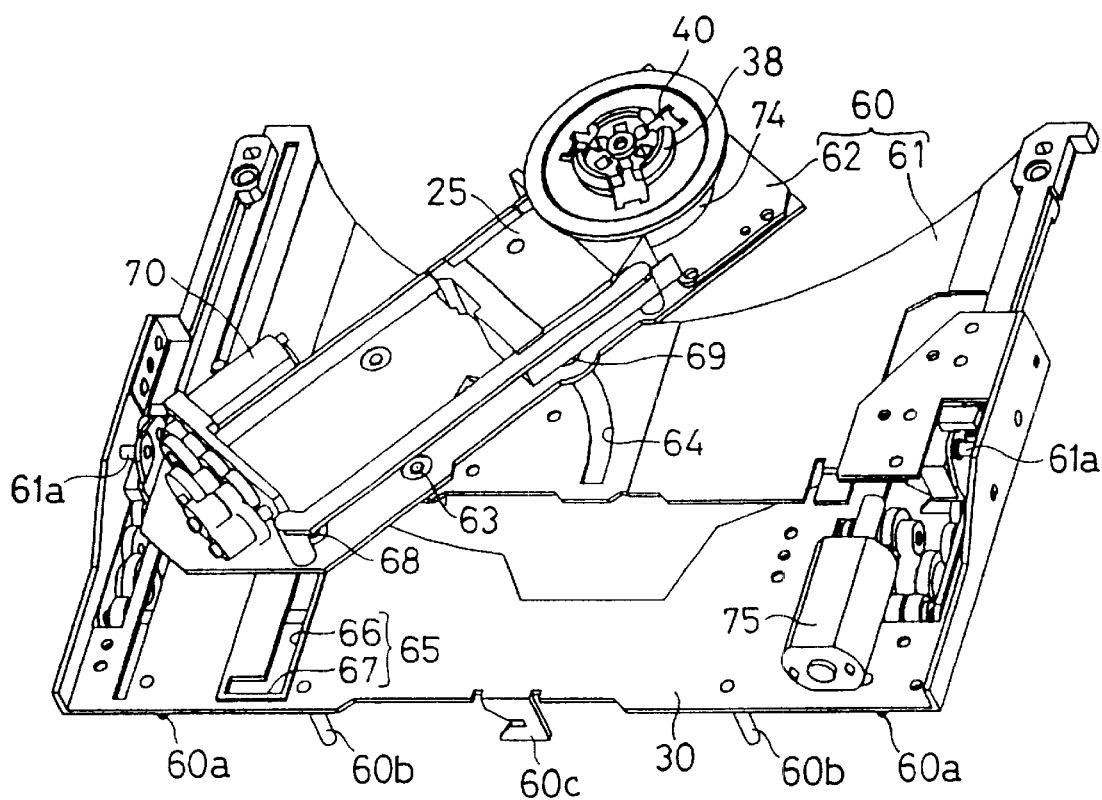
FIG. 18 is a perspective view of a slide unit 60 for moving a PU unit 25 shown in FIG. 1.
Figure 19:
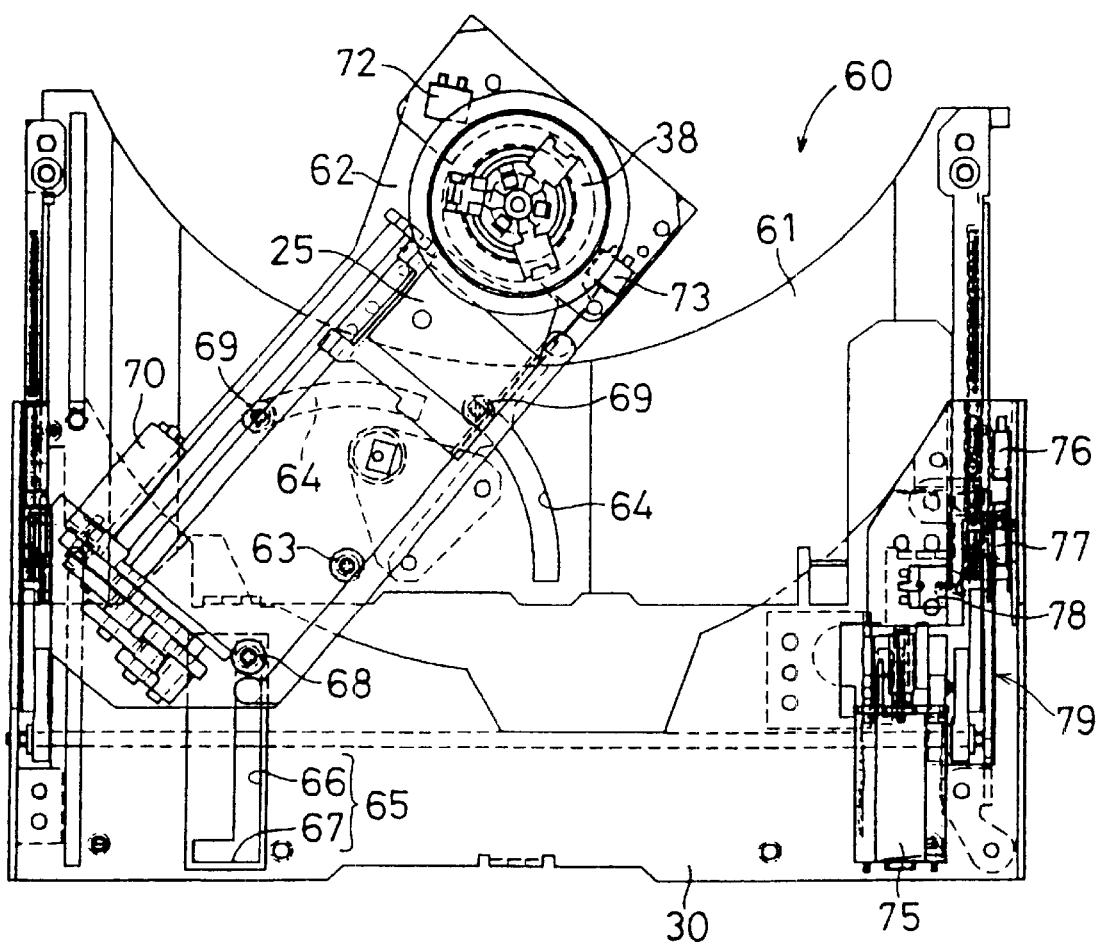
FIG. 19 is a plan view of the slide unit 60 of FIG. 18.
Figure 20:
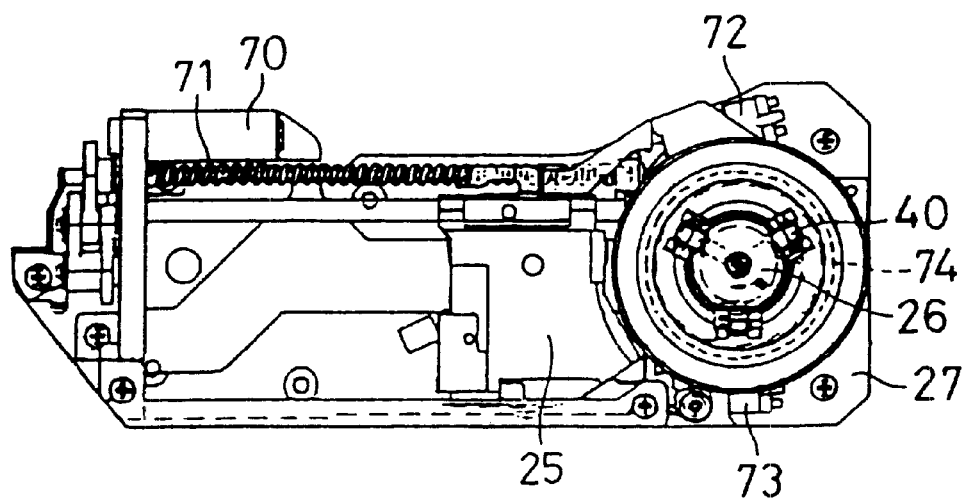
FIG. 20 is a plan view of the PU unit 25 of FIG. 1.

FIG. 18 shows the construction of a slide unit 60, mounted on the slide base 30, for moving the PU unit 25. FIG. 19 is a perspective plan view showing a slide plate 61 of the slide unit 60 moved rearward relative to the slide base 30. FIG. 20 shows the construction in connection with the swivel plate 62.

The slide unit 60 substantially comprises the slide plate 61 and the swivel plate 62. The slide plate 61 is movable backward and forward relative to the slide base 30. The swivel plate 62 can be swiveled about a swivel axis 63 provided at its base end in such a manner as to cause the PU unit 25 at the tip to describe an arc relative to the slide plate 61. An arc-shaped guide slot 64 for guiding the swiveling motion of the swivel plate 62 is formed in the slide plate 61. An L-shaped guide slot 65 consisting of a longitudinal slot 66 and a lateral slot 67 is formed in the slide base 30. The swivel plate 62 has a protrusion 68 which engages in the L-shaped guide slot 65 of the slide base 30; when the protrusion 68 is engaged in the lateral slot 67 of the L-shaped guide slot 65, a protrusion 69 provided on the swivel plate 62 engages in the arc-shaped guide slot 64 of the slide plate 61, allowing the swivel plate 62 to swivel. When the protrusion 68 on the swivel plate 62 becomes engaged in the longitudinal slot 66 of the L-shaped guide slot 65, further swiveling motion of the swivel plate 62 is prevented, allowing only forward and backward movements with the protrusion 68 engaged in the longitudinal slot 66.

The PU unit 25 is moved on the swivel plate 62 by virtue of a feed screw shaft 71 which is driven for rotation by a feed motor 70. The positioning of the PU unit 25 at the origin point on the turn table 38 is detected by a PU origin point switch 72. In the case of a conventional PU unit, when the PU unit has reached the origin point, no further driving by the feed motor 70 is performed. In the present embodiment, on the other hand, the PU unit 25 is not stopped mechanically at the origin point, but the feed motor 70 is further driven, thereby enabling the clamping by the chucking mechanism 40 to be released.

The clamp released condition is detected by a clamp release switch 73. The turn table 38 is directly driven for rotation by a spindle motor 74.

The slide unit 60 is moved relative to the slide base 30 by virtue of a slide motor 75. The slide motor 75 is mounted on the slide base 30, and the moving position of the slide plate 61 is detected by a slide origin point switch 76, a slide completion switch 77, and an insertion/ejection standby switch 78. In the slide unit 60, a gear mechanism for transmitting the driving force of the slide motor 75 to the slide plate 61 includes a slip mechanism 79 for preventing the transmission of excessive driving force. The forward movement of the slide plate 61 is limited by pins 61*a* striking against prescribed portions of the insertion/ejection mechanism 34.

On the back of the slide base 30 are provided floating shafts 60*a*, lock shafts 60*b*, and a lock piece 60*c* in protruding fashion. The floating shafts 60*a* are used to hold the slide unit 60 in a floating condition. The lock shafts 60*b* and lock piece 60*c* are used to immobilize the slide unit 60.

Figure 21:
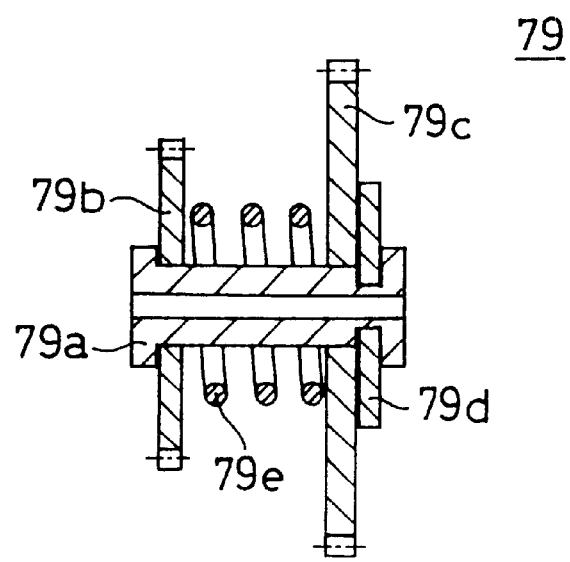
FIG. 21 is a cross sectional view of a slip mechanism 79 shown in FIG. 19.

FIG. 21 shows the construction of a slip mechanism 79. The slip mechanism 79 comprises two gears 79*b* and 79*c* mounted on a common shaft 79*a*. The gear 79*b* on the side connected to the slide motor 75 is fixed to the shaft 79*a*. The gear 79*c* on the side connected to the slide plate 61 is not fixed to the shaft 79*a*, but is rotatable around the shaft 79*a*. Since the gear 79*c* is pressed by a spring 79*e* against a snap ring 79*d* fixed to the shaft 79*a*, the driving force is transmitted by the frictional force between the gear 79*c* and the snap ring 79*d*.

When the driving force becomes greater than the frictional force, rotational slippage occurs, so that the driving force being transmitted from the gear 79*b* to the shaft 79*a* is not transmitted to the gear 79*c* via the snap ring 79*d*.

That is, when the slide plate 61 is moved farthest away from the slide base 30, bringing the PU unit 25 into the inside space of the stocker 23, or when the slide plate 61 is drawn back toward the slide base 30 into its home position, further movement of the slide plate 61 is checked by a mechanical stop, which causes the slip mechanism 79 to turn freely. If control is performed to stop the slide motor 75 after driving the slide motor 75 by allowing a sufficient time before the slip mechanism 79 is caused to turn freely, the stopping position of the slide plate 61 can be controlled with high accuracy. On the other hand, if control is performed by detecting the position using an optical sensor or the like, accurate positioning is difficult to achieve because of mechanical control delay, etc. The present embodiment can thus achieve reliable and highly accurate positioning with simple control.

The linear movement of the slide unit 60 is performed via the gear mechanisms of identical construction by transmitting the driving force, conveyed from the slip mechanism 79, to both sides of the slide base 30 by virtue of a link shaft. Since both sides are driven simultaneously and equally, a smooth movement can be accomplished.

Figure 22:
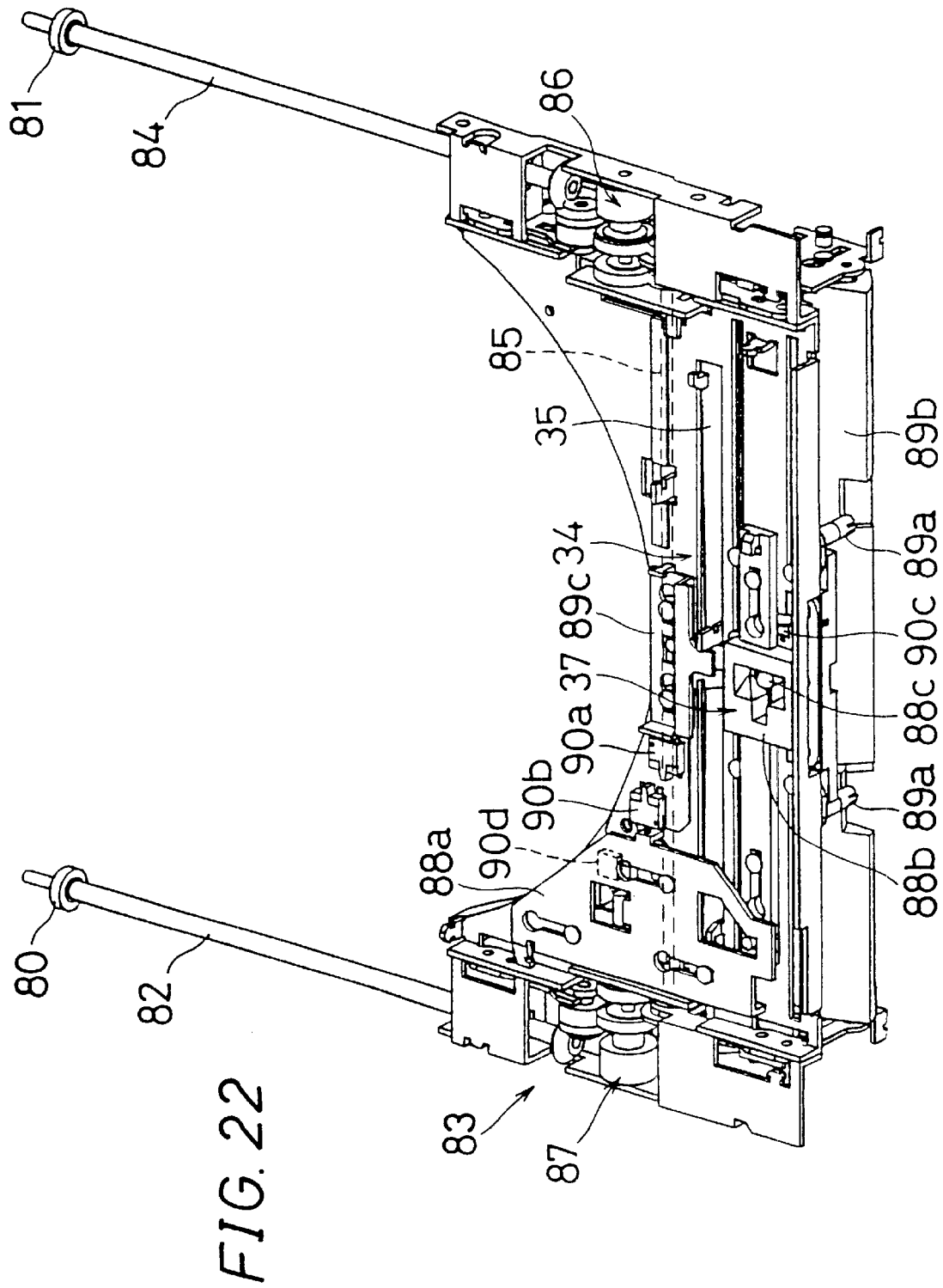
FIG. 22 is a perspective view of an insertion/ejection mechanism 34 shown in FIG. 1.

FIG. 22 shows the construction of the insertion/ejection mechanism 34 and an open/close mechanism including the shutter mechanism 37. The driving forces of the lifting motor 52 and splitting motor 53 mounted in the rearward section are transmitted to spur gears 80 and 81, respectively. Since the transport roller 35 in the insertion/ejection mechanism 34 is driven by the lifting motor 52 mounted in the rearward section, as previously described, a drive shaft 82 with the spur gear 80 clamped to its base end is provided in extending fashion and coupled at its other end to a gear mechanism 83. Likewise, the driving force of the splitting motor 53 mounted in the rearward section is transmitted via a drive shaft 84 with the spur gear 81 clamped to its base end, to rotate a link shaft 85 linking both sides and thus drive both separating slide plates 56 equally in the forward and backward directions via gear mechanisms 86 and 87 provided at both ends of the link shaft 85.

The shutter mechanism 37 in the open/close mechanism includes an open/close slide plate 88*a*, a shutter sliding member 88*b*, and a shutter member 88*c*. The open/close mechanism itself further includes open/close pins 89*a* in conjunction with which an open/close stopper 89*b* and a pin sliding plate 89*c* are provided. The open/close pins 89*a* as a pair are arranged at both widthwise ends, spaced apart by a distance smaller than the diameter of the CD 24 to prevent another CD 24 from being inserted. When inserting the first CD 24, or when ejecting a CD 24, the open/close pins 89a are retracted out of the moving range of the CD 24 by the insertion or ejecting force of the CD 24 to allow the insertion or ejection of the CD 24. When preventing double insertion, the open/close pins 89a are restrained by the open/close stopper 89b and do not retract when being hit by a CD 24, thus preventing the insertion of the CD 24. The shutter member 88c, as earlier described, is used when positioning the inserted CD 24 in place by rotating the transport roller 35 in the reverse direction.

Further, an insertion detection switch 90a, an insertion presence/absence switch 90b, an insertion completion switch 90c, and an ejection completion switch 90d are also provided in connection with the insertion and ejection of the CD 24.

Figure 23:
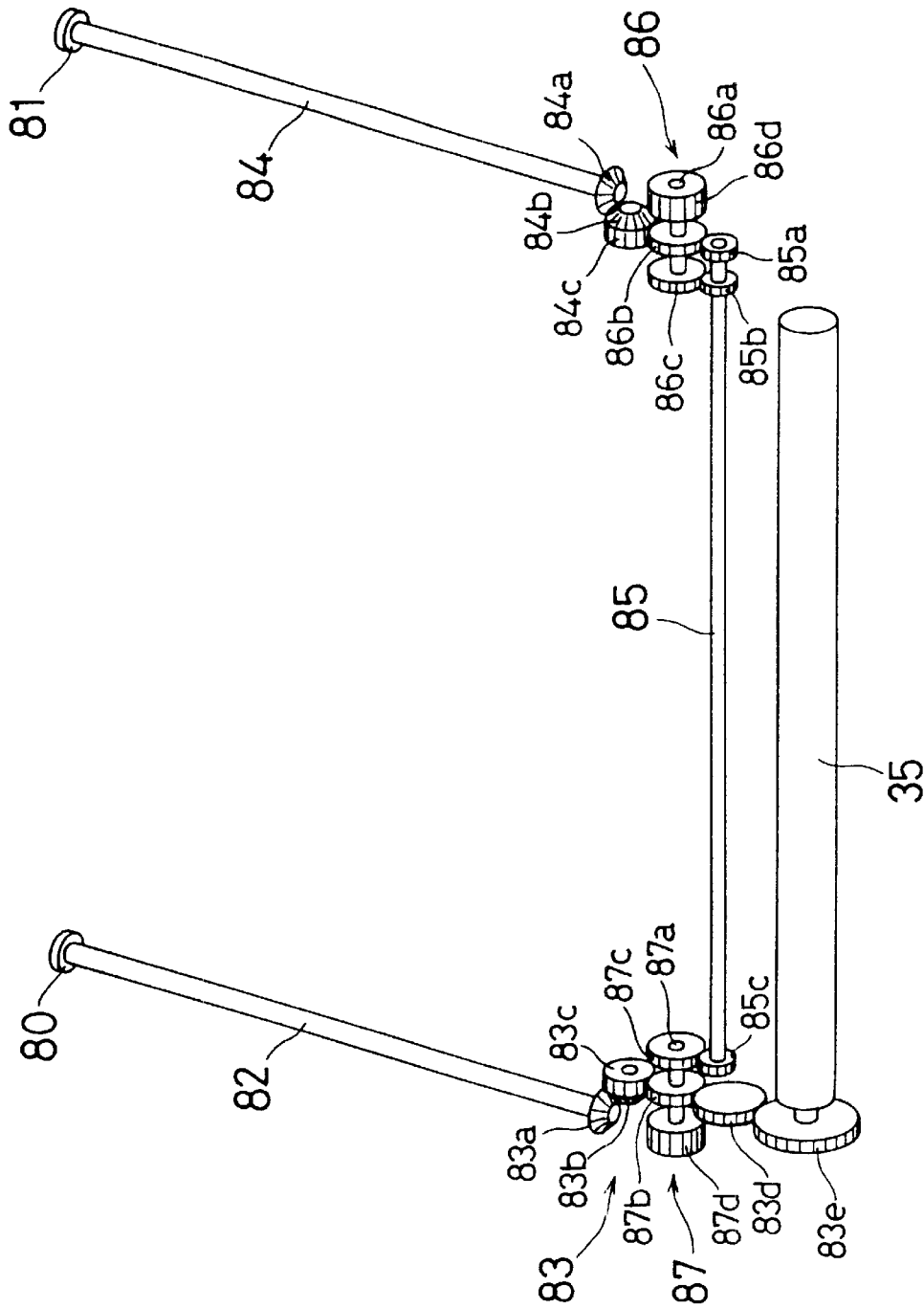
FIG. 23 is a simplified perspective view showing a driving force transmission path of an insertion/ejection roller 35 in the insertion/ejection mechanism 34 of FIG. 22.

FIG. 23 shows a simplified schematic of the gear mechanisms for driving the separating slide plate 56 and the insertion/ejection roller 35. A bevel gear 83a forming a part of the gear mechanism 83 is provided at the end of the drive shaft 82, and transmits the driving force from the lifting motor 52 via the spur gear 80 to a bevel gear 83b and a spur gear 83c.

A bevel gear 84a is provided at the end of the drive shaft 84, and transmits the driving force from the splitting motor 53 via the spur gear 81 to a bevel gear 84b and a spur gear 84c. The link shaft 85 is provided with spur gears 85a and 85b at its right end and a spur gear 85c at its left end. The driving force from the splitting motor 53 is transmitted from the spur gear 84c to the spur gear 85a via a spur gear 86b mounted on a shaft 86a of the clear mechanism 86.

The spur gear 86b is not fixed to the shaft 86a, but is rotatable freely around the shaft 86a. A spur gear 86c and a pinion gear 86d are mounted at both ends of the shaft 86a of the gear mechanism 86. The gear mechanism 87 at the left side comprises a spur gear 87b rotatable freely around a shaft 87a and a spur gear 87c and pinion gear 87d mounted at both ends of the shaft 87a, and has the same construction as the gear mechanism 86 at the right side.

When the driving force is transmitted to the spur gear 85a, the link shaft 85 rotates and the driving force is transmitted to the spur gears 86c and 87c via the spur gears 85b and 85c, respectively. This driving force causes the pinion gears 86d and 87d to rotate, thus driving the racks of the separating slide plates 56b and 56a back and forth. In the gear mechanism 87 at the left side, the driving force transmitted from the lifting motor 52 via the drive shaft 82 is transmitted via the spur gear 87b to the drive mechanism for the insertion/ejection roller 35.

More specifically, the gear mechanism 83 also includes spur gears 83d and 83e which are driven by the spur gear 83c via the spur gear 87b in the gear mechanism 87. The spur gear 83e is mounted on the insertion/ejection roller 35 and can thus drive the insertion/ejection roller 35 for rotation. The insertion/ejection roller 35 is driven for rotation whenever the lifting motor 52 is put in operation. However, as long as the insertion/ejection roller 35 is placed in the lifted position shown in FIG. 39A, as will be described later, the rotation does not cause any ill effect.

Figure 24:
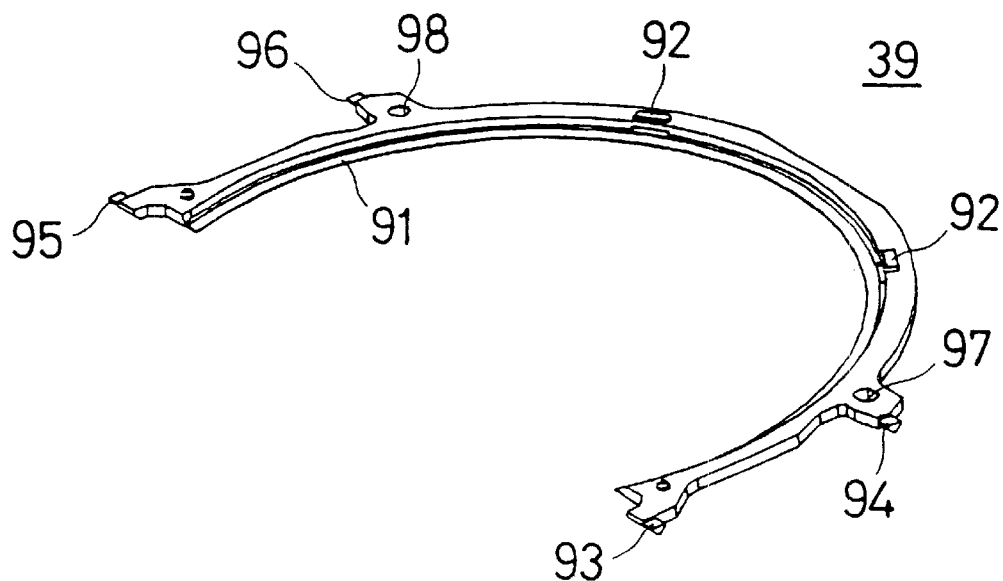
FIG. 24 is a perspective view of a holder 39 constituting part of the stocker 23 shown in FIG. 1.
Figure 25:
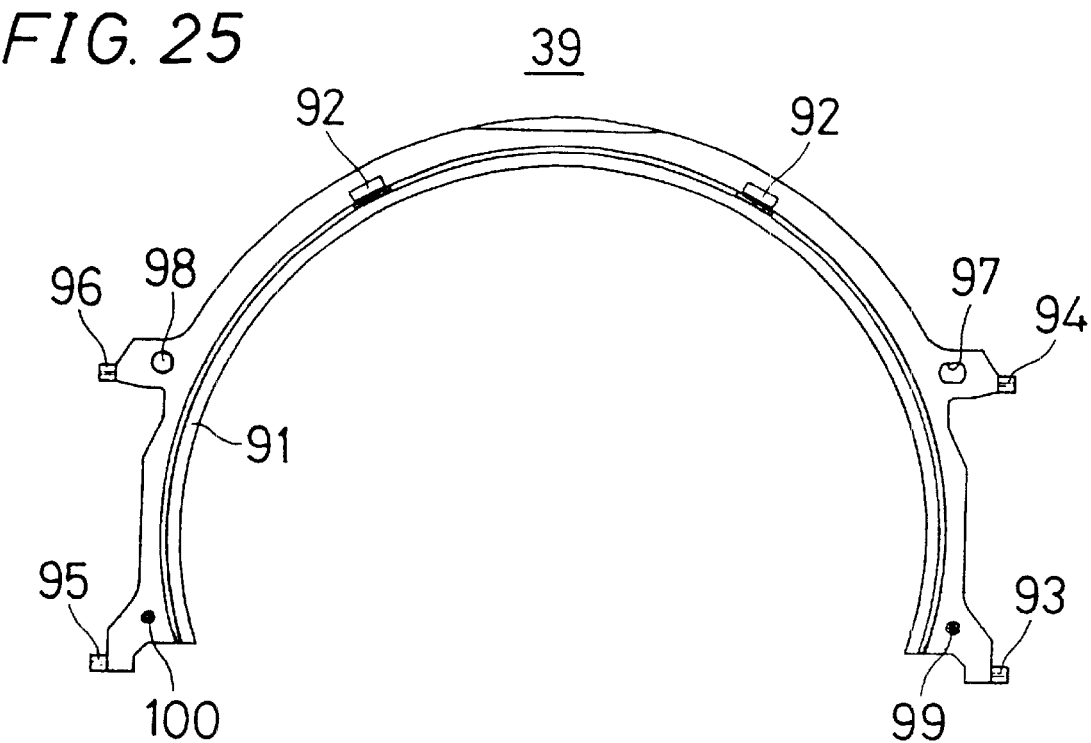
FIG. 25 is a plan view of the holder 39 of FIG. 24.
Figure 26:
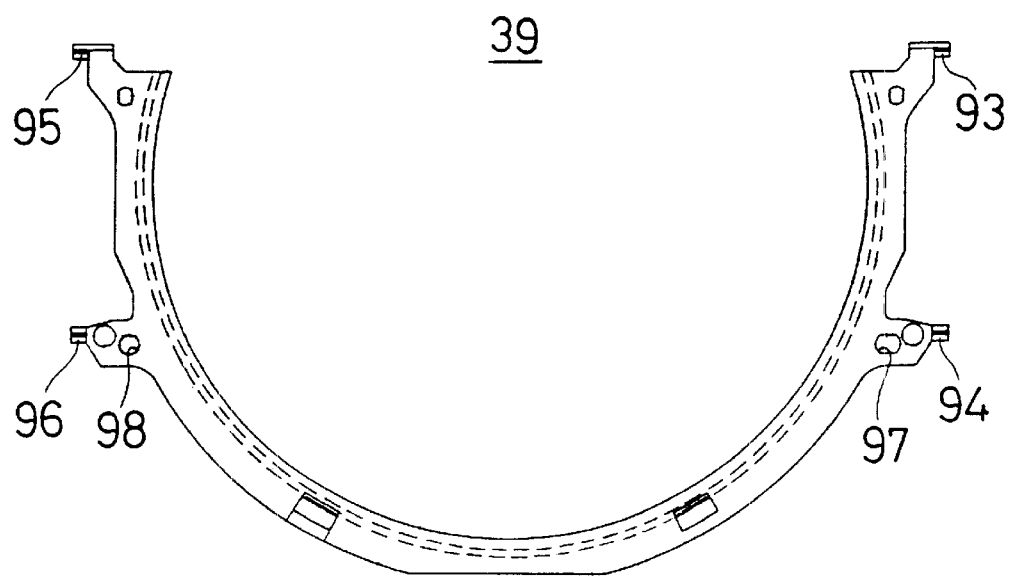
FIG. 26 is a bottom view of the holder 39 of FIG. 24.
Figure 27:
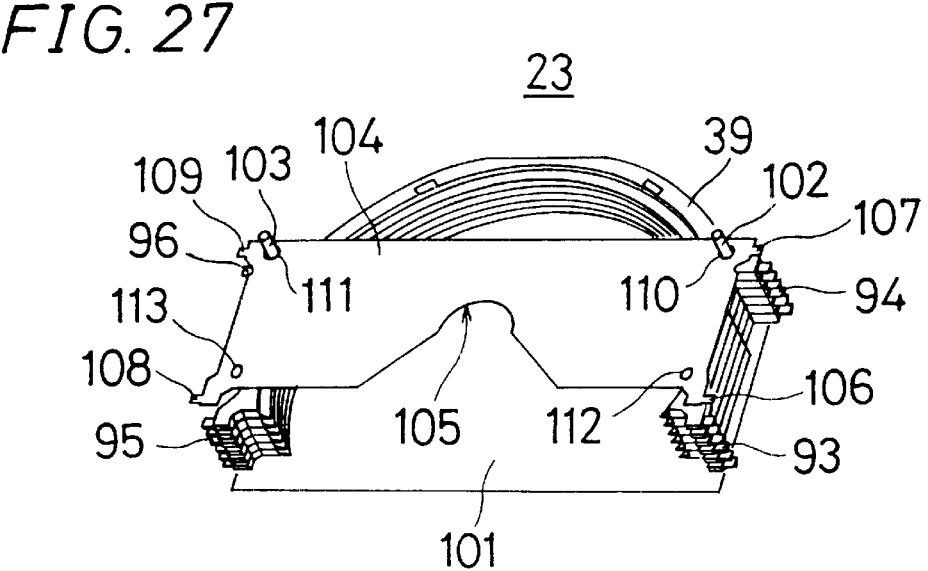
FIG. 27 is a perspective view of the stocker 23 constructed by stacking the holders 39 of FIG. 24.

FIGS. 24, 25, 26 and 27 show the constructions of the holder 39 and the stocker 23 constructed by stacking the holders 39. FIG. 24 is a perspective view, FIG. 25 is a plan view and FIG. 26 is a bottom view. FIG. 27 is a perspective view of the stocker 23 constructed by stacking the plurality of holders 39.

The holder 39 is substantially semicircular in shape. A CD mounting portion 91 for mounting a CD 24 is formed along the inner circumference of the holder 39. The holder 39 is designed so as to hold the circumference of the CD 24 along a length greater than the semicircular length so that the CD 24 can be held by just placing the CD 24 in a horizontal position onto the CD mounting portion 91. A retention projection 92 for holding the CD 24 mounted on the CD mounting portion 91 in place is formed at the rear end of the holder 39. Splitting projections 93, 94, 95, and 96, used when separating the holder 39 by the separating slide plates 56 are formed on both sides of the holder 39. Further, a pair of insertion holes 97 and 98 are formed at both widthwise sides of the holder 39. Positional displacement prevention projections 99 and 100 are formed in the forward section of the surface of the holder 39.

FIG. 27 shows the stocker 23 constructed by stacking the holders 39. The stocker 23 includes a bottom plate 101 which is lifted up and down by the lifting slide plates 54, a pair of lift guides 102 and 103 formed protruding upward from the base plate 101, the six holders 39 through the insertion holes 97 and 98 of which are inserted the lift guides 102 and 103, and a top plate 104. The top plate 104, except for the center cut-out 105 thereof, is formed in a substantially rectangular shape so that it can hold down the upper surface of the CD 24 mounted on the uppermost holder 39. Splitting projections 106 to 109 corresponding to the separating projections 93 to 96 of the holders 39 are formed at the four corners of the rectangle.

The top plate 104 is also provided with insertion holes 110 and 111 through which the lift guides 102 and 103 are inserted, and positional displacement prevention holes 112 and 113 which engage on the positional displacement prevention projections 99 of the uppermost holder 39. In the present embodiment, the holders 39 of identical construction can be used for acccommodating a plurality of CDs 24.

Figure 28A:
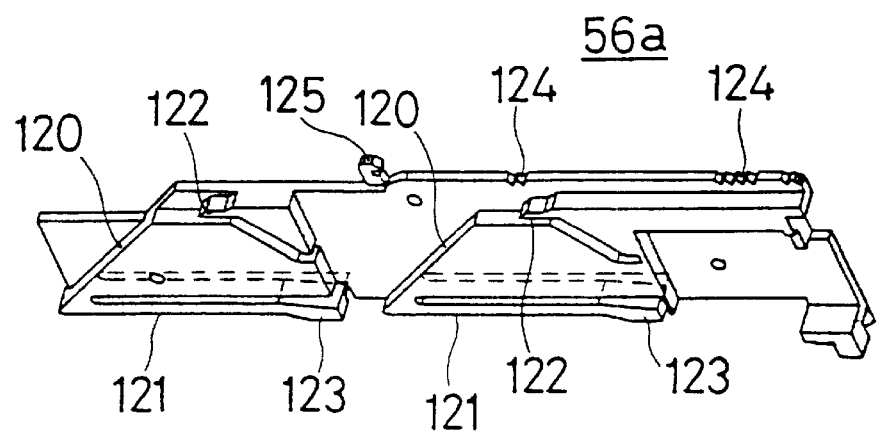
FIGS. 28A and 28B are perspective views of a separating slide plate 56 shown in FIG. 15.
Figure 28B:
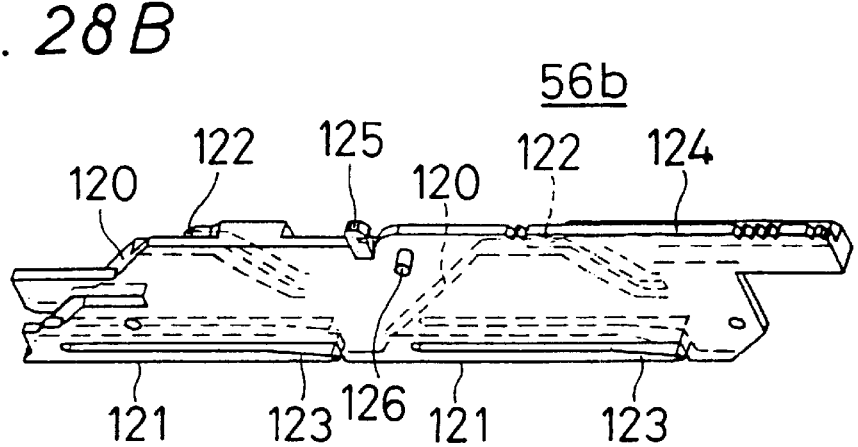

FIG. 28A shows the right-side separating slide plate 56a, and FIG. 28B shows the left-side separating slide plate 56b. The separating slide plates 56a and 56b on both the sides will be denoted by reference numeral 56. Two pairs of upper and lower cams 120 and 121 are formed on each separating slide plate 56, one upper/lower cam pair in the forward section and the other pair in the rearward section of the plate. The separating projections 93 to 96 on the holder 39 at the acccommodating position at which the stocker 23 is separated move upward along the slopes of the upper cams 120. The holder underneath the holder 39 at which the stocker 23 is separated is prevented by the lower cams 121 from moving upward. The separating projections 93 to 96 moving upward along the slopes of the upper cams 120 are separated by separators 122 between the holder 39 at the acccommodating position and the holder 39 above it. When the uppermost holder 39 is selected, the separating projections 106 to 109 on the top plate 104 are separated by the separators 122. The lower holder 39 is further pressed downward by the spring force of pressing portions 123. The forward and backward movements of the separating slide plates 56 are accomplished by driving the racks 124, each provided in the forward upper section of each separating slide plate 56, by virtue of the pinion gears. A spring retainer 125 for interlocking with the PU lifting slide plate that will be mentioned later is provided on the upper side of each separating slide plate 56, and a pin 126 is provided in protruding fashion on one side of the plate.

Figure 29:
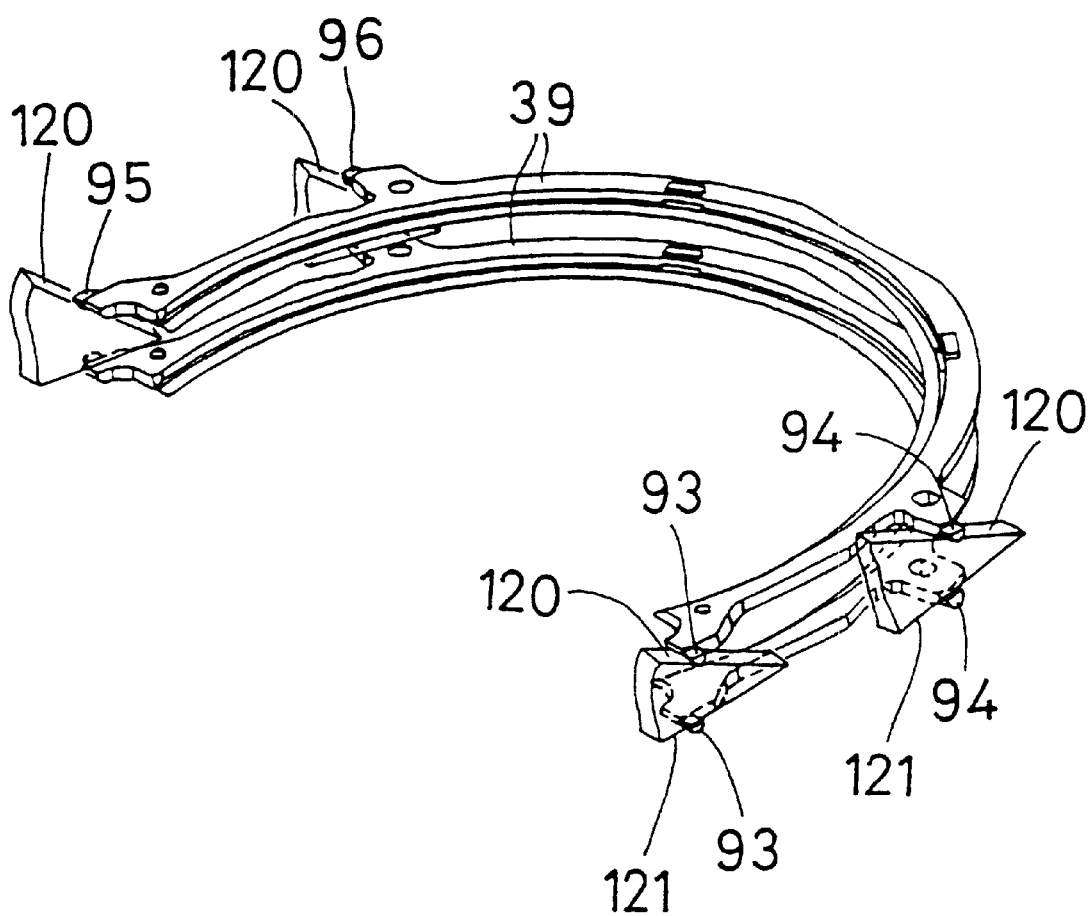
FIG. 29 is a simplified perspective view showing how the holders 39 are separated using the separating slide plates 56 of FIGS. 28A and 28B.

FIG. 29 shows the upper cams 120 and lower cams 121 displacing the separating projections 93 to 96 to separate the holders 39. Using the separating slide plates 56 shown here, the separated conditions shown in FIGS. 6 to 10 can be accomplished.

Figure 30:
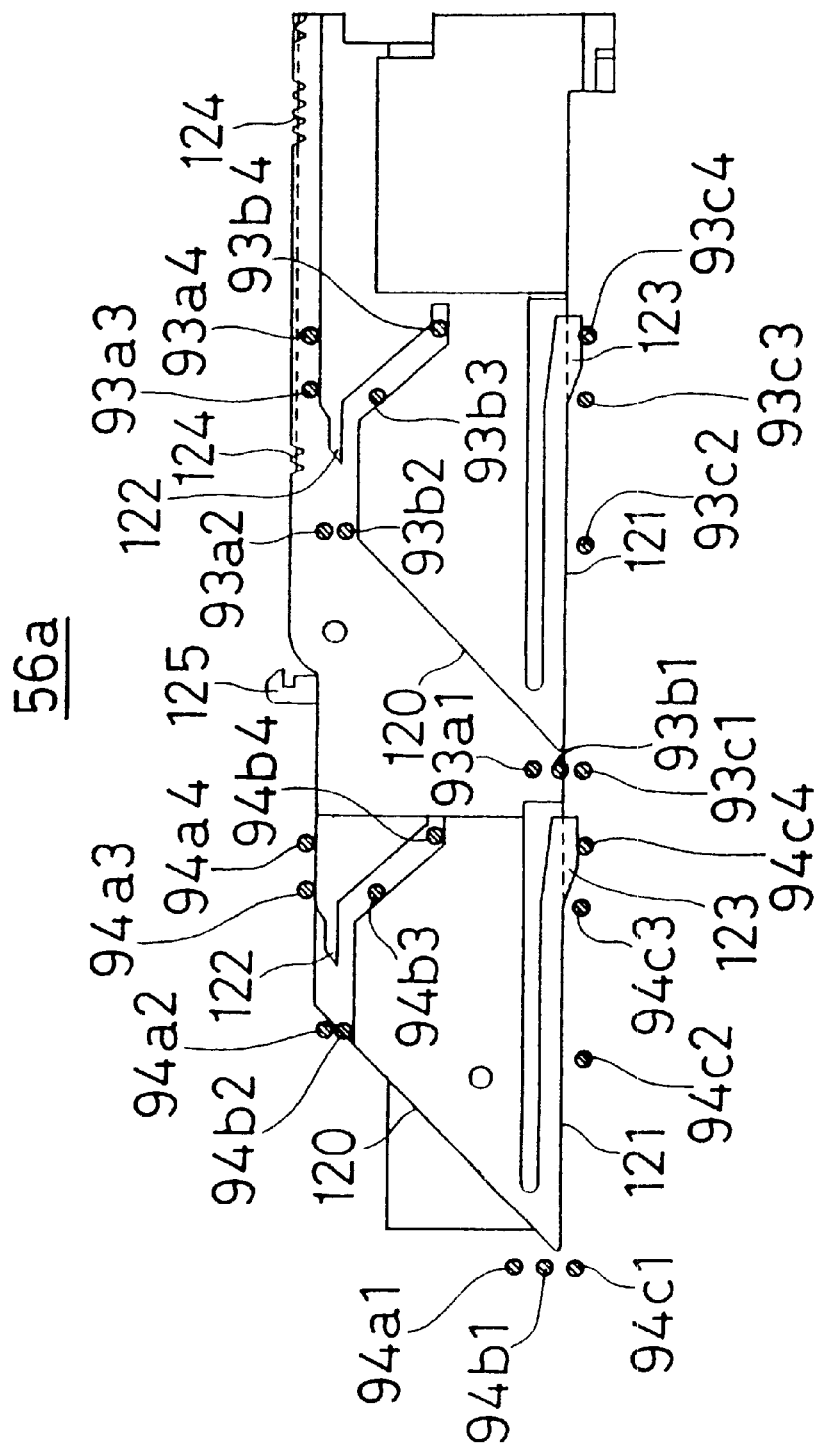
FIG. 30 is a side view of the separating slide plate 56a of FIG. 28A.

FIG. 30 shows the shape of the separating slide plate 56 that can separate the stocker 23 at a desired position. Two pairs of upper and lower cams 120 and 121 are formed on the separating slide plate 56, one upper/lower cam pair in the forward section and the other pair in the rearward section of the plate. The separating projections 93 to 96 of the holder 39 accommodated in the acccommodating position at which the stocker 23 is to be separated move upward along the slopes of the upper cams 120. The lower cams 121 act to press down the upper faces of the separating projections 93 to 96 of the holder located underneath the holder 39 at which the stocker 23 is separated. The separating projections 93 to 96 moving upward along the slopes of the upper cams 120 are separated by separators 122 between the holder 39 at the acccommodating position and the holder 39 above it. When the uppermost holder 39 is selected, the separating projections 106 to 109 on the top plate 104 are separated by the separators 122. The lower holder 39 is further pressed downward by the spring force of pressing portions 123. The forward and backward movements of the separating slide plate 56 are accomplished by driving the rack 124, provided in the forward upper section of the separating slide plate 56, by virtue of the pinion gear in the gear mechanism 86 or 87 shown in FIG. 22. A spring retainer 125 for interlocking with the PU lifting slide plate to be described later is provided on the upper side of the separating slide plate 56.

In FIG. 30, the relationships between the separating projections 93 and 94 and the moving position of the separating slide plate 56 are indicated by reference characters 93a1, 93a2, ..., 94c, etc. Characters "a", "b", and "c" following the numbers "93" and "94" designating the separating projections correspond to the holder 39 located above the selected holder 39, the selected holder 39, and the holder 39 located below the selected holder 39, respectively. If the selected holder 39 is the uppermost holder 39, the member located above it is the top plate 104. If the selected holder 39 is the lowermost holder 39, the member located below it is the bottom plate 101. The last numbers "1", "2", "3", and "4" correspond to the separated conditions of the stocker 23.

Referring to FIGS. 6 to 10, "1" indicates the stocker 23 in the closed condition corresponding to FIGS. 8F, 9A, 10F, and 10G. The number "2" indicates the separated condition corresponding to FIGS. 8B to 8E, 9B to 9E, 10B to 10E, and 10H to 10K. The number "3" indicates the condition corresponding to FIGS. 6H, 7A, 8A, 10A, and 10L. The number "4" indicates the condition corresponding to FIGS. 6A to 6G, 7B to 7F, and 9F to 9I.

Figure 31:
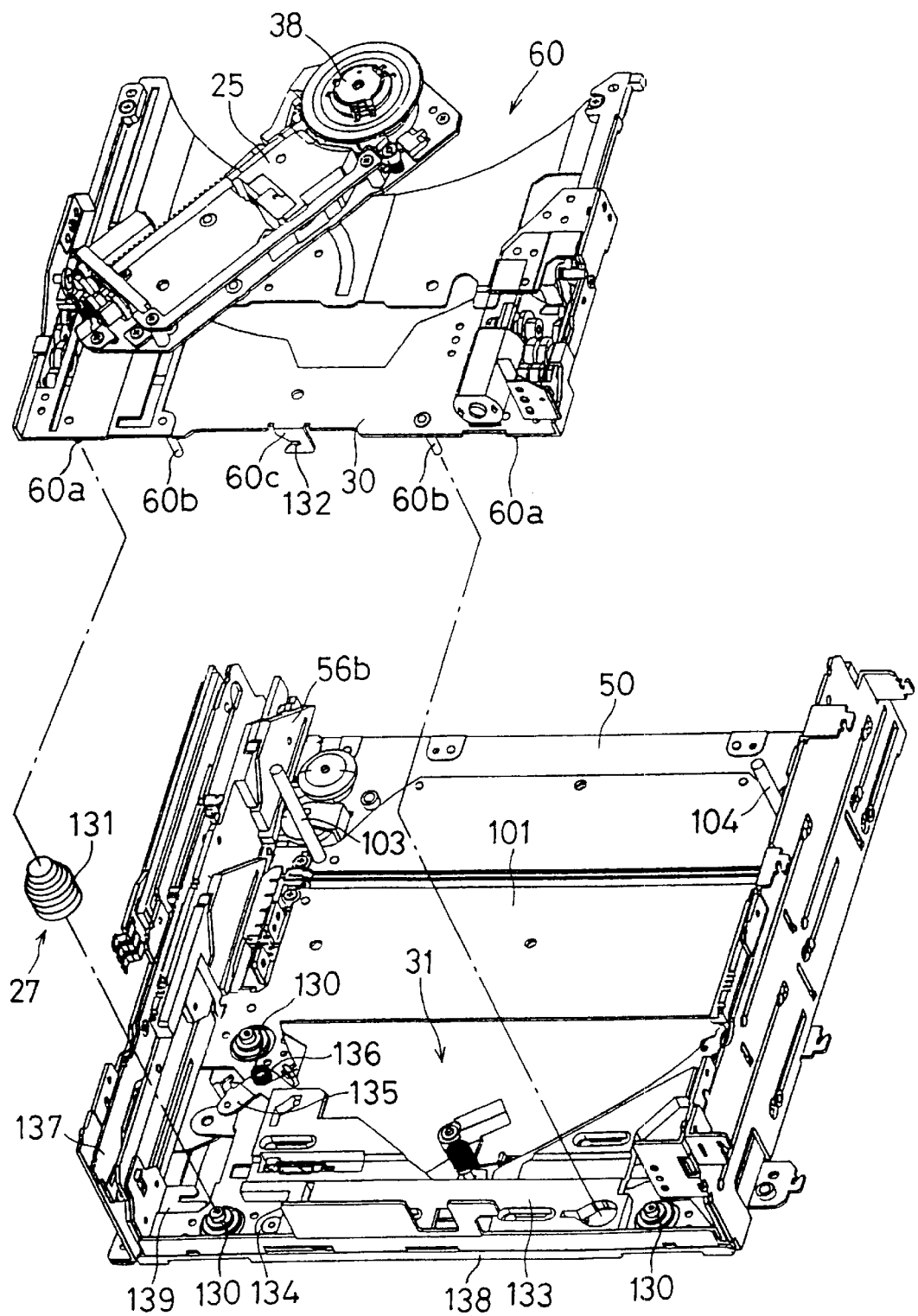
FIG. 31 is an exploded perspective view showing the construction relating to a floating mechanism 27 and a lock mechanism 31 shown in FIG. 1.

FIG. 31 shows a simplified schematic view of the floating mechanism 27 and the lock mechanism 31 for the slide base 30. The floating mechanism 27 includes dampers 130 mounted on the chassis 50, floating shafts 60a inserted in the dampers 130 from the slide base 30 side, and springs 131 disposed outwardly of the dampers 130 and the floating shafts 60a. Lock shafts 60b and a lock piece 60c are also provided on the slide base 30 in such a manner as to protrude toward the chassis 50. A locking notch 132 is formed in the lock piece 60c. The lock mechanism 31 mounted on the chassis 50 restrains the lock shafts 60b to prevent relative motion in a plane perpendicular to the thickness, i.e., in the horizontal plane, and restrains the vertical motion of the PU unit 25 by using the locking notch 132 of the lock piece 60c.

The lock mechanism 31 includes a lock member 133, a lock lever 134, an interlocking lever 135, and a spring 136. When the PU lifting slide plate 137 moves backward, and a lock release lever 139, moving along one side of a lifting base 138 in interlocking fashion with the PU lifting slide plate 137, angularly displaces the interlocking lever 135, the lock member 133 is caused to slide to the left in interlocking fashion.

The floating mechanism 27 constructed with the dampers 130 and springs 131 is provided on the outer circumferential side of the lock mechanism 31. The slide base 30 can be held in a stable and uniform floating condition with respect to the lifting base 138.

Figure 32:
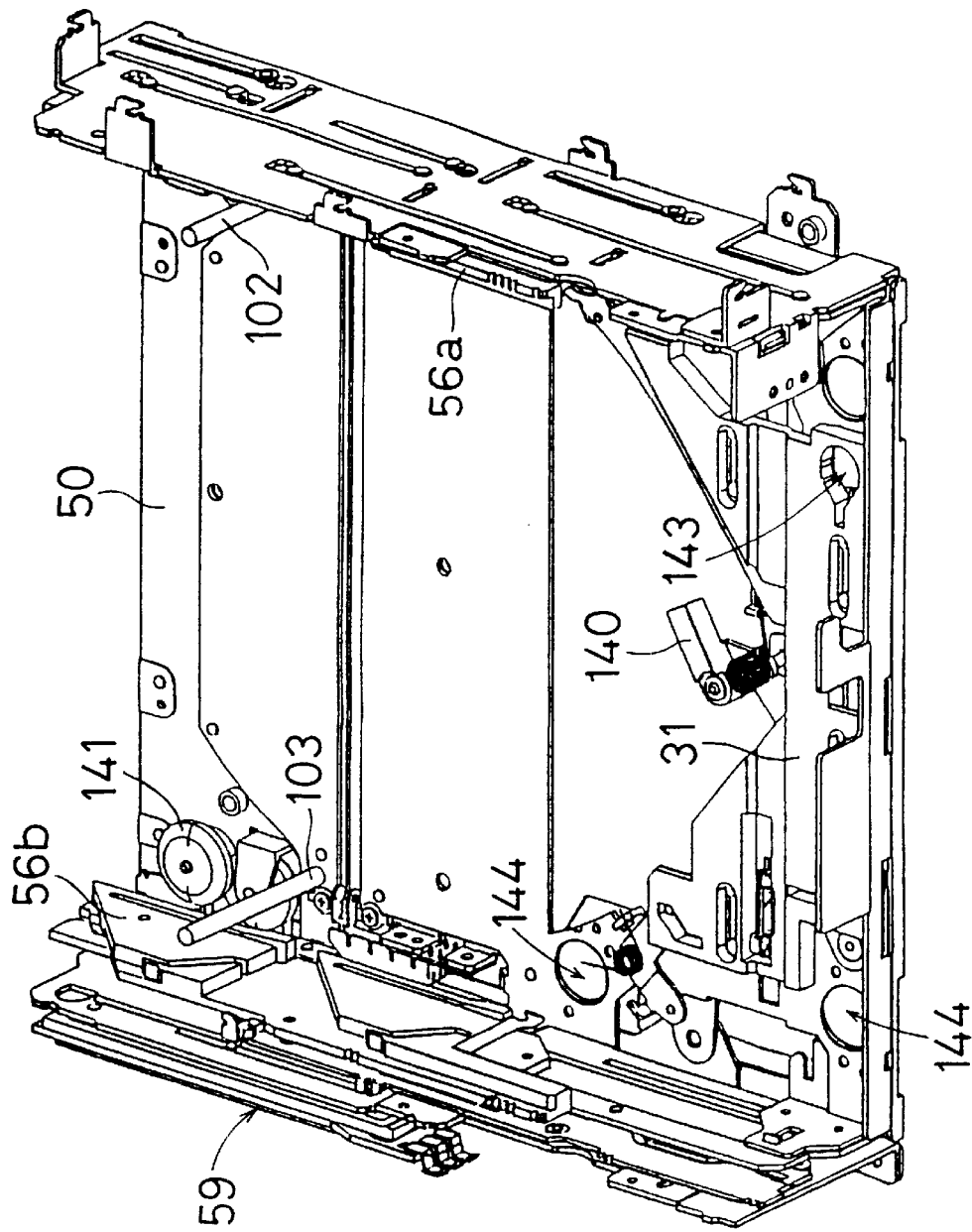
FIG. 32 is a perspective view showing the construction relating to a separating mechanism 28 shown in FIG. 1.
Figure 33:
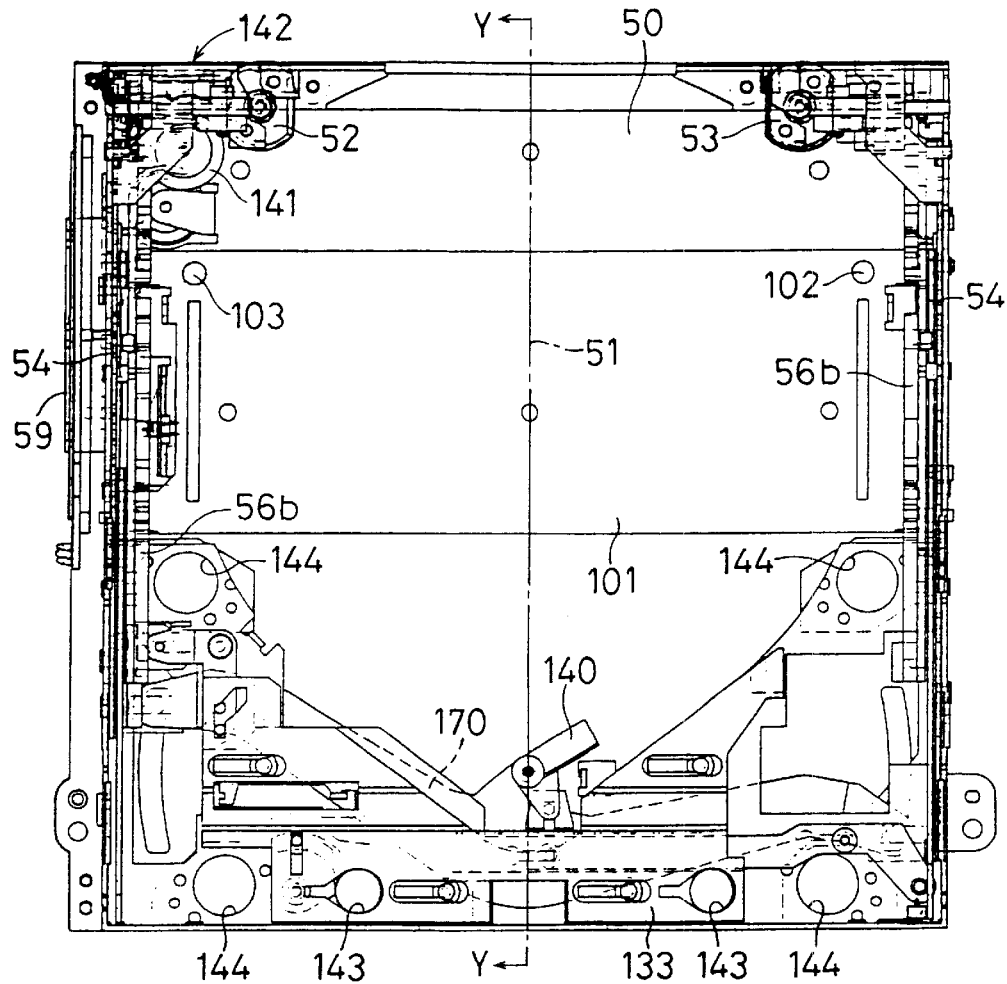
FIG. 33 is a plan view showing the mechanism section mounted on a chassis 50 in FIG. 31.
Figure 34:
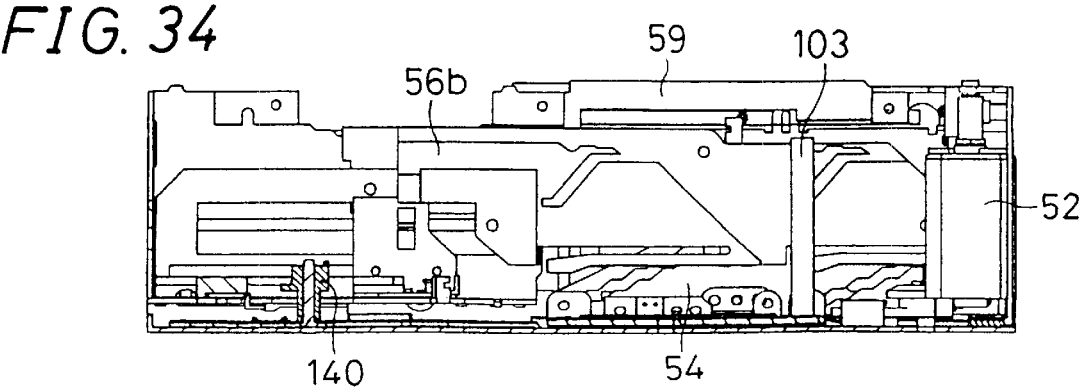
FIG. 34 is a cross sectional view taken along cutting line Y—Y in FIG. 33.

FIG. 32 shows an external view of the mechanism block with the separating mechanism 59, lock mechanism 31, etc. mounted on the chassis 50. Further, FIG. 33 shows a plan view of the mechanism block, and FIG. 34 shows a cross section taken along cutting line Y—Y.

A pressure lever 140 for pressing discs is disposed in the center of the front section of the chassis 50. When the stocker 23 is separated, the CDs 24 accommodated in the holders 39 in the lower separated section are pressed from the front side by the pressure lever 140 so that the CDs 24 do not come off the holders 39. The pressure lever 140 is moved angularly in interlocking fashion with the movement of the separating slide plate 56, and when the stocker 23 is not separated, the pressing force being applied to the CDs 24 is released. The rotational driving force from the lifting motor 52 is transmitted via a gear mechanism 142 to a spur gear 141 mounted on the chassis 50. The gear mechanism 142 includes a planetary gear mechanism which controls the transmission of the driving force to the spur gear 141 in interlocking fashion with the movement of the separating slide plate 56b. When the stocker 23 is separated by moving the separating slide plate 56b, the transmission path is shut off so that the driving force is not transmitted to the lifting slide plate 54.

Disposed in the front section of the chassis 50 is the lock mechanism 31 having lock holes 143 which engage with the lock shafts 60b protruding from the slide base 30 of the slide unit 60. Floating pins 60a provided in protruding fashion on the slide base 30, as shown in FIG. 31, are inserted into the dampers 130 mounted in damper mounting holes 144 disposed outward of the widthwise ends of the lock mechanism 31. Further, coil springs 131 are mounted, one on each damper 130, to support the slide unit 60 in a floating condition with respect to the chassis 50.

FIGS. 35A and 35B show the construction relating to a PU lifting slide plate 137 for moving the slide base 30 up and down in interlocking fashion with the separating slide plate 56. FIG. 35A shows the PU lifting slide plate 137 itself, and FIG. 35B shows the lifting slide plate 137 mounted on the chassis 50 as viewed from the left side thereof.

As shown in FIG. 35A, PU lifting slots 151 for moving the slide base 30 up and down are formed in the PU lifting slide plate 137. The PU lifting slide plate 137 moves backward and forward by being guided by pins 152. An interlocking slot 153 engages on the pin 126 of the separating slide plate 56 and, when the separating slide plate 56 moves backward more than a certain distance, causes the PU lifting slide plate 150 to move backward in interlocking fashion, causing the rack 154 formed on the upper side to engage with the pinion gears 87 of the gear mechanism 86, and thereby enabling the PU lifting slide plate 137 to move further backward. The PU lifting slide plate 137 is also provided with a spring retainer 155 on which one end of a coil spring, whose other end is supported on the spring retainer 125 of the separating slide plate 56, is hooked.

As shown in FIG. 35B, the PU lifting slide plate 137 is mounted on a side plate 160 of the chassis 50. Slide slots 161 serving as cams are formed in the side plate 160, and the pins 152 of the PU lifting slide plate 150 engage in the slots which thus guide the backward/forward movement of the PU lifting slide plate 150. Mounted below the PU lifting slide plate 150 is the lifting slide plate 54.

The PU lifting slide plate 150 can be made integral with the separating slide plate 56. In that case, the PU lifting slots 151 are formed in the separating slide plate 56. By providing these slide plates separately as in the present embodiment, the length necessary in the longitudinal direction can be reduced.

Figure 36:
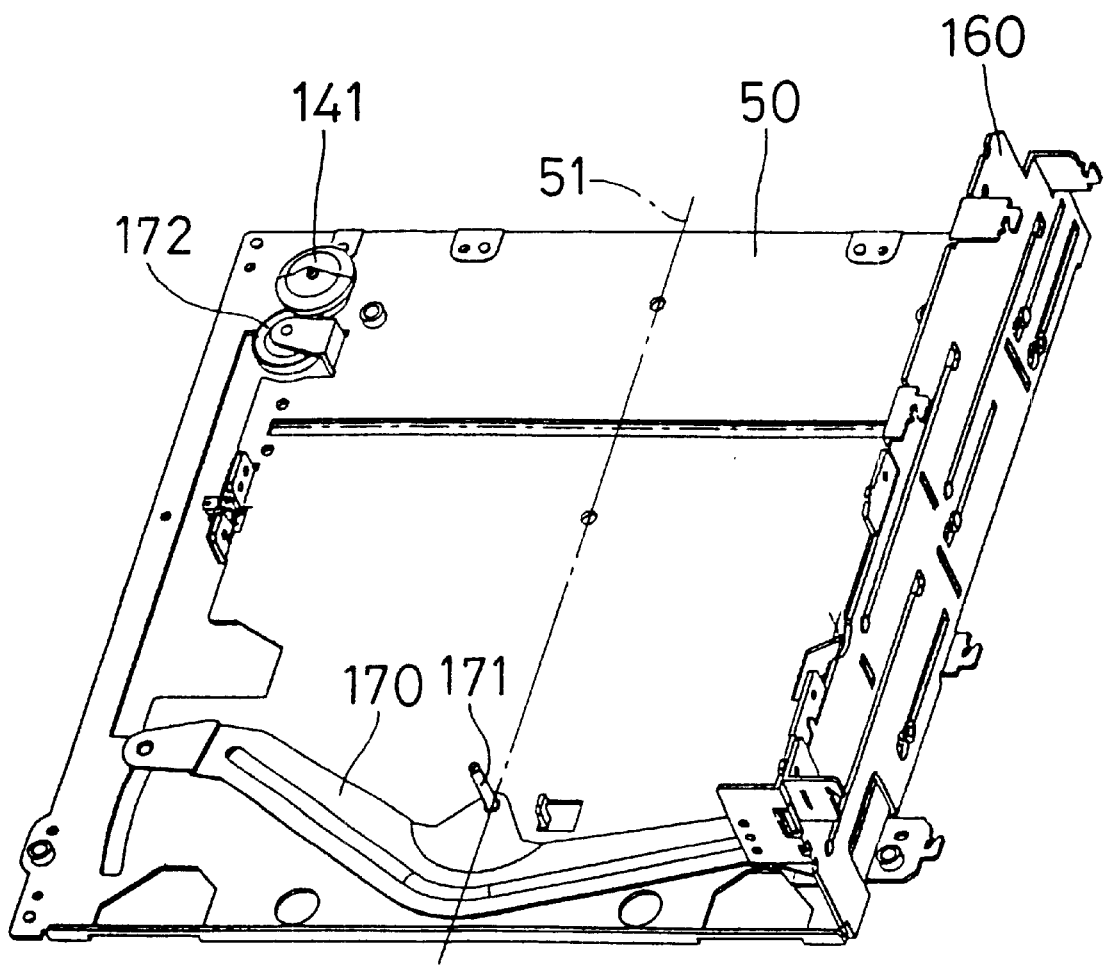
FIG. 36 is a perspective view of a basic mechanism section relating to the chassis 50 shown in FIG. 32.
Figure 37:
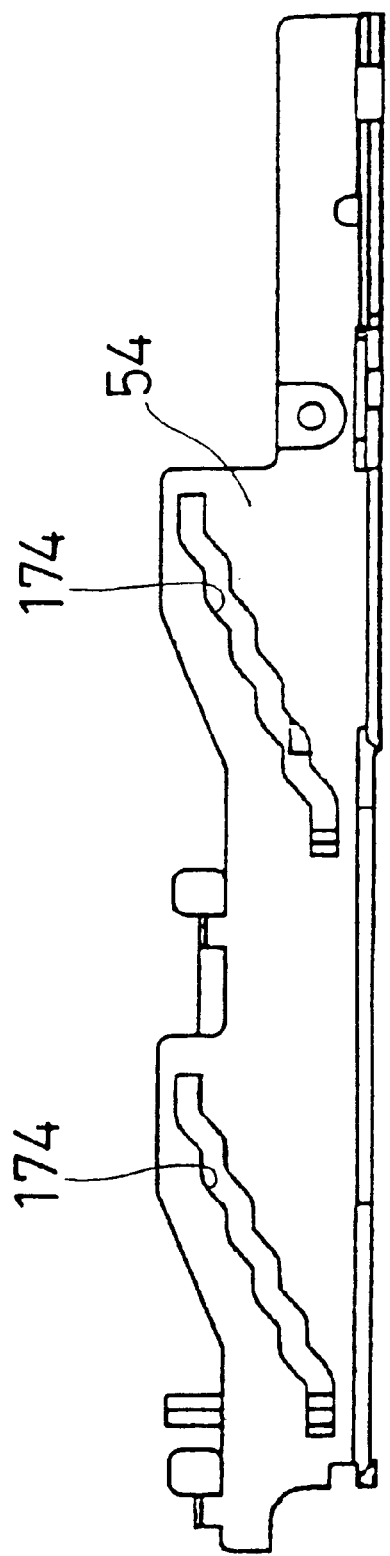
FIG. 37 is a left-side view showing the construction of a lifting slide plate 54 shown in FIG. 15.

FIG. 36 shows the basic drive mechanism for the lifting slide plates 54, mounted on the chassis 50, and FIG. 37 shows the construction of the lifting slide plate 54 itself. The lifting slide plates 54 on both sides are mechanically linked together by an interlinking lever 170 located in the forward section of the chassis 50, and move in opposite directions to each other in such a manner that when one moves in the forward direction, the other moves in the backward direction. The interlinking lever 170 is mounted swingably about a support shaft 171 at the center. The left-side lifting slide plate 54 is moved backward and forward by the driving force transmitted from the lifting motor 52 to a pinion gear 172 via a bevel gear 141.

As shown in FIG. 37, step-like slots 174 are formed in each lifting slide plate 54, and are engaged with the pins that are protruded horizontally from the bottom plate 101 of the stocker 23. The step-like slots 174 work as cams and move the entire construction of the stocker 23 up and down. When selecting an accomodating position to be separated, the stocker 23 is moved up or down so that the position between the holders 39 at which the stocker 23 is to be separated is brought to the same height as the height of the tip of the separating slide plate 56. In the present embodiment, the holder 39 located above the separating position is selected, but it is equally possible to make the construction so that the holder 39 below the separating position is selected.

Figure 38A:
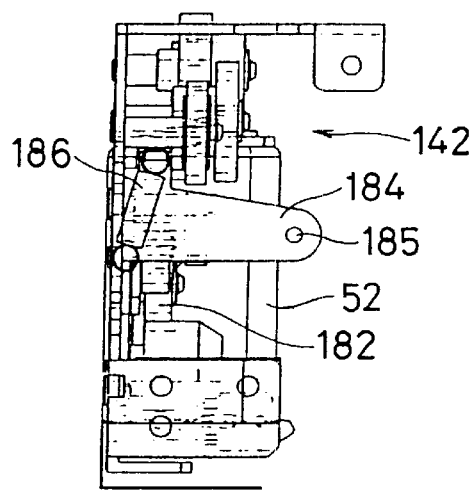
FIG. 38A is a left-side view of a gear mechanism 142 for transmitting the driving force from a lifting motor 52 shown in FIG. 12.
Figure 38B:
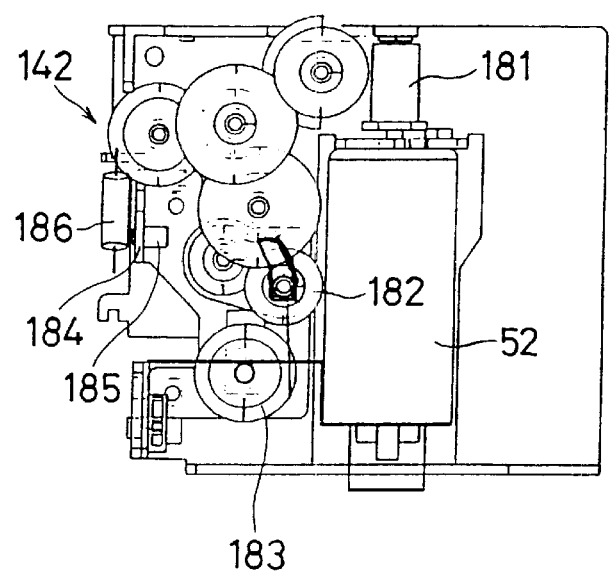
FIG. 38B is a front view of the gear mechanism 142 for transmitting the driving force from the lifting motor 52 shown in FIG. 12.

FIGS. 38A and 38B show the construction of a gear mechanism 142 interposed between the bevel gear 141 shown in FIG. 33 and the lifting motor 52. FIG. 38A is a left-side view, and FIG. 38B is a front view. The driving force is transmitted to the gear mechanism 142 via a worm gear 181 mounted to the output shaft of the lifting motor 52. Inside the gear mechanism 142 is provided a planetary gear 182 which engages or disengages the driving force transmission to a bevel gear 183. When a pin 185 at the end of a clutch lever 184 is pressed by the tip of the separating slide plate 56b, the planetary gear 182 is so displaced as to be disengaged from the bevel gear 183. As long as the pin 185 is not pressed by the tip of the separating slide plate 56b, a spring 186 keeps the planetary gear 182 in engagement with the bevel gear 183 so that the driving force is transmitted from the planetary gear 182 to the bevel gear 183 and then from the bevel gear 183 via the bevel gear 141 of FIG. 33 to drive the lifting slide plate 54.

The movement of the separating slide plate 56b that stops the driving of the lifting slide plate 54 corresponds to the condition indicated by the reference characters 93a4, 93b4, 93c4, 94a4, 94b4, and 94c4 in FIG. 30, in which condition the stocker 23 is separated and the selected holder 39 is positioned downward of the turn table 38. In this condition, only the PU lifting slide plate 130 is driven by the driving force of the splitting motor 54 to move the PU unit 25 up and down.

Figure 39A:
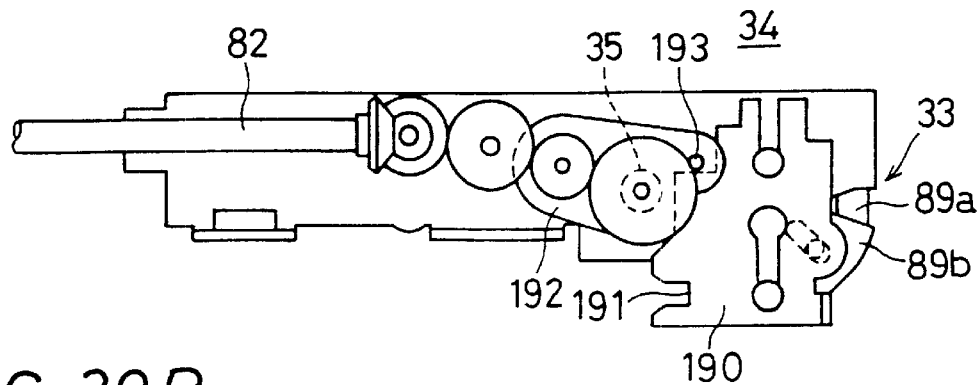
FIGS. 39A and 39B are partial left-side views showing in simplified form the lifting condition of the insertion/ejection roller 35 in the insertion/ejection mechanism 34 of FIG. 22.
Figure 39B:
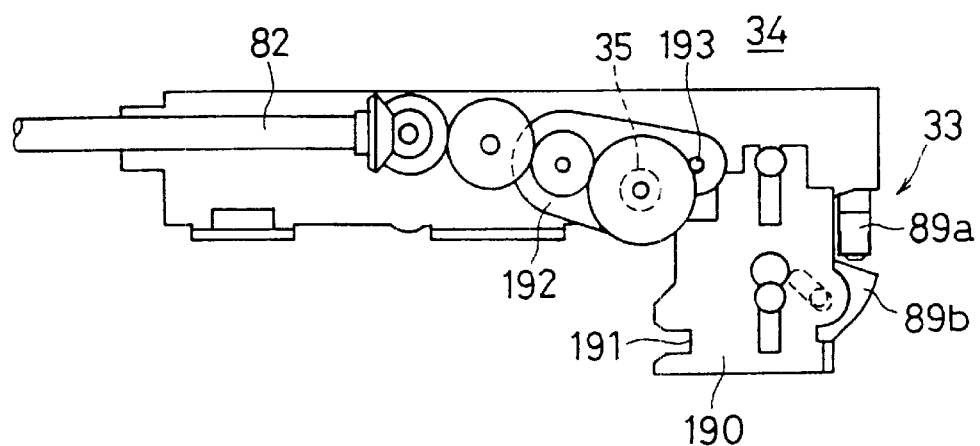

FIGS. 39A and 39B show the lifting operation of the insertion/ejection roller 35 in the insertion/ejection mechanism 34. FIG. 39A shows the lifted condition. The lifting plate 190 is pulled up by a spring, which also pushes up the open/close stopper 89b. As a result, the open/close pin 89a closes the insertion/ejection slot 33. An abutting portion 191, against which the pin 61a provided on the slide plate 61 shown in FIG. 18 abuts for engagement, is formed on the lifting plate 190. When the lifting plate 190 moves up, the pin 193 of the lever 192 is pushed up, as a result of which the insertion/ejection roller 35 whose shaft is attached to the lever 192 is moved upward.

FIG. 39B shows the condition in which the pin 61a shown in FIG. 18 is caused to abut against the abutting portion 191 of the lifting plate 190 and the slide base 30 is moved downward by virtue of the PU lifting slide plate 130, while also moving down the pin 61a of the slide unit 60, thus moving down the lifting plate 160 in interlocking fashion. Since the pushing force of the lifting plate 190 being applied to the pin 193 of the lever 192 is released, the insertion/ejection roller 35 moves down. Further, since the open/close stopper 89b also moves down, the open/close pin 89a is now allowed to retract when a CD 24 is inserted, and the closed condition of the insertion/ejection slot 33 is thus released.

Figure 40:
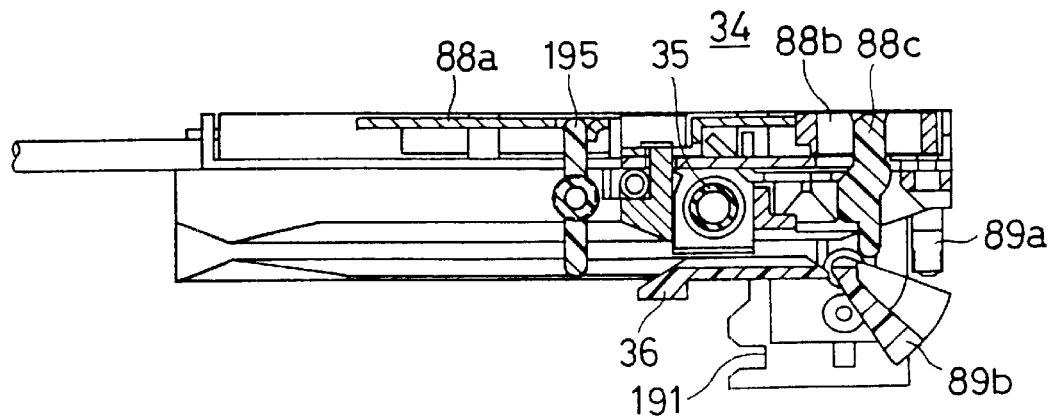
FIG. 40 is a cross sectional left-side view of the insertion/ejection mechanism 34 of FIGS. 39A and 39B.

FIG. 40 shows the condition of FIG. 39B in cross section. An insertion/ejection lever 195 is disposed inwardly of the insertion/ejection roller 35 and the supporting plate 36. The insertion/ejection lever 195, as will be described later, displaces an open/close slide plate 88a in the forward direction when the CD 24 is being inserted. When ejecting the CD 24, the open/close slide plate 88a is not displaced, but the ejection completion switch 90d shown in FIG. 22 is activated.

Figure 41A:
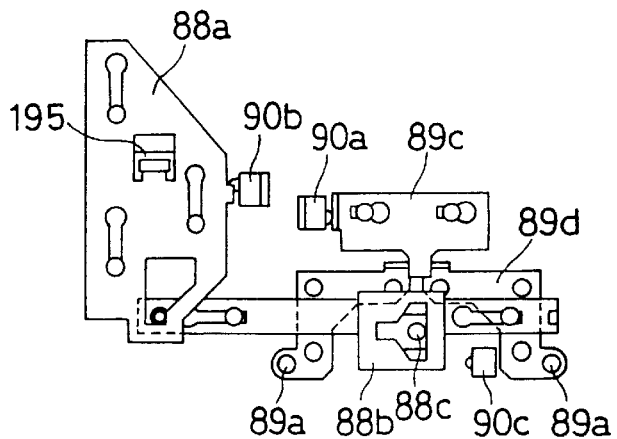
FIGS. 41A to 41D are partial plan views showing in simplified form the operating conditions of the insertion/ejection mechanism of FIG. 22.
Figure 41B:
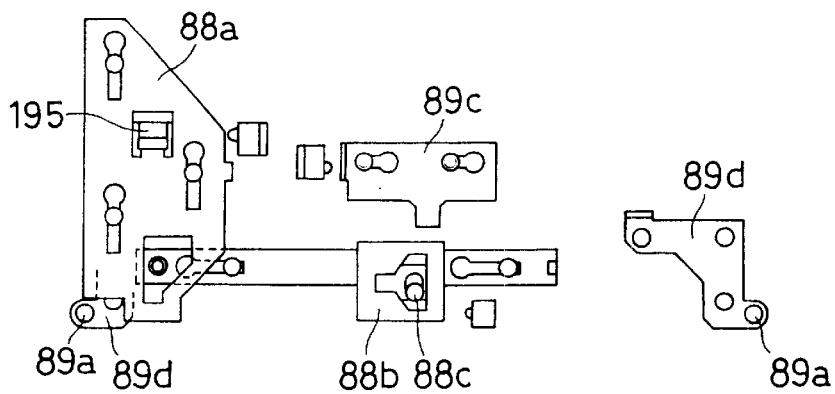

FIGS. 41A, 41B, 41C, and 41D show the operation of the open/close mechanism. FIG. 41A shows the condition before the insertion of the CD 24. When the CD 24 is inserted, the open/close pins 89a are displaced by being pushed to the left and right, respectively, and the pin mounting plate 89d preventing the displacement of the pin slide plate 89c moves, allowing the pin slide plate 89c to be displaced by a spring and thus activating the insertion detection switch 90a. When the CD 24 is further inserted, the insertion/ejection lever 195 is pushed, and the open/close slide plate 88a is thus displaced in the forward direction. This activates the insertion presence/absence switch 90b, as shown in FIG. 41B. Though the shutter member 88c tilts by being pressed from the front side, this does not interfere with the insertion of the CD 24.

Figure 41C:
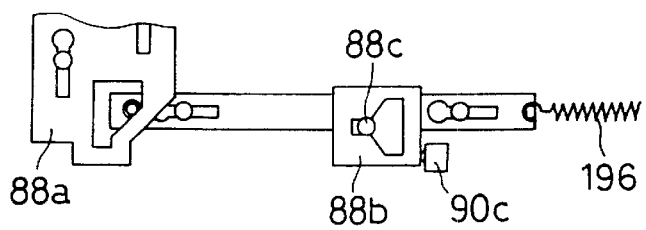

FIG. 41C shows the condition in which the CD 24 is drawn into the apparatus. Since the shutter sliding member 88b is pulled by the spring 196, the shutter sliding member 88b attempts to move rightward when the open/close slide plate 88a is displaced in the forward direction. When the CD 24 is drawn inside the apparatus, and the shutter member 88c is restored from the tilting state, the shutter sliding member 88b is displaced to the right to lock the shutter member 88c in position.

Also, the insertion completion switch 90c is activated.

Figure 41D:
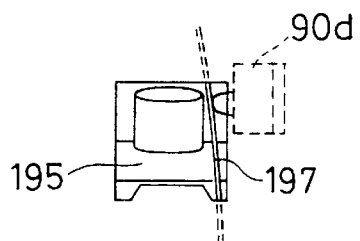

FIG. 41D shows the insertion/ejection lever 195 activating the ejection completion switch 90d when the CD 24 is ejected. When the CD 24 is still not ejected, and the insertion/ejection lever 195 is tilted, the ejection completion switch 90d is pressed by a plate spring 197. When the ejection of the CD 24 is completed, the pressing force being applied by the plate spring 197 is released. The ejection completion switch 90d detects this change in the pressing force of the plate spring 197.

Figure 42A:
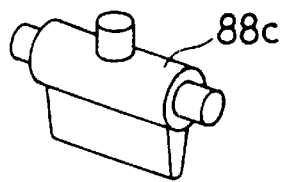
FIG. 42A is a perspective view showing the shape of a shutter member 88c shown in FIGS. 41A–41D.
Figure 42B:
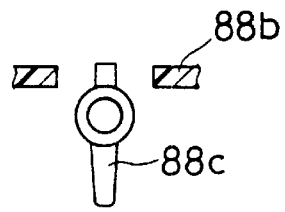
FIGS. 42B and 42D are simplified cross sectional views showing the operation of the shutter member 88c of FIGS. 41A–41D.
Figure 42C:
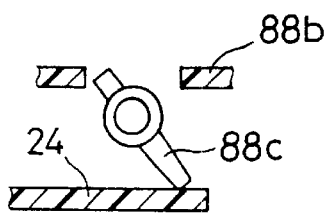
Figure 42D:
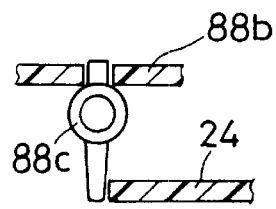

FIGS. 42A, 42B, 42C, and 42D show the shape and operation of the shutter member 88c. The shutter member 88c of the shape shown in FIG. 42A does not interfere with the insertion of the CD 24, as shown in FIGS. 42B and 42C. When the CD 24, once drawn inside, is moved in the reverse direction, the shutter member 88c is locked in position, as shown in FIG. 42D, preventing further movement of the CD 24 in the reverse direction. When ejecting the CD 24, since the open/close slide plate 88a is set in the position shown in FIG. 41A, the shutter member 88c is not locked and the CD 24 can be ejected.

Figure 43A:
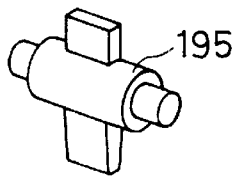
FIG. 43A is a perspective view showing the shape of an insertion/ejection lever 195 shown in FIGS. 41A–41D.
Figure 43B:
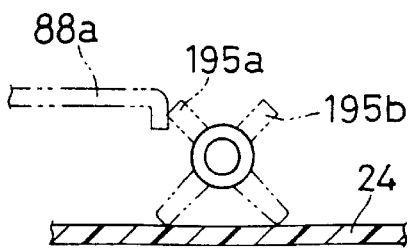
FIG. 43B is a simplified cross sectional view showing the operation of the insertion/ejection lever 195 of FIGS. 41A–41D.

FIGS. 43A and 43B show the shape and operation of the insertion/ejection lever 195. The insertion/ejection lever 195 such as shown in FIG. 43A tilts differently during insertion 195a than during ejection 195b, as shown in FIG. 43B. Accordingly, the open/close slide plate 88a is displaced during insertion, but is not displaced during ejection.

Figure 45:
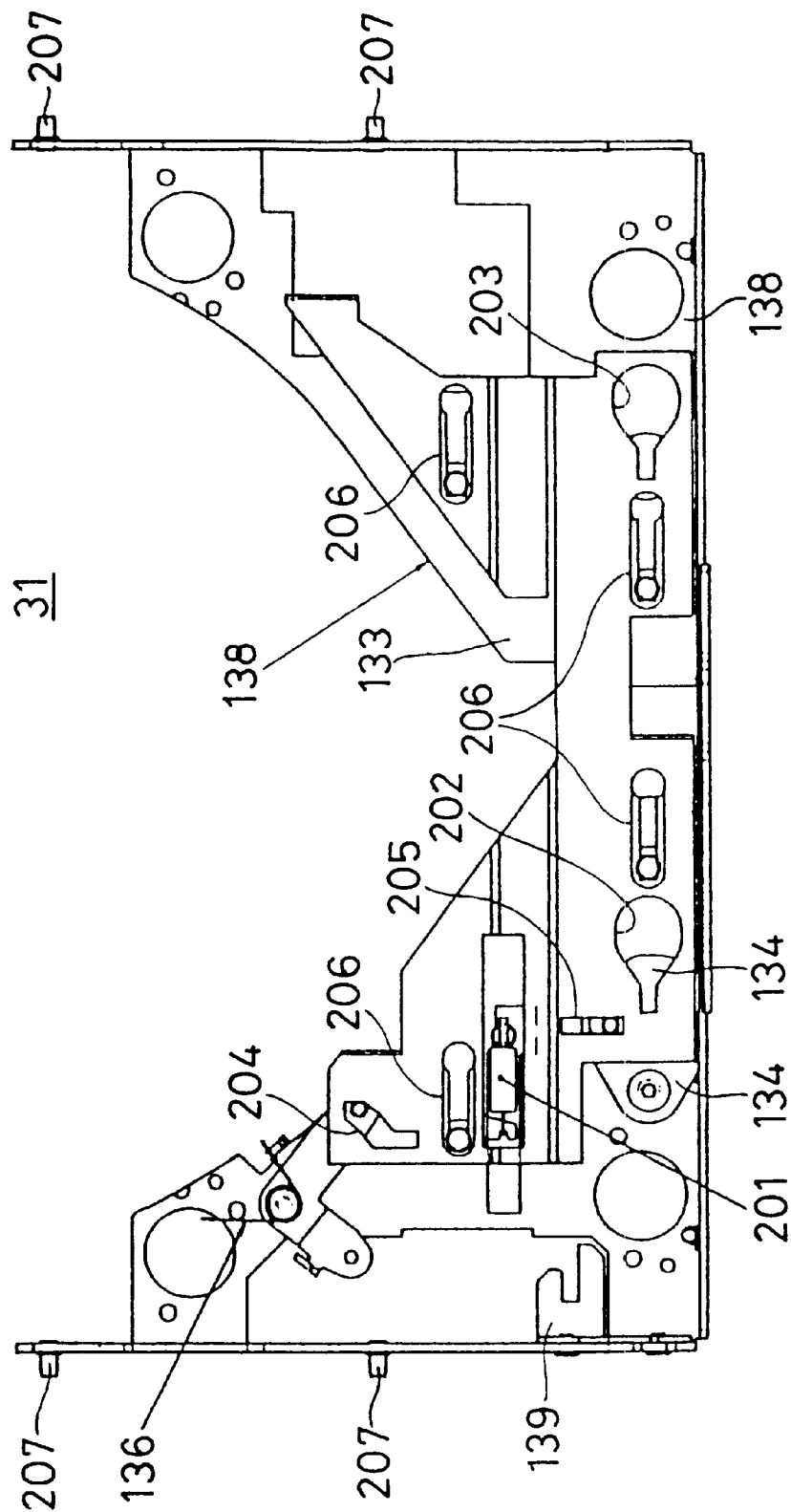
FIG. 45 is a plan view of the lock mechanism 31 of FIG. 44.

FIGS. 44 and 45 show the construction of the lock mechanism 31 of FIG. 31. FIG. 44 shows a perspective view, and FIG. 45 shows a plan view. The lock member 133 is urged by a spring 201, and is normally displaced to the right as shown.

Shaft lock holes 202 and 203 through which the lock shafts 60b shown in FIG. 31 are inserted, an interlocking guide slot 204, a locking guide slot 205, and a slide slot 206 are formed in the lock member 133. An outwardly protruding pin 207 is provided on each side of the lifting base 138.

Figure 46:
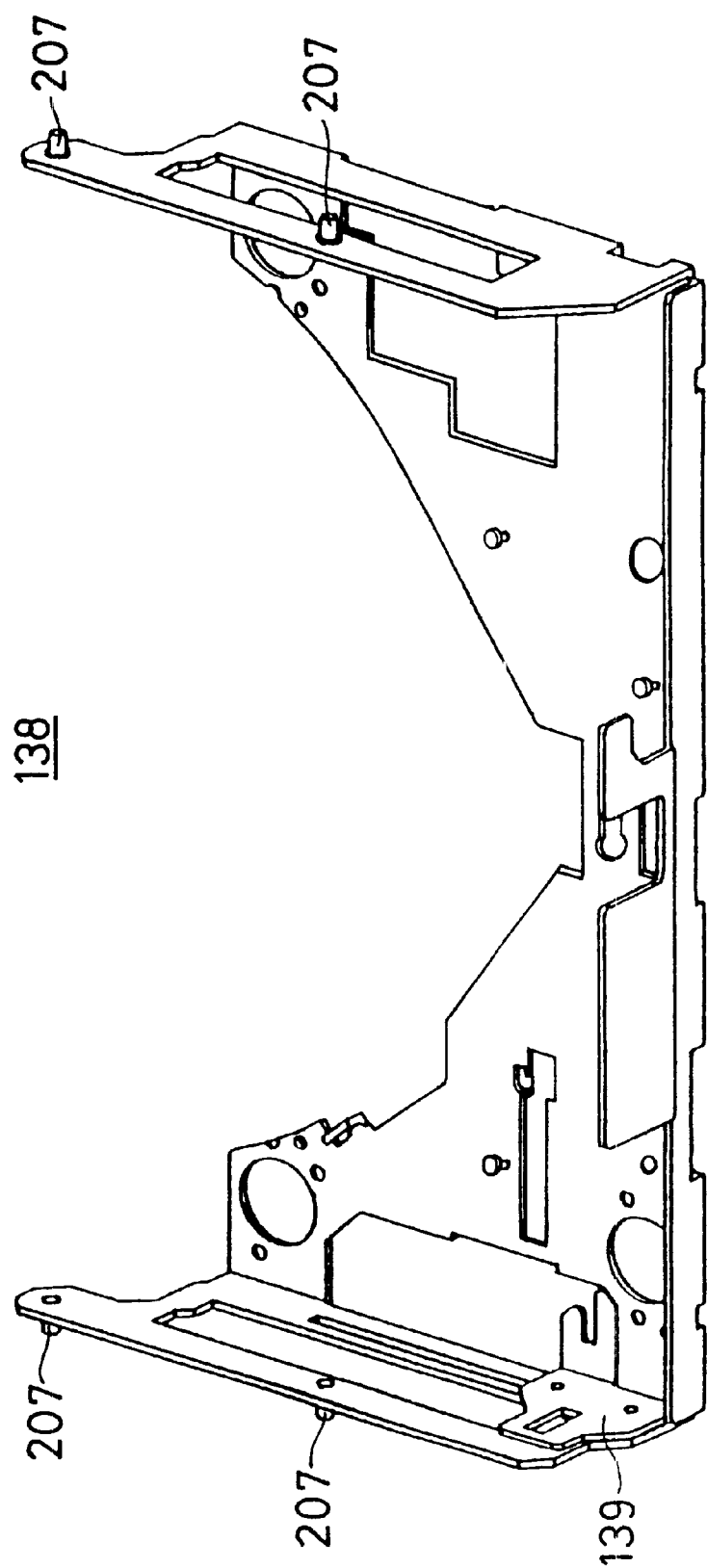
FIG. 46 is a perspective view of a lifting base 138 shown in FIG. 31.

FIGS. 46 and 47 show the shapes of the lifting base 138 and the lock member 133, respectively. The lock member 133 is also provided with a lock portion 210 for engaging with the locking notch 132 which is an engaging portion of the lock piece 60c.

FIGS. 48A, 48B, and 48C show the shapes of the lock release lever 139, interlocking lever 135, and lock lever 134 shown in FIG. 44, respectively. As shown in FIG. 48A, the lock release lever 139 has an elongated hole 211 extending vertically, a pin 212, and a pressing portion 213. As shown in FIG. 48B, the interlocking lever 135 has a shaft hole 214 and pins 215 and 216. As shown in FIG. 48C, the lock lever 134 has a support shaft 217, a pin 218, and a restraining portion 219.

Figure 49:
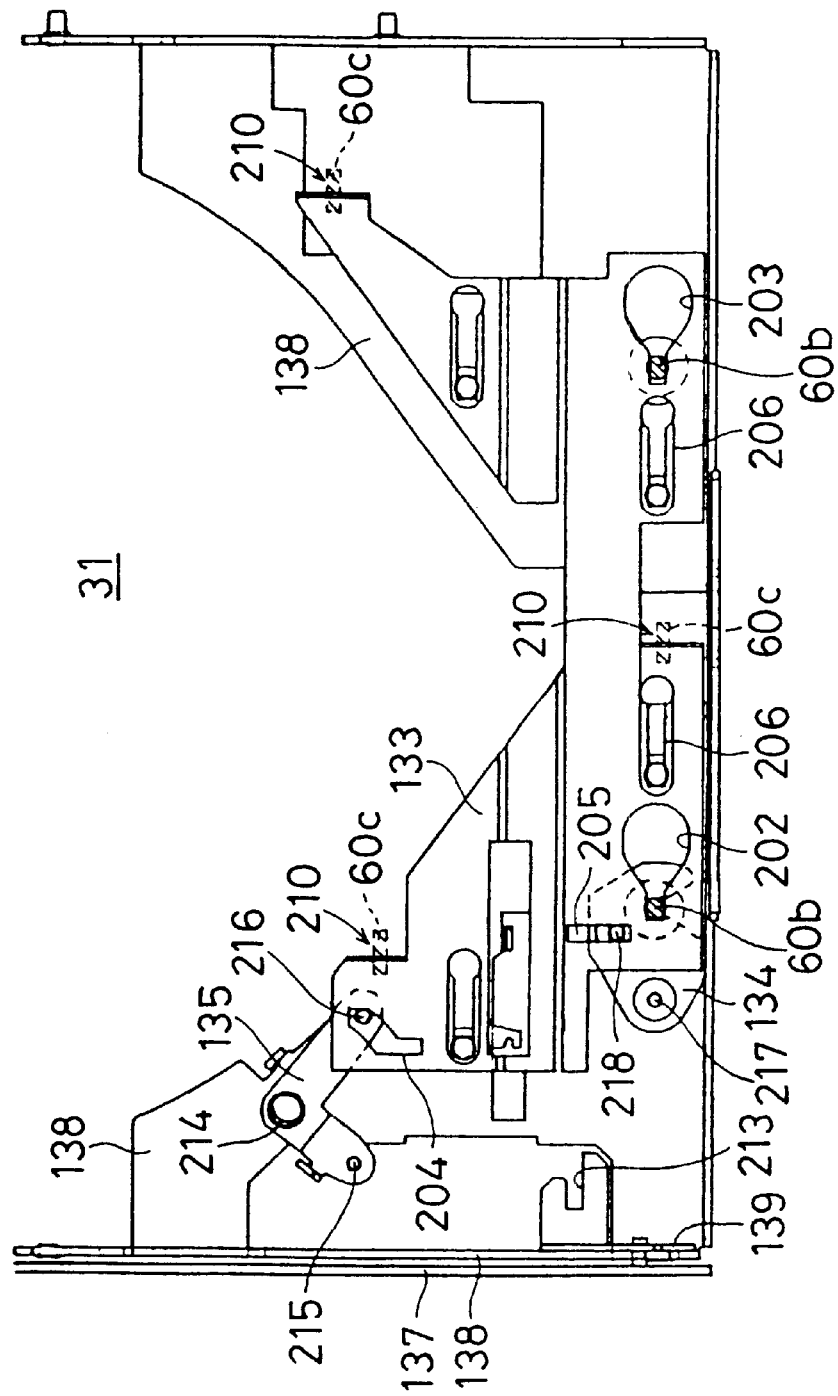
FIG. 49 is a partial plan view showing the lock mechanism 31 of FIG. 44 in a locked condition.

FIG. 49 shows the locked condition in which the lock shafts 60b and lock piece 60c are restrained by the lock mechanism 31. The lock shafts 60b are caught in the smaller diameter portions of the shaft lock holes 202 and 203 and restrained from displacing in a plane parallel to the moving direction of the lock member 133. In the shaft lock hole 202, in particular, the lock lever 134 also acts to restrain the parallel displacement. Further, the lock portion 210 engages with the locking notch 132 of the lock piece 60c to restrain its axial, i.e., vertical, displacement.

Figure 50:
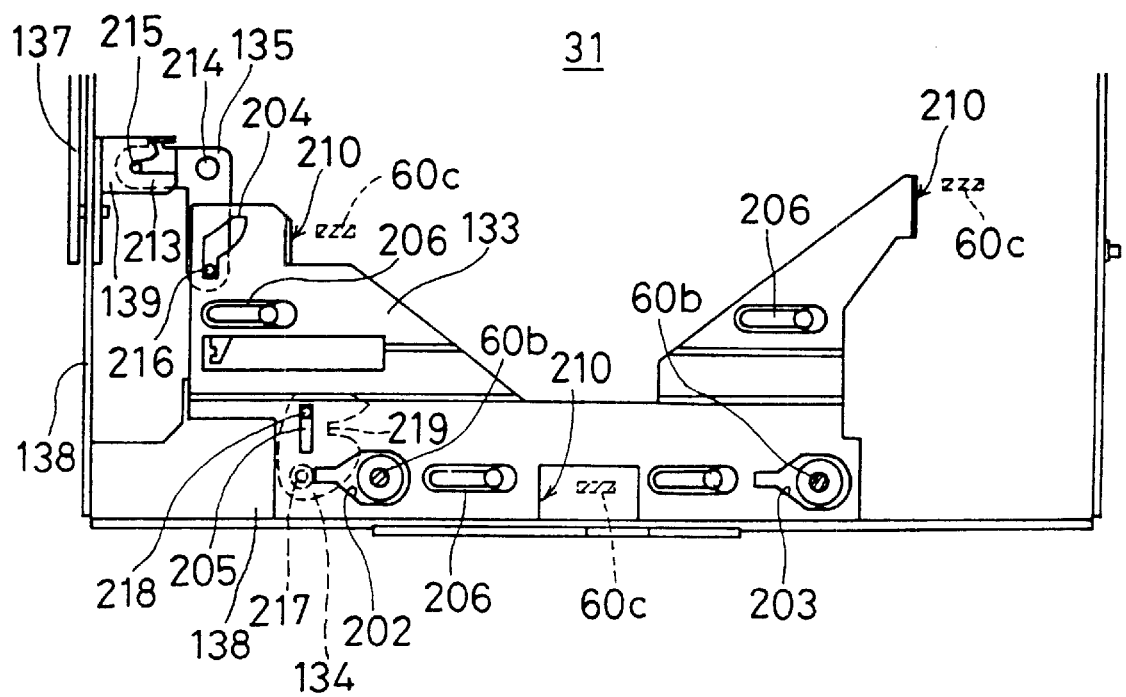
FIG. 50 is a partial plan view showing the lock mechanism 31 of FIG. 44 in an unlocked condition.

FIG. 50 shows the unlocked condition in which the restraints imposed by the lock mechanism 31 are released. When the lock release lever 139 is displaced in the backward direction in interlocking fashion with the backward movement of the PU; lifting slide plate 137, the pressing portion 213 presses the pin 215 of the interlocking lever 135. The interlocking lever 135 is angularly displaced in the clockwise direction, and the driving force is transmitted from the pin 216 engaged in the interlocking guide slot 204 to the lock member 133. The lock member 133, which is displaceable left and right, is displaced to the left by being guided by the slide slot 206. With this displacement, the lock lever 134 is angularly displaced about the support shaft 217 with the pin 218 being guided by the locking guide slot 205 to unlock the lock shaft 60b from the restraining portion 219. The lock shafts 60b move into the larger diameter portions of the shaft lock holes 202 and 203, and the imposed restraints are thus released. The lock portion 210 also disengages from the lock piece 60c which is thus unlocked.

When viewed in reference to the floating condition achieved by the floating mechanism 27, the state in which the lock shafts 60b are positioned in the larger diameter portions, as shown in FIG. 50, defines the starting points of the shaft lock holes 202 and 203, and the state in which the lock shafts 60b are restrained by the smaller diameter portions, as shown in FIG. 49, defines the endpoints of the shaft lock holes 202 and 203. The combination of the shaft lock hole 202 and lock lever 134 and the shaft lock hole 203 constitute the first restrainer for restraining displacements in an imaginary plane containing the moving direction of the lock member 133, and the lock portion 210 constitutes the second restrainer for restraining displacements in the direction perpendicular to the imaginary plane.

Figure 51:
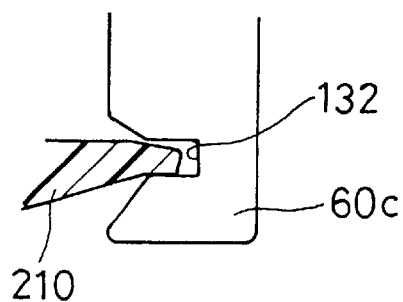
FIG. 51 is a partial cross sectional front view showing the condition in which a lock piece 60c is restrained by a lock portion 210 of the lock member 133 shown in FIG. 47.

FIG. 51 shows the lock piece 60c being restrained by the lock portion 210. The tip of the lock portion 210 engages with the locking notch 132 to restrain the displacement in the vertical direction.

Figure 52:
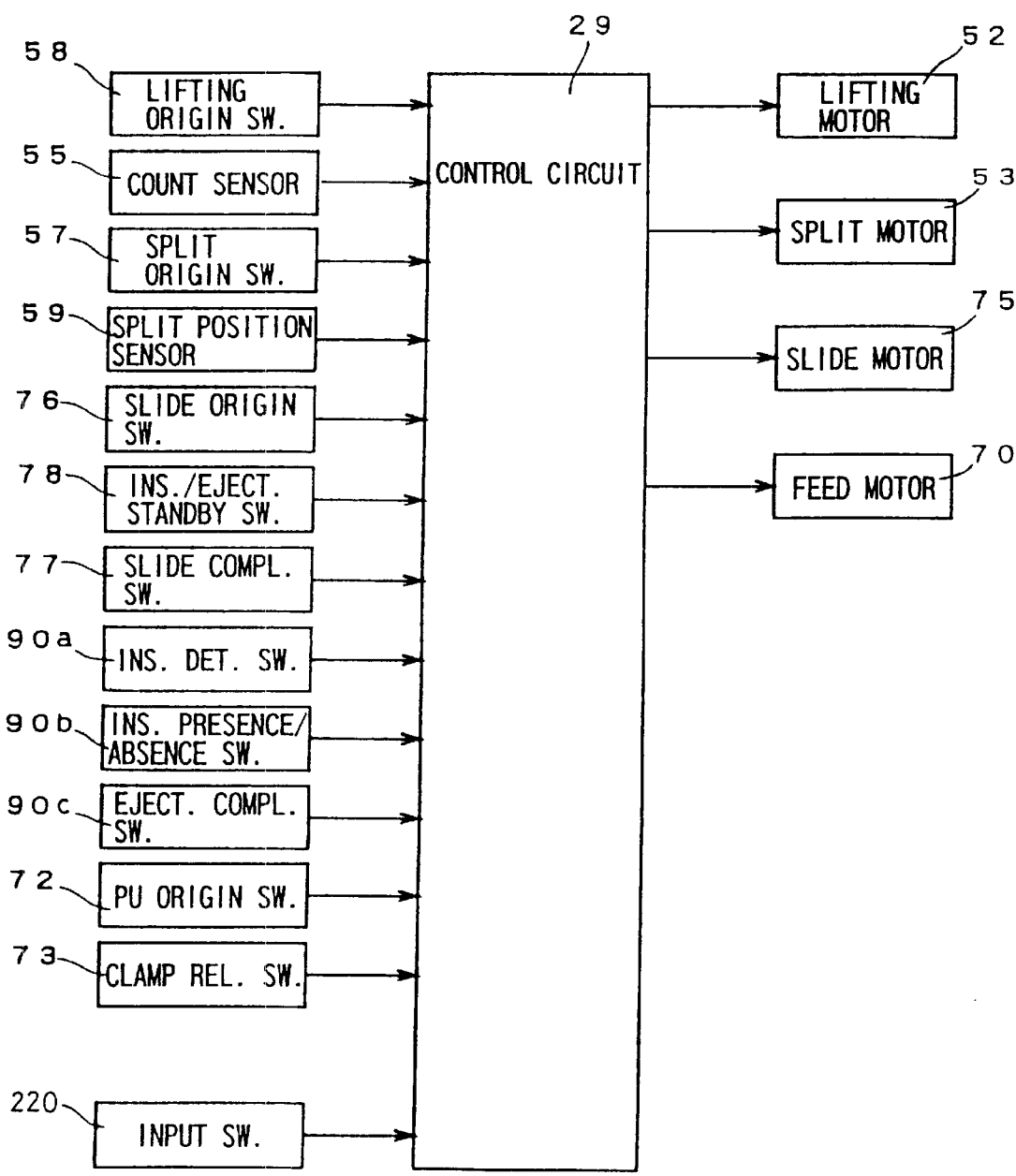
FIG. 52 is a block diagram showing in simplified form the electrical configuration of the CD playback apparatus 21 of FIG. 1.

FIG. 52 shows an electrical configuration for controlling the various parts of the CD playback apparatus 21 by the control circuit 29 in FIG. 1. The control circuit 29 includes a microcomputer or the like which performs various operations in accordance with a preset program. The kind of operation to be performed is specified in accordance with an instruction from an input switch 220 which includes the selector buttons 41 to 46 provided on the front panel 32.

FIGS. 53 to 72 show the control operations performed by the control circuit 29 of FIG. 52. Each motor can switch the direction of its rotation between clockwise direction (CW) and counterclockwise direction (CCW). The output value of the separating position sensor 59 is an analog-to-digital converted value and expressed as a hexadecimal number with a suffix "h".

Further, "const.", "inc.", and "dec." indicate that the value is constant, increases, or decreases, respectively.

Figure 55:
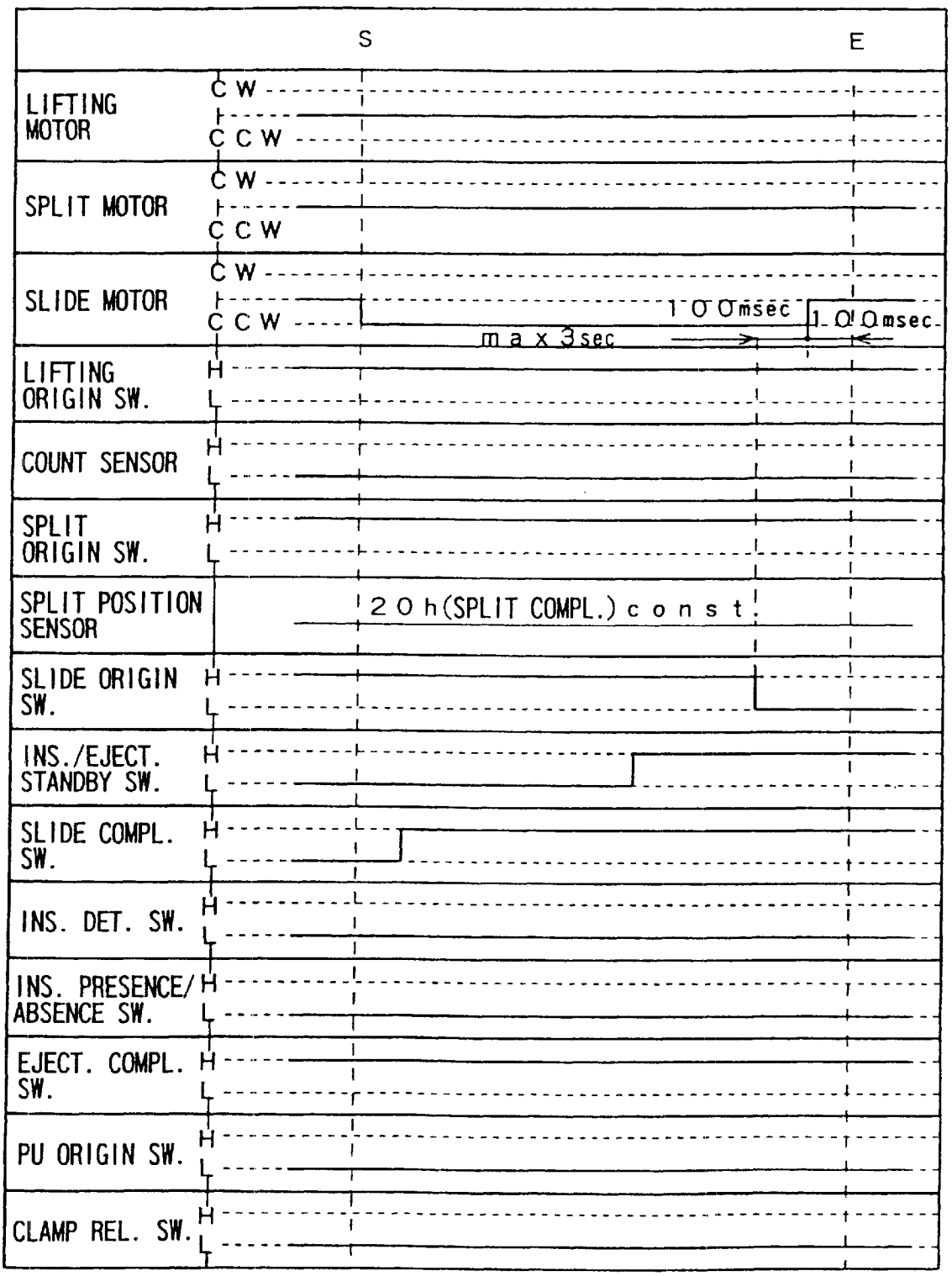
FIG. 55 is a timing chart illustrating the operation of the control circuit 29 of FIG. 52.
Figure 56:
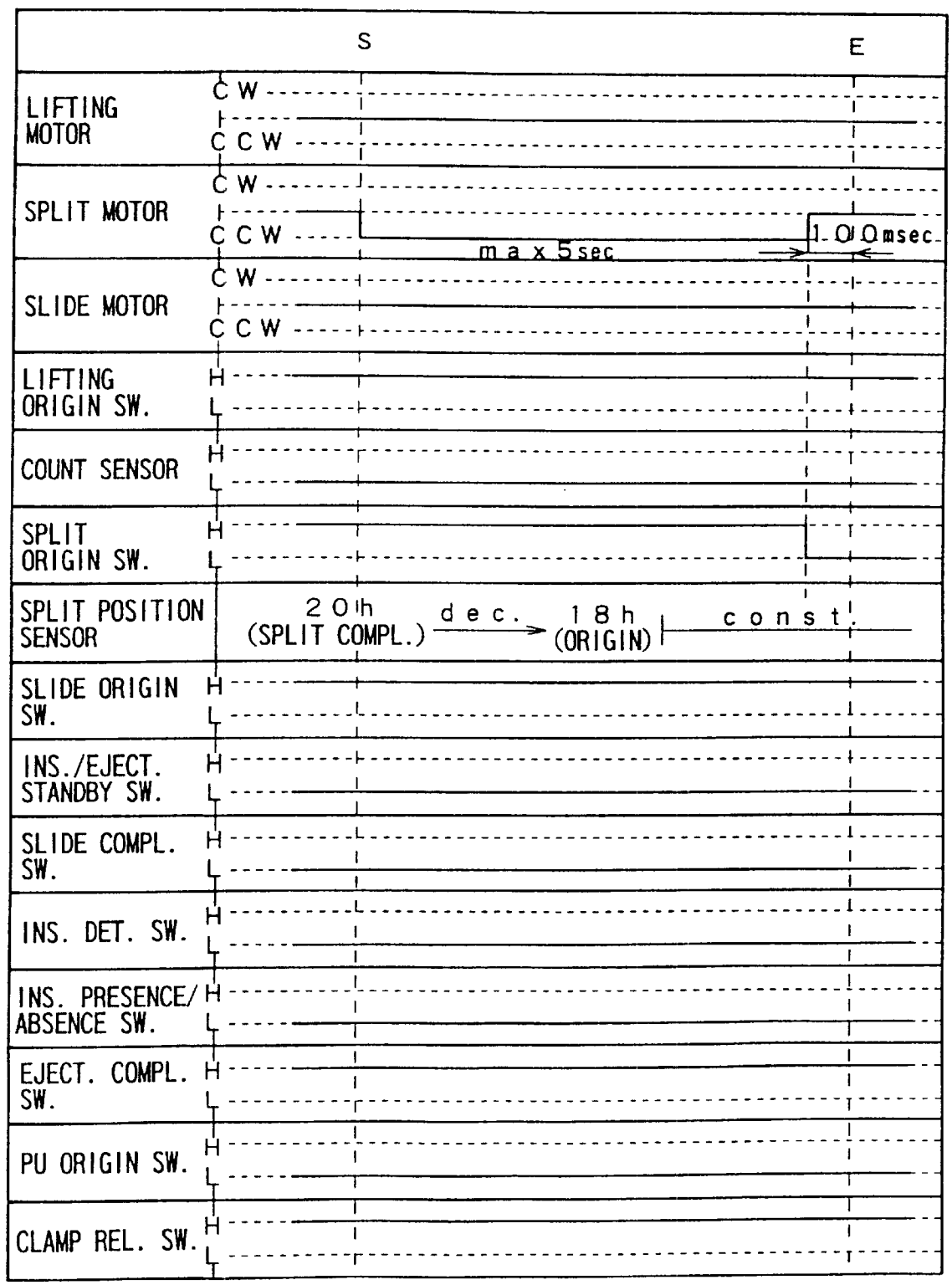
FIG. 56 is a timing chart illustrating the operation of the control circuit 29 of FIG. 52.

FIG. 53 shows the control timing for the operation performed from the time that the slide base 30, including the PU unit 25, is floated from the chassis 50 by virtue of the floating mechanism 27, until the time that the CD 24 is returned to the holder 39 in the stocker 23. At operation start point S, the holder 39 temporarily moved downward, as shown in FIG. 10A, is moved upward by driving the separating slide plates 56 by rotating the splitting motor 53 in the counterclockwise direction (CCW); the holder 39 pressed downward by the separators 122 is now moved upward and the floating condition is restored by releasing the lock applied by the lock mechanism 31. FIG. 54 shows a sequence of operations by which the CD 24 clamped by the chucking mechanism 40 is unclamped and the slide unit 60 is moved downward to disengage the CD 24 from the turn table 38. FIG. 55 shows a control sequence for the operation performed to withdraw the slide unit 60 from the inside of the stocker 23 and retract it into the standby position. FIG. 56 shows a sequence of operations by which the PU unit 25 is retracted outside the stocker 23 and the space created by separating the stocker 23 is closed by the movement of the separating slide plates 56, thus putting the stocker 23 in the unseparated condition to end the separated condition. FIG. 57 shows a sequence of operations by which the entire construction of the stocker 23 is moved up and down by the lifting slide plates 54. With the control sequence illustrated in FIGS. 53 to 57 above, the sequence of operations from FIGS. 8A to 8F or FIGS. 10A to 10F can be performed.

Figure 59:
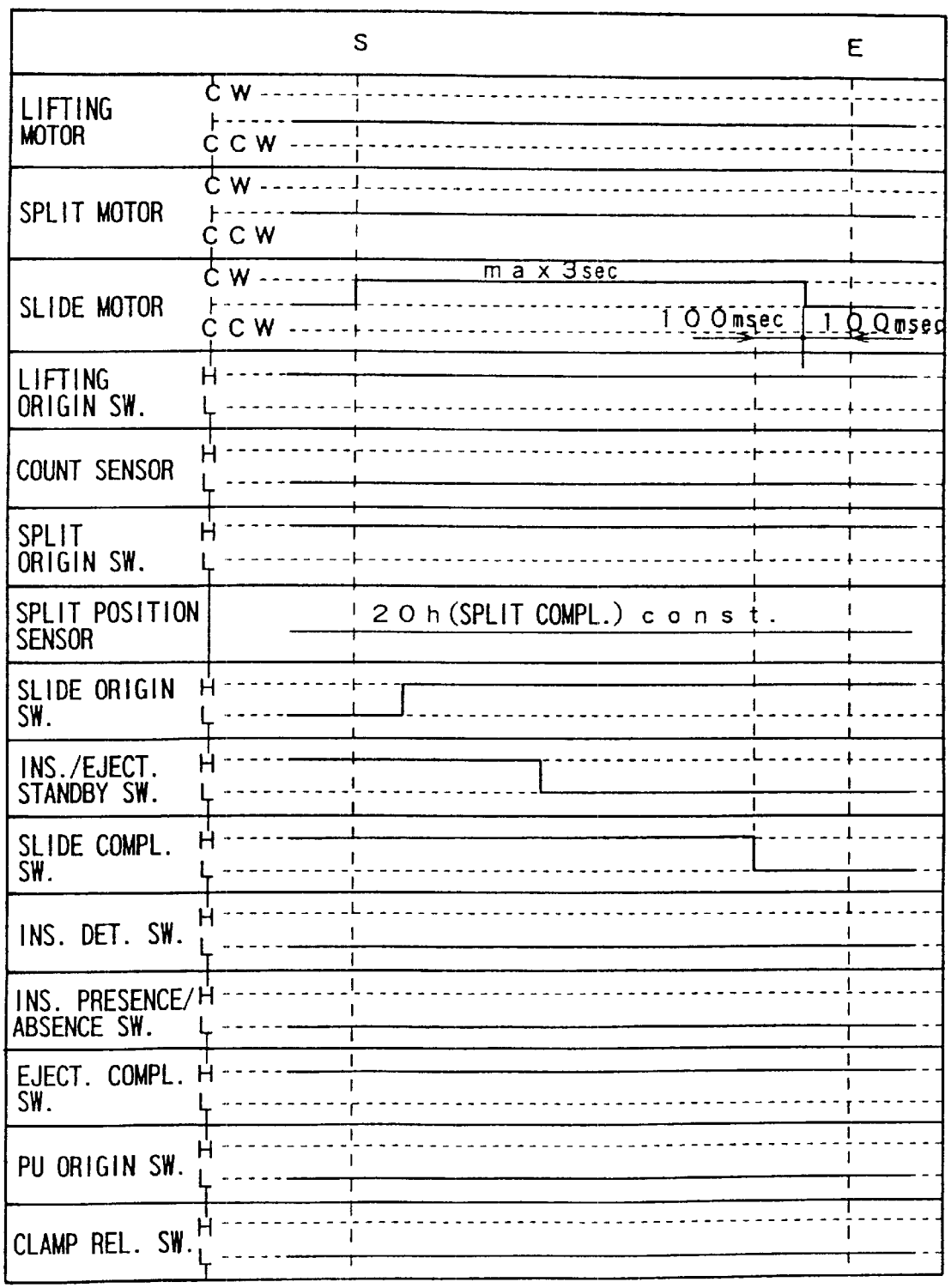
FIG. 59 is a timing chart illustrating the operation of the control circuit 29 of FIG. 52.

FIG. 58 shows the control operations when separating the stocker 23 by the slitting slide plates 56. FIG. 59 shows the operation for inserting the PU unit 25 in the space created by separating the stocker 23. FIG. 60 shows the operation for moving upward the turn table 38 of the PU unit 25 inserted in the stocker 23 and for mounting the CD 24 on the turn table 38.

FIG. 61 shows the control of operations by which the CD 24 is clamped onto the turn table 38 by activating the chucking mechanism 40 and the locking by the lock mechanism 31 is released to allow the PU unit 25, etc. on the slide base 30 to be floated by the floating mechanism 27. With the control sequence illustrated in FIGS. 58,to 61, the sequence of operations from FIGS. 10G to 10L can be performed.

FIG. 62 shows the control of operations by which, with the CD 24 clamped on the turn table 38 in the stocker 23, the holder 39 on which the CD 24 was accommodated is moved downward.

FIG. 63 shows the operation for transporting the CD clamped on the turn table 38 to the standby position by using the PU unit 25. FIG. 64 shows the control of operations by which, with the PU unit 25 positioned in the standby position, the CD 24 clamped on the turn table 38 by the chucking mechanism 40 is unclamped, and the slide unit 60 is moved down while, at the same time, the insertion/ejection roller 35 is lowered to hold the CD 24 in the insertion/ejection mechanism 34 and the turn table 38 is retracted below the transport path of the CD 24.

FIG. 65 shows the control of operations for ejecting the CD 24 outside by driving the insertion/ejection roller 35. The control sequence illustrated in FIGS. 62 to 65 corresponds to the sequence of operations shown in FIGS. 7A to 7F.

Figure 66:
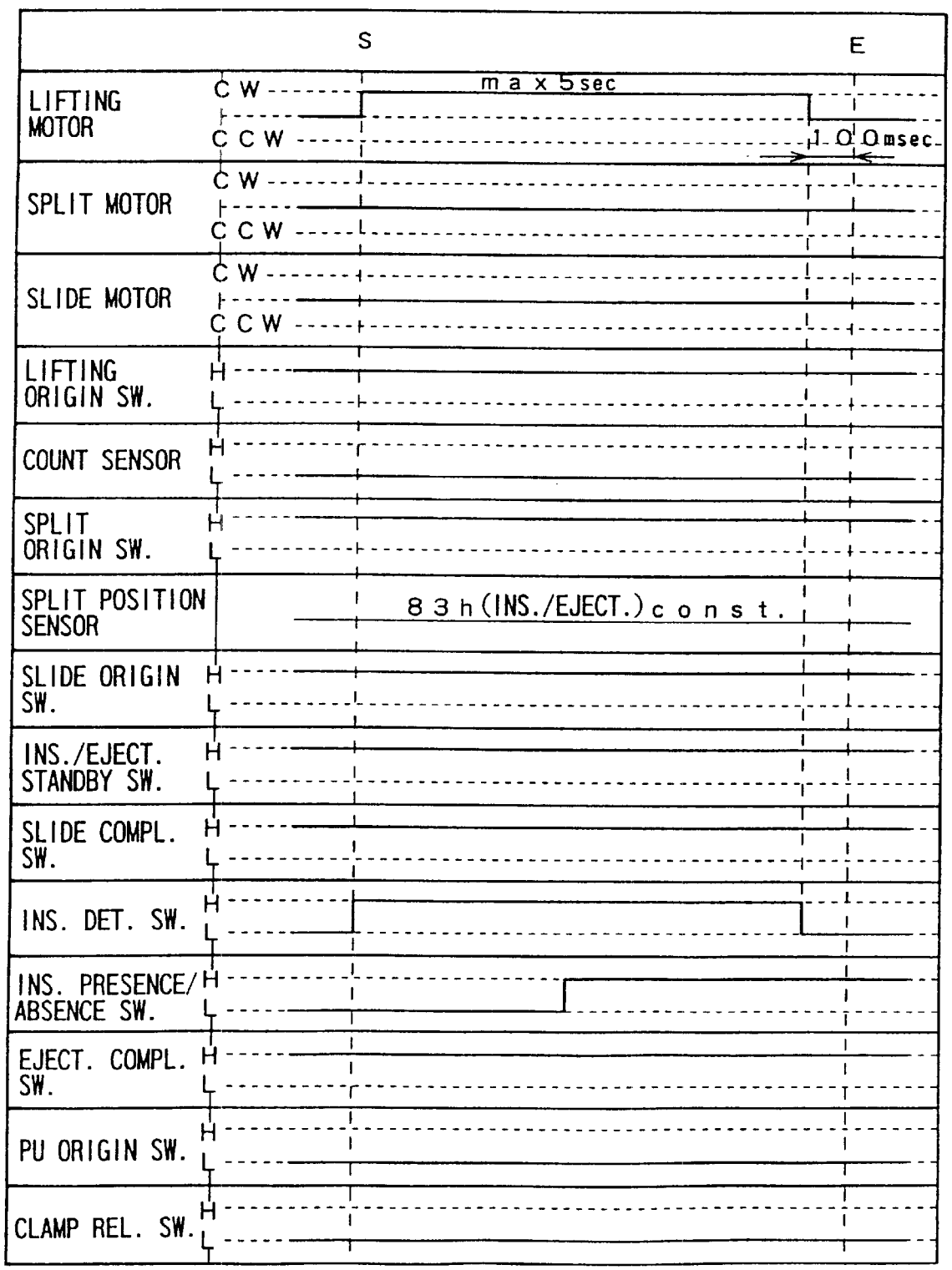
FIG. 66 is a timing chart illustrating the operation of the control circuit 29 of FIG. 52.

FIG. 66 shows the control of operations by which the CD 24 inserted through the insertion/ejection slot 33 is drawn inside by the insertion/ejection roller 35. FIG. 67 shows the control of operations by which the insertion/ejection roller 35 is driven in the reverse direction to position the CD 24 into the standby position. FIG. 68 shows the control of operations by which the PU unit 25 is moved upward to mount the thus positioned CD 24 onto the turn table 38. FIG. 69 shows the control of operations by which the CD 24 clamped on the turn table 38 by the chucking mechanism 40 is transported into the space in the stocker 23 by moving the PU unit 25. With the control sequence illustrated in FIGS. 66 to 69 above, the sequence of operations in FIGS. 6A to 6G can be performed.

Figure 71:
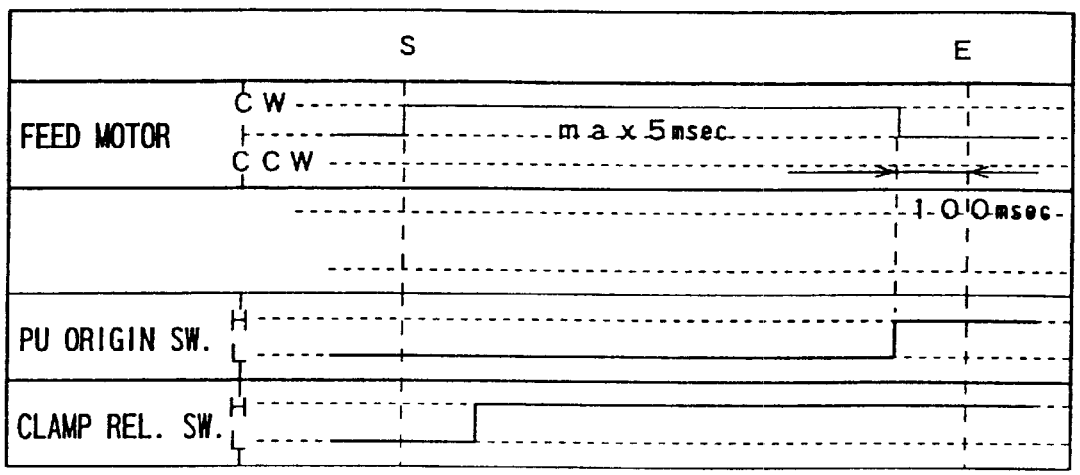
Figure 72:
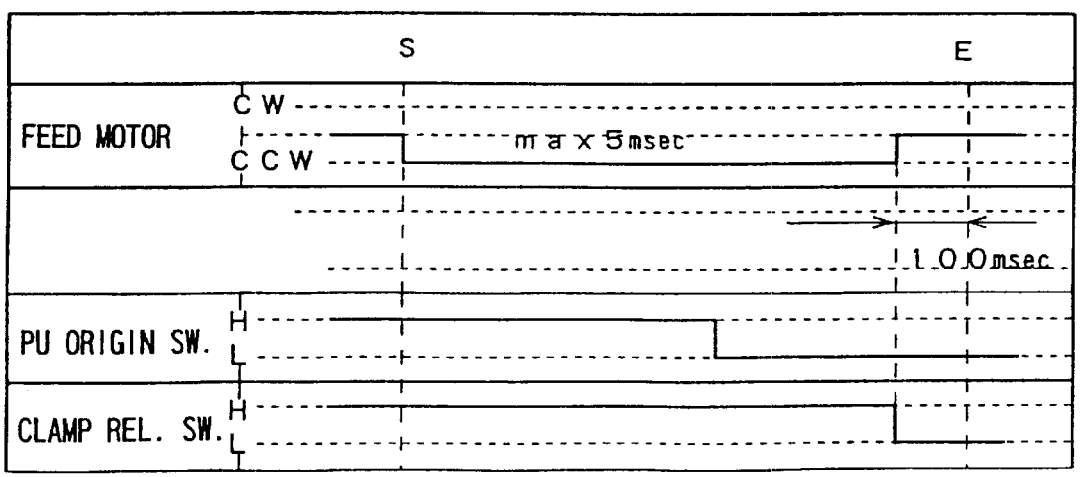
Figure 73A:
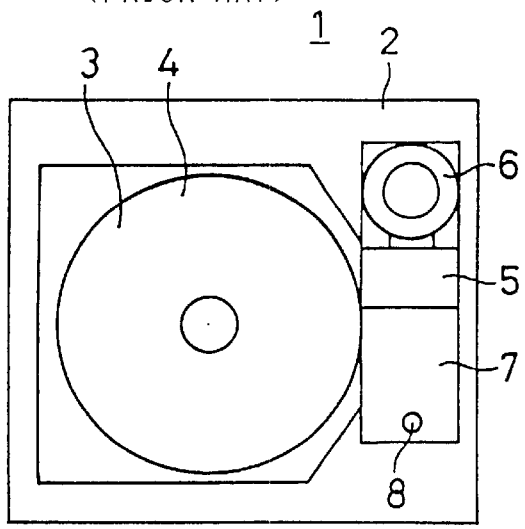
FIGS. 73A and 73B are simplified cross sectional plan views in schematic form showing the operation of the prior art.
Figure 73B:
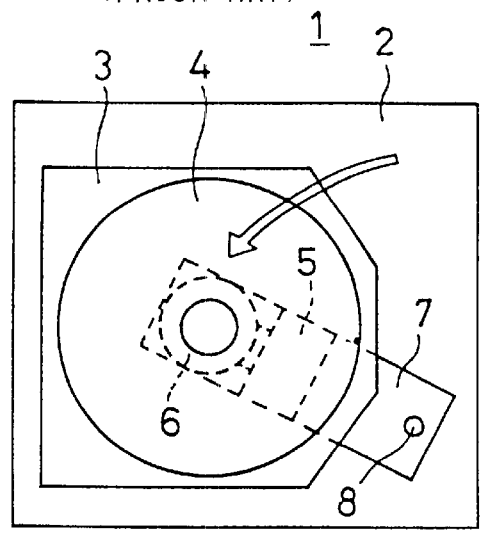
Figure 74A:
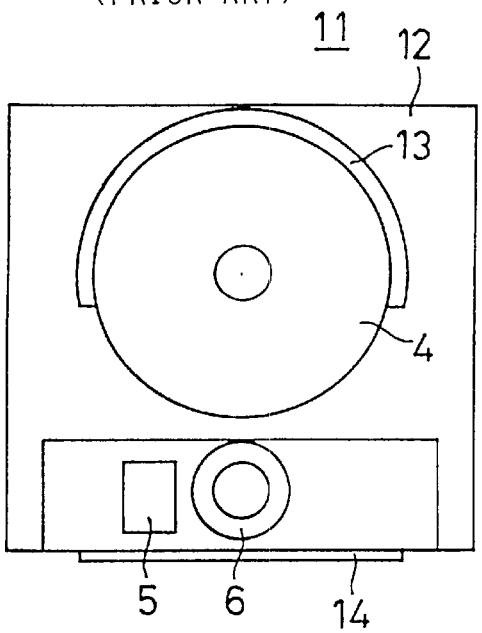
FIGS. 74A and 74B are simplified cross sectional plan views showing in schematic form the operation of an apparatus disclosed in a prior patent application.
Figure 74B:
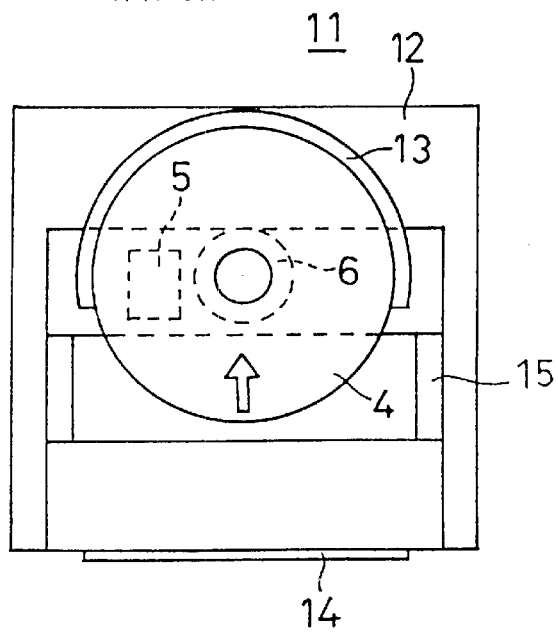
Figure 75:
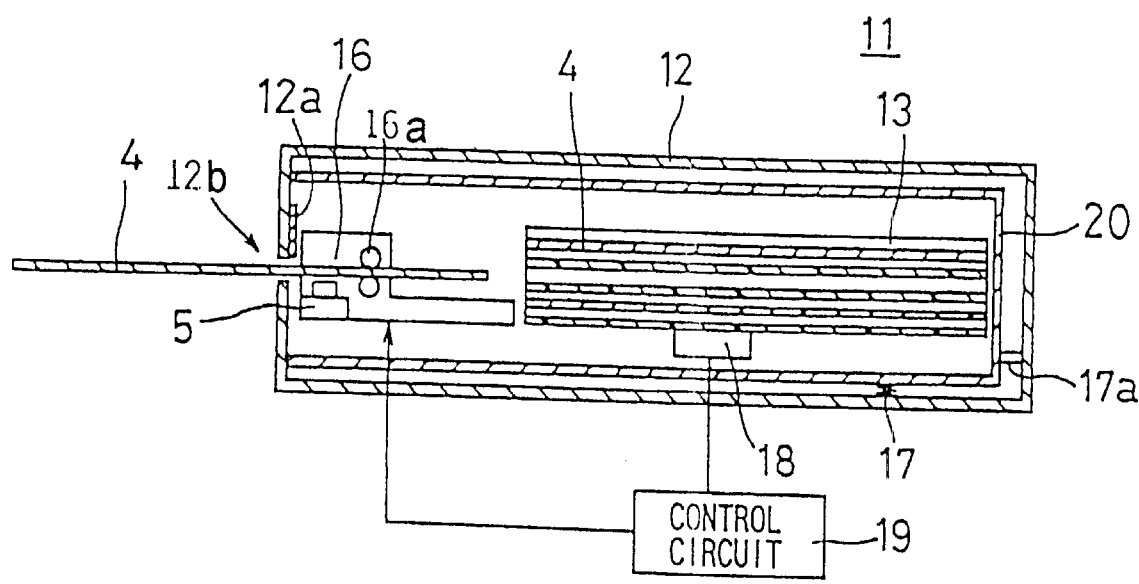
FIG. 75 is a cross sectional side view showing in schematic form the construction of the apparatus disclosed in the prior patent application.
Figure 76A:
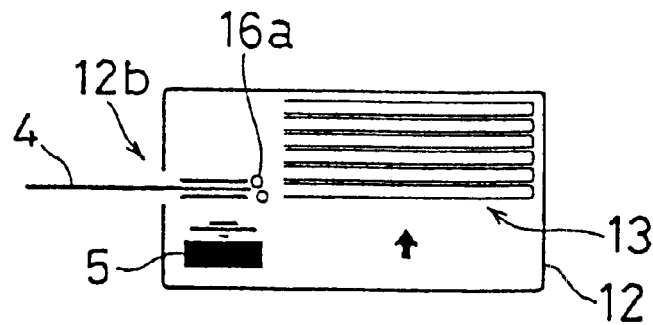
FIGS. 76A–76E are simplified cross sectional side views showing in schematic form the operation of the apparatus disclosed in the prior patent application.
Figure 76B:
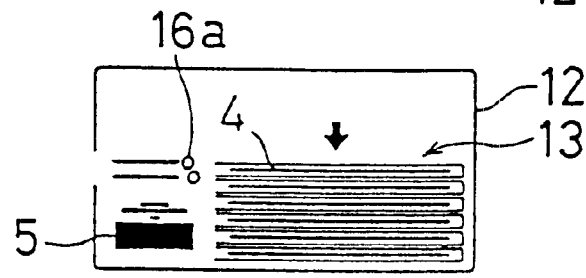
Figure 76C:
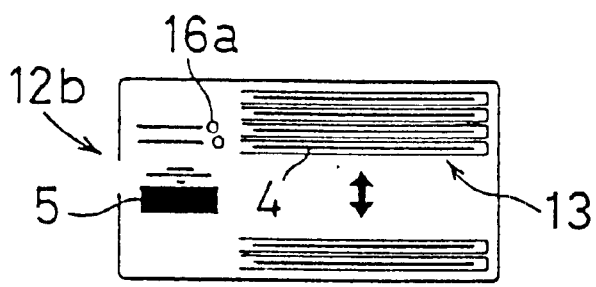
Figure 76D:
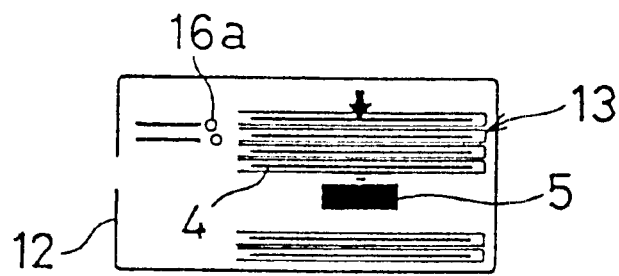
Figure 76E:
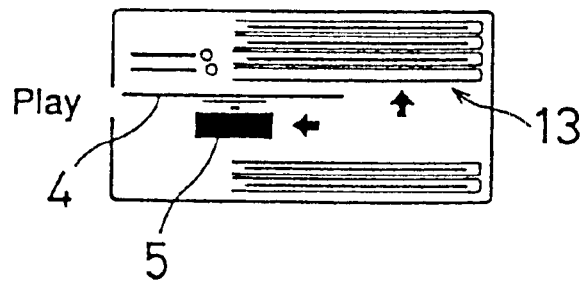

FIG. 70 shows the control of operations by which the slide base 30 is locked by the lock mechanism 38 and the turn table 26 of the PU unit 25 is moved upward. FIGS. 71 and 72 show the operations for clamping the CD 24 onto the turn table 26 and for unclamping the CD 24, respectively. As previously described, the clamping of the CD 24 by the clamp mechanism 40 is performed using the feed motor 70 which moves the PU unit 25 into the chucking position. To achieve this, the PU origin point switch 72 and the clamp release switch 73 are used as inputs in the control of the chucking mechanism 40.

While the above embodiment has been described dealing with the CD 24 which is a disk-shaped recording medium, the present invention is equally applicable to other disk-shaped recording media such as DVDs. The invention can also be applied to MDs and like recording media housed in cassettes or cartridges.

Further, since the CD 24 is handled in a substantially horizontal position, the acccommodating and transport mechanisms can be simplified, but the mechanisms can be adapted to handle the CD 24 in other positions.

Though the PU unit 25 is also constructed to transport the CD 24, a mechanism for transportation may be provided separately. Further, the stocker of the present invention can also be applied to a magazine which in its entirety is loaded into and unloaded from the housing.

As the recording media, not only the playback-only CD 24 but information recordable media such as CD-R or CD-RW can also be used. Such writable recording media can be used as information recording media, for example, for personal computers. By applying the present invention, a playback apparatus or a playback/recording apparatus capable of acccommodating many recording media, whether it is internal or external to a personal computer or the like, can be made compact in construction, and yet the recording media can be inserted or ejected one at a time.

Further, the present invention can be applied not only to disc positioning in an autochanger acccommodating a plurality of recording media, but also to disc positioning in a slot-in type apparatus in which recording media are inserted one at a time for playback. In the latter case also, the necessary mechanism can be simplified in construction and reduced in size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recording media playback apparatus for playing back and/or recording information on a recording medium, comprising:

a housing having an insertion/ejection slot through which substantially plate-like recording media are individually insertable or individually ejectable;

an insertion/ejection mechanism capable of drawing a recording medium into said housing through said insertion/ejection slot, and capable of ejecting the recording medium from said housing through said insertion/ejection slot; and a playback mechanism movable within said housing, wherein said playback mechanism is capable of moving to a transfer position and transferring the recording medium to and from said insertion/ejection mechanism, and is also capable of moving with the recording medium thereon from the transfer position to a playback position at which the information playback and/or recording is to be performed on the recording medium.

2. The recording media playback apparatus according to claim 1, further comprising:

an open/close mechanism capable of closing at least a portion of said insertion/ejection slot after the recording medium has been inserted into said housing through said insertion/ejection slot; and a control circuit for causing said insertion/ejection mechanism to be driven in an ejecting direction after the recording medium has been inserted into said housing through said insertion/ejection slot such that the recording medium abuts against said open/close mechanism, whereby a position of the recording medium at the transfer position becomes set with respect to said playback mechanism.

3. The recording media playback apparatus according to claim 2, wherein the recording medium is disc-shaped, and said playback mechanism includes a turn table that is capable of being engaged with a center hole of the recording medium while holding the recording medium in a clamped and un-clamped state.

4. The recording media playback apparatus according to claim 3, further comprising:
   an acccommodating mechanism installed within said housing, with said acccommodating mechanism being capable of acccommodating a plurality of recording media; and
   a transport mechanism positioned between said open/close mechanism and said acccommodating mechanism, with said transport mechanism being capable of transporting the recording medium by moving said turn table while the recording medium is held by said turn table.

5. The recording media playback apparatus according to claim 4, wherein said control circuit is also for causing said transport mechanism to abut against said insertion/ejection mechanism such that the recording medium is transferred from said turn table to said insertion/ejection mechanism at the transfer position.

6. The recording media playback apparatus according to claim 5, wherein said insertion/ejection mechanism is to hold the recording medium when the recording medium is transferred from said turn table to said insertion/ejection mechanism.

7. The recording media playback apparatus according to claim 6, wherein said open/close mechanism is to open said insertion/ejection slot in interlocking fashion with movement of said turn table in a direction of recording media thickness.

8. The recording media playback apparatus according to claim 4, wherein said transport mechanism includes a slip mechanism for limiting a driving force used to move said turn table, with said slip mechanism being positioned in a transmission path of the driving force.

9. The recording media playback apparatus according to claim 2, wherein said insertion/ejection mechanism includes an insertion/ejection roller for inserting and ejecting the recording medium into and from said housing through said insertion/ejection slot.

10. The recording media playback apparatus according to claim 9, wherein said insertion/ejection roller is to be positioned in an insertion/ejection path of the recording medium when the recording medium is being inserted into or ejected from said housing through said insertion/ejection slot, and is to be positioned out of the insertion/ejection path when the recording medium is not being inserted into or ejected from said housing through said insertion/ejection slot.

11. The recording media playback apparatus according to claim 1, further comprising:
   an acccommodating mechanism installed within said housing and capable of acccommodating a plurality of recording media in a stacked array in a thickness direction of the recording media, with said acccommodating mechanism being separable at a desired acccommodating position to form a space in said acccommodating mechanism, and wherein said playback mechanism is capable of moving into the space formed in said acccommodating mechanism.

12. The recording media playback apparatus according to claim 11, further comprising:
   a driving source that is switchable between a first condition for selecting the acccommodating position at which said acccommodating mechanism is to be separated, and a second condition for causing said insertion/ejection mechanism to draw the recording medium into said housing through said insertion/ejection slot or eject the recording medium from said housing through said insertion/ejection slot; and
   a control circuit for causing, after said driving source has resulted in the selection of the acccommodating position and after the recording medium has been inserted into said housing through said insertion/ejection slot, said driving source to be switched such that said insertion/ejection mechanism is driven in an inserting direction of the recording medium, whereby the recording medium is drawn into said housing.

13. The recording media playback apparatus according to claim 12, wherein said driving source includes a switching mechanism that is capable of constantly transmitting a driving force to said insertion/ejection mechanism, and is also capable of intermittently transmitting a driving force that is used for selection of the acccommodating position at which said acccommodating mechanism is to be separated.

14. The recording media playback apparatus according to claim 13, wherein said switching mechanism includes a planetary gear for interrupting the transmission of the driving force that is used for the selection of the acccommodating position after said acccommodating mechanism has been separated at the acccommodating position.

15. The recording media playback apparatus according to claim 12, wherein said driving source is positioned at one corner of said acccommodating mechanism.

16. The recording media playback apparatus according to claim 11, further comprising:
   a selection mechanism for selecting a desired acccommodating position in said acccommodating mechanism, and for moving said acccommodating mechanism along the direction of recording media thickness so that the selected acccommodating position becomes substantially aligned with the inserting direction of the recording medium through said insertion/ejection slot.

17. The recording media playback apparatus according to claim 16, further comprising a separating mechanism for separating said acccommodating mechanism at the selected acccommodating position, wherein said playback mechanism is to transport the recording medium into the space resulting from said separating mechanism separating said acccommodating mechanism at the selected acccommodating position.

18. The recording media playback apparatus according to claim 16, wherein the recording medium is disc-shaped.

19. The recording media playback apparatus according to claim 16, wherein said playback mechanism includes a turn table for mounting the recording medium thereon for information playback, and the recording medium is to be transported while the recording medium is mounted on said turn table.

20. The recording media playback apparatus according to claim 16, further comprising a control circuit for controlling said selection mechanism, said insertion/ejection mechanism and said playback mechanism such that:
   (i) the recording medium inserted into said housing through said insertion/ejection slot is drawn by said insertion/ejection mechanism, mounted on said playback mechanism, and transported to the acccommodating position in said acccommodating mechanism that has been selected by movement of said selection mechanism;
   (ii) the recording medium transported by said insertion/ejection mechanism or selected from the acccommodating position in said acccommodating mechanism by movement of said selection mechanism is mounted on said playback mechanism for playback or recording of information; and
   (iii) the recording medium selected by said selection mechanism from the acccommodating position in said acccommodating mechanism and mounted on said playback mechanism, or the recording medium after play back or recording, is transported by said playback mechanism to said insertion/ejection mechanism to be ejected from said housing through said insertion/ejection slot by said insertion/ejection mechanism.

21. The recording media playback apparatus according to claim 11, further comprising:
   a swiveling mechanism capable of being swiveled about a base end of said swiveling mechanism while said playback mechanism is mounted on a swiveling end of said swiveling mechanism; and
   a moving mechanism for rectilinearly moving said swiveling mechanism.

22. The recording media playback apparatus according to claim 21, wherein said moving mechanism is to rectilinearly move said playback mechanism into the space resulting from separation of said acccommodating mechanism, after swiveling of said swiveling mechanism.

23. The recording media playback apparatus according to claim 22, wherein said playback mechanism is to transport the recording media between said insertion/ejection slot and said acccommodating mechanism by being moved rectilinearly by said moving mechanism.

24. The recording media playback apparatus according to claim 21, wherein said acccommodating mechanism is spaced from said insertion/ejection slot, and said swiveling mechanism is to set said playback mechanism at a position that is aligned with the center of the recording medium that has been inserted into said housing through said insertion/ejection slot.

25. The recording media playback apparatus according to claim 21, wherein said swiveling mechanism and said moving mechanism are to move said playback mechanism away from said acccommodating mechanism when said acccommodating mechanism is being separated.

26. The recording media playback apparatus according to claim 21, wherein:
   said moving mechanism includes a moving member that is supported on a base member supported on said housing, with said moving member being movable in an inserting or ejecting direction of the recording medium; and
   said swiveling mechanism includes a swiveling member having a base end that is supported in an angularly displaceable fashion on a base shaft protruding from said moving member, having a protrusion extending from said swivelling member, and also having a swiveling end on which on which said playback mechanism is supported;
   with said base member having a movement guiding portion for guiding said protrusion so as to rectilineraly move said swiveling mechanism, and with said moving member having a swiveling motion guiding portion for guiding said swiveling member as said swiveling member swivels about said base shaft.

27. The recording media playback apparatus according to claim 26, wherein:
   said movement guiding portion has a substantially L-shaped configuration defined by a first guide portion extending in the inserting or ejecting direction of the recording medium and a second guide portion extending from one end of said first guide portion; and
   said swiveling motion guiding portion is formed in said moving member and has an arc-shaped configuration.

28. The recording media playback apparatus according to claim 21, wherein said moving mechanism includes a transmission mechanism for transmitting a driving force for rectilinearly moving said swiveling mechanism, with said transmission mechanism having a slip portion for limiting the driving force.

29. The recording media playback apparatus according to claim 28, wherein said moving mechanism is to drive two sides of said moving member by dividing a driving force from a common driving source between the two sides.

30. The recording media playback apparatus according to claim 29, wherein said transmission mechanism, after division of the driving force, is to transmit the driving force to driving positions on the two sides of said moving member via substantially identical mechanisms.

31. The recording media playback apparatus according to claim 11, further comprising a floating mechanism for holding said playback mechanism in a floating condition within said housing when said playback mechanism performs information playback and/or information recordation on the recording medium.

32. The recording media playback apparatus according to claim 31, further comprising a separating mechanism for separating said acccommodating mechanism by entering the desired acccommodating position and widening a gap within said acccommodating mechanism to form the space.

33. The recording media playback apparatus according to claim 31, further comprising:
   a support base for supporting the playback mechanism thereon and having a moving mechanism for entering the space created by separation of said acccommodating mechanism, with said support base being supported by said floating mechanism in a floating condition with respect to said housing; and
   a lock mechanism that is movable relative to said support base for restraining the floating condition of said support base by restraining said support base to said housing whenever said playback mechanism is not performing a recording media playback and/or recording operation.

34. The recording media playback apparatus according to claim 33, wherein
   said support base includes a lock shaft and an engaging member spaced from one another and extending towards said lock mechanism, and
   said lock mechanism includes a first restrainer for, with movement of said lock mechanism, restraining displacement of said lock shaft in the direction of movement of said lock mechanism, and a second restrainer for engaging with said engagement member and restraining displacement of said lock shaft in a direction perpendicular to the direction of movement of said lock mechanism.

35. The recording media playback apparatus according to claim 34, wherein
   said lock mechanism further includes a lock member, and wherein movement of said lock mechanism includes movement of said lock member, with said lock member having a substantially plate-like shape extending along the direction of movement of said lock member,
   said first restrainer comprises a slot in said lock member, through which slot said lock shaft is insertable, with said slot having a shape that is elongated in the direction of movement of said lock member and that decreases in width from a start point to an end point in the direction of movement of said lock member until the width becomes substantially equal to an outer diameter of said lock shaft, and said second retainer comprises an engaging portion on said lock member, which engaging portion is to engage with said engaging member when said lock shaft is received within said slot where the width of said slot becomes substantially equal to the outer diameter of said lock shaft.

36. The recording media playback apparatus according to claim 35, wherein said engaging member includes an engaging section spaced from said support base, said second restrainer is to engage with said engaging section member when said lock shaft is received within said slot where the width of said slot becomes substantially equal to the outer diameter of said lock shaft, and said first restrainer includes a lock lever which is to restrain said lock shaft by being displaced, interlockingly with the movement of said lock member, in a direction that is different from the direction of movement of said lock member.

37. The recording media playback apparatus according to claim 33, wherein said lock mechanism is to restrain the floating condition of said support base interlockingly with separation of said acccommodating mechanism when a playback and/or recording operation on the recording medium is to be subsequently performed.

38. The recording media playback apparatus according to claim 31, wherein said floating mechanism is to support said playback mechanism at a plurality of places located in such a manner as to encircle portions where said lock mechanism is to restrain said support base.

* * * * *